United States Patent
Li et al.

(10) Patent No.: US 12,028,833 B2
(45) Date of Patent: Jul. 2, 2024

(54) COMMUNICATIONS METHOD AND APPARATUS

(71) Applicant: Huawei Technologies Co., Ltd., Shenzhen (CN)

(72) Inventors: Xinxian Li, Shanghai (CN); Hao Tang, Ottawa (CA); Ting Wang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 17/372,283

(22) Filed: Jul. 9, 2021

(65) Prior Publication Data

US 2021/0337517 A1    Oct. 28, 2021

Related U.S. Application Data

(63) Continuation of application No. PCT/CN2019/113553, filed on Oct. 28, 2019.

(30) Foreign Application Priority Data

Jan. 11, 2019   (CN) .......................... 201910028828.0
Mar. 29, 2019   (CN) .......................... 201910249126.5

(51) Int. Cl.
*H04W 72/02*     (2009.01)
*H04W 8/24*      (2009.01)
(Continued)

(52) U.S. Cl.
CPC ............. *H04W 72/02* (2013.01); *H04W 8/24* (2013.01); *H04W 72/0453* (2013.01)

(58) Field of Classification Search
CPC ... H04L 5/0007; H04L 5/0044; H04L 5/0092; H04W 36/03; H04W 36/06; H04W 72/02;
(Continued)

(56) References Cited

U.S. PATENT DOCUMENTS

2017/0155434 A1   6/2017  Kim et al.
2017/0215203 A1   7/2017  Lee et al.
(Continued)

FOREIGN PATENT DOCUMENTS

CN   106464403 A   2/2017
CN   106464471 A   2/2017
(Continued)

OTHER PUBLICATIONS

"Discussion on UE capability reporting for V2X," 3GPP TSG-RAN WG2 Meeting #97bis, R2-1702501, Spokane, USA, XP051244524, pp. 1-2, 3rd Generation Partnership Project, Valbonne, France (Apr. 3-7, 2017).

(Continued)

*Primary Examiner* — Awet Haile
(74) *Attorney, Agent, or Firm* — Leydig, Voit & Mayer, Ltd.

(57) ABSTRACT

A communications method and apparatus are provided. The method includes: receiving first configuration information, where the first configuration information is used to configure a first bandwidth part (BWP); and sending sidelink data on a resource included in a first transmission resource pool, where a frequency range of the first transmission resource pool is included in a frequency range of the first BWP and a frequency range of a second BWP, and the second BWP is an activated uplink BWP. The communications method and apparatus in this application can implement terminal device communication on the first BWP and the second BWP, and reduce a time of switching between the first BWP and the second BWP, thereby improving efficiency of the communication on the first BWP and the second BWP.

20 Claims, 21 Drawing Sheets

(51) Int. Cl.
*H04W 72/04* (2023.01)
*H04W 72/0453* (2023.01)

(58) Field of Classification Search
CPC . H04W 72/0453; H04W 72/23; H04W 76/14; H04W 8/24; H04W 92/18
See application file for complete search history.

(56) References Cited

U.S. PATENT DOCUMENTS

| | | | |
|---|---|---|---|
| 2018/0098322 A1 | 4/2018 | Yoon | |
| 2019/0394710 A1* | 12/2019 | Ugurlu | H04L 5/0098 |
| 2021/0160876 A1* | 5/2021 | Osawa | H04W 72/0446 |
| 2021/0274473 A1* | 9/2021 | Wang | H04W 72/20 |
| 2021/0282143 A1* | 9/2021 | Lee | H04W 52/343 |
| 2021/0306984 A1* | 9/2021 | Lee | H04W 72/02 |
| 2021/0352623 A1* | 11/2021 | Wang | H04W 72/0453 |

FOREIGN PATENT DOCUMENTS

| | | |
|---|---|---|
| CN | 106576354 A | 4/2017 |
| CN | 106664703 A | 5/2017 |
| EP | 3817485 A1 | 5/2021 |
| WO | 2018124776 A1 | 7/2018 |
| WO | 2018145566 A1 | 8/2018 |
| WO | 2019009454 A1 | 1/2019 |

OTHER PUBLICATIONS

Huawei, HiSilicon, "Bandwidth Parts and Resource Pools for V2X sidelink," 3GPP TSG RAN WG1 Meeting #95, Spokane, USA, R1-1813555, total 12 pages, 3rd Generation Partnership Project, Valbonnem France (Nov. 12-16, 2018).

Huawei, HiSilicon, On relationship between SL BWP and Uu BWP, 3GPP TSG RAN WG1 Meeting #95, Spokane, USA, R1-1814304, total 3 pages, 3rd Generation Partnership Project, Valbonnem France (Nov. 12-16, 2018).

\* cited by examiner

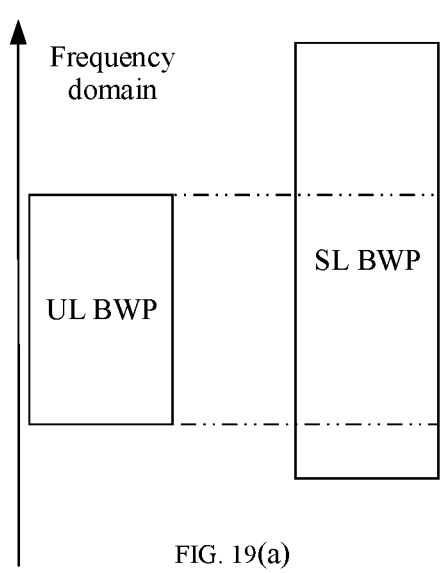 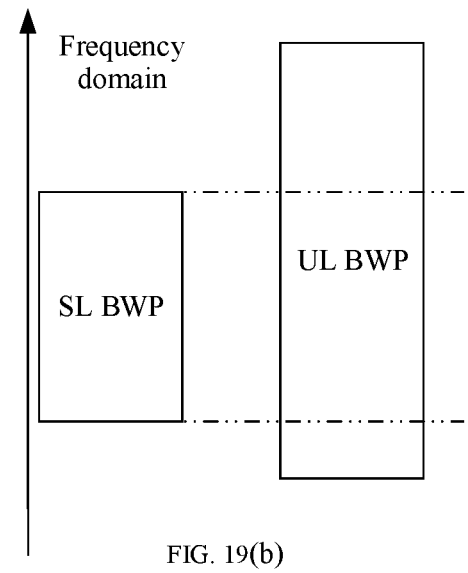
FIG. 19(a)    FIG. 19(b)
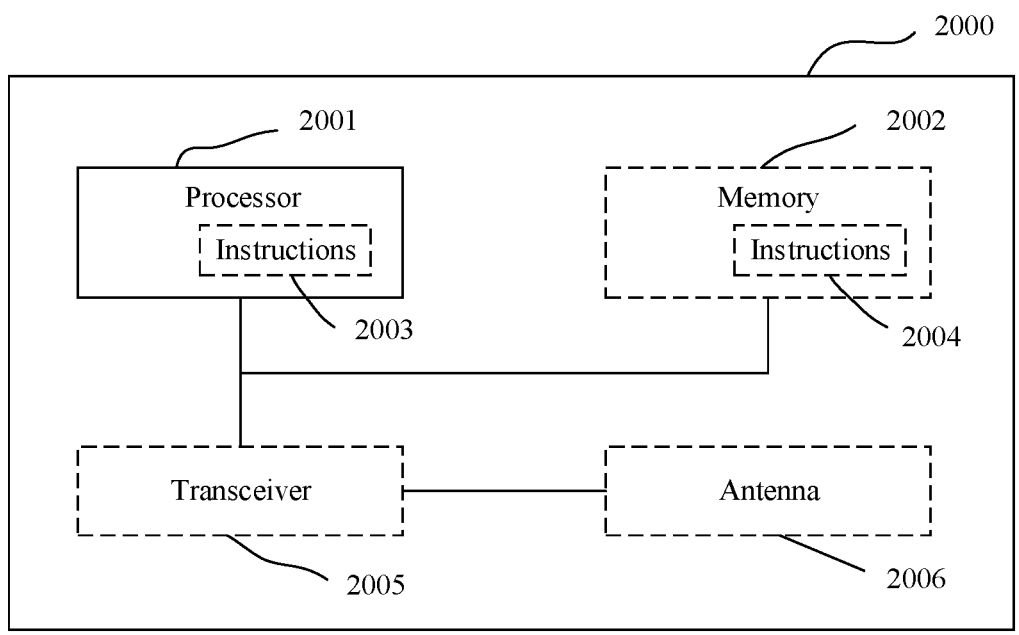
FIG. 20

COMMUNICATIONS METHOD AND APPARATUS

CROSS-REFERENCE TO RELATED APPLICATIONS

This application is a continuation of International Application No. PCT/CN2019/113553, filed on Oct. 28, 2019, which claims priority to Chinese Patent Application No. 201910028828.0, filed on Jan. 11, 2019, and claims priority to Chinese Patent Application No. 201910249126.5, filed on Mar. 29, 2019. The disclosures of the aforementioned applications are hereby incorporated by reference in their entireties.

TECHNICAL FIELD

Embodiments of this application relate to the field of communications technologies, and more specifically, to a communications method and apparatus.

BACKGROUND

In a wireless communications system, a terminal and a base station perform wireless communication based on a wireless communications technology. An uplink (UL) carrier is used to carry uplink data between the terminal and the base station, and a downlink (DL) carrier is used to carry downlink data between the terminal and the base station. As types of wireless communications services continuously increase, device-to-device (for example, vehicle-to-vehicle, vehicle-to-infrastructure, and vehicle-to-pedestrian) communications technologies emerge. A sidelink (SL) carrier is used to carry sidelink data between devices. Because device-to-device communication can implement direct communication between different terminals, a relatively high data rate, a relatively low delay, and relatively low power consumption can be realized. However, due to a limited terminal capability, a transmit radio frequency may not be separately set for the uplink and the sidelink when the uplink carrier and the sidelink carrier are a same carrier. Therefore, how to implement transmit radio frequency sharing between the uplink and the sidelink is an urgent problem to be resolved.

SUMMARY

This application provides a communications method and apparatus, to implement terminal device communication on an uplink BWP and a sidelink BWP, and reduce a time of switching between the uplink BWP and the sidelink BWP, thereby improving efficiency of the communication on the uplink BWP and the sidelink BWP.

According to a first aspect, a communications method is provided. The method includes: receiving first configuration information, where the first configuration information is used to configure a first bandwidth part BWP; and sending sidelink data on a resource included in a first transmission resource pool, where a frequency range of the first transmission resource pool is included in a frequency range of the first BWP and a frequency range of a second BWP, and the second BWP is an activated uplink BWP.

It can be understood that the first BWP may also be referred to as an SL BWP.

That the frequency range of the first transmission resource pool is included in the frequency range of the first BWP and the frequency range of the second BWP may be understood as that the frequency range of the first transmission resource pool is included in an intersecting frequency range between the frequency range of the second BWP and the frequency range of the first BWP, or the frequency range of the first transmission resource pool is included in an intersection between the frequency range of the second BWP and the frequency range of the first BWP, or the frequency range of the first transmission resource pool is included in an overlapping frequency range between the frequency range of the second BWP and the frequency range of the first BWP.

In this embodiment of this application, a base station may configure an SL BWP and a UL BWP for a terminal, and the SL BWP and the UL BWP may overlap in frequency domain. The base station may activate one or more of UL BWPs configured for user equipment 1 (UE 1), and the UE 1 may send uplink data (the uplink data may be carried on an uplink shared channel and/or an uplink control channel) to the base station on the activated UL BWP, and send sidelink data to UE 2 on an SL BWP.

Because the frequency range of the first transmission resource pool is included in a frequency range of a currently activated UL BWP and a frequency range of an SL BWP, sending of uplink data is not affected when the user equipment sends sidelink data in the first transmission resource pool. This implements transmit radio frequency sharing between the SL BWP and the UL BWP, and improves sidelink data transmission efficiency. In addition, this can further reduce a time of switching between the UL BWP and the SL BWP.

With reference to the first aspect, in a first implementation of the first aspect, the method further includes: receiving first indication information, where the first indication information is used to indicate the terminal (for example, user equipment (UE)) to transmit sidelink data in the first transmission resource pool.

Optionally, the first indication information may be downlink control information DCI, sidelink control information SCI, or radio resource control information.

It can be understood that the base station may configure an SL BWP and a UL BWP for the terminal, and the SL BWP and the UL BWP may overlap in frequency domain. The base station may activate one or more of UL BWPs configured for the UE 1, and the UE 1 may send uplink data (the uplink data may be carried on an uplink shared channel and/or an uplink control channel) to the base station on the activated UL BWP, and send sidelink data to the UE 2 on an SL BWP.

With reference to the first aspect, in a second implementation of the first aspect, the first configuration information includes a configuration of a transmission resource pool of the first BWP, and a frequency range of the transmission resource pool of the first BWP is included in the frequency range of the first BWP.

With reference to the first aspect, in a third implementation of the first aspect, the first configuration information includes a configuration of a transmission resource pool of the first BWP, and a frequency range of the transmission resource pool of the first BWP is included in the frequency range of the first BWP and the frequency range of the second BWP.

With reference to the first aspect, in a fourth implementation of the first aspect, the method further includes: reporting information about a bandwidth capability, where the bandwidth capability includes a transmit bandwidth capability and a receive bandwidth capability.

Optionally, a bandwidth of the first BWP is less than or equal to a maximum value in the transmit bandwidth capability of the terminal and the receive bandwidth capability of the terminal; or a bandwidth of the first BWP is less than or equal to a minimum value in the transmit bandwidth capability of the terminal and the receive bandwidth capability of the terminal; or a bandwidth of the first BWP is less than or equal to the receive bandwidth capability of the terminal.

It can be understood that a BWP is a segment of bandwidth in a carrier, and a bandwidth of the BWP may be less than or equal to a bandwidth supported by the bandwidth capability of the terminal. The bandwidth supported by the bandwidth capability of the terminal may be less than or equal to a carrier bandwidth (BW). When the base station configures a BWP for the terminal, different bandwidths may be configured for different BWPs, and frequency domain resources of two BWPs may overlap.

With reference to the first aspect, in a fifth implementation of the first aspect, frequency centers of the first BWP and the second BWP are equal.

It can be understood that the frequency center herein may be referred to as a center frequency, a center carrier frequency, or a carrier frequency center.

With reference to the first aspect, in a sixth implementation of the first aspect, the method further includes: sending uplink data on the second BWP.

According to a second aspect, a communications method is provided. The method includes: sending first configuration information, where the first configuration information is used to configure a first bandwidth part BWP; and sending first indication information, where the first indication information is used to indicate a sidelink resource, the sidelink resource is included in a first transmission resource pool, a frequency range of the first transmission resource pool is included in a frequency range of the first BWP and a frequency range of a second BWP, and the second BWP is an activated uplink BWP.

In this embodiment of this application, a base station may configure an SL BWP and a UL BWP for a terminal, and the SL BWP and the UL BWP may overlap in frequency domain. The base station may activate one or more of UL BWPs configured for UE 1, and the UE 1 may send uplink data (the uplink data may be carried on an uplink shared channel and/or an uplink control channel) to the base station on the activated UL BWP, and send sidelink data to UE 2 on an SL BWP.

Because the frequency range of the first transmission resource pool is included in a frequency range of a currently activated UL BWP and a frequency range of an SL BWP, sending of uplink data is not affected when the user equipment sends sidelink data in the first transmission resource pool. This implements transmit radio frequency sharing between the SL BWP and the UL BWP, and improves sidelink data transmission efficiency. In addition, this can further reduce a time of switching between the UL BWP and the SL BWP.

Optionally, the first indication information may be downlink control information DCI, sidelink control information SCI, or radio resource control information.

With reference to the second aspect, in a first implementation of the second aspect, the first configuration information includes a configuration of a transmission resource pool of the first BWP, and a frequency range of the transmission resource pool of the first BWP is included in the frequency range of the first BWP.

With reference to the second aspect, in a second implementation of the second aspect, the first configuration information includes a configuration of a transmission resource pool of the first BWP, and a frequency range of the transmission resource pool of the first BWP is included in the frequency range of the first BWP and the frequency range of the second BWP.

With reference to the second aspect, in a third implementation of the second aspect, the method further includes: obtaining information about a bandwidth capability, where the bandwidth capability includes a transmit bandwidth capability and a receive bandwidth capability.

Optionally, a bandwidth of the first BWP is less than or equal to a maximum value in the transmit bandwidth capability of the terminal and the receive bandwidth capability of the terminal; or a bandwidth of the first BWP is less than or equal to a minimum value in the transmit bandwidth capability of the terminal and the receive bandwidth capability of the terminal; or a bandwidth of the first BWP is less than or equal to the receive bandwidth capability of the terminal.

With reference to the second aspect, in a fourth implementation of the second aspect, frequency centers of the first BWP and the second BWP are equal.

With reference to the second aspect, in a fifth implementation of the second aspect, the method further includes: sending second indication information, where the second indication information is used to indicate an uplink resource, and the second BWP includes the uplink resource.

According to a third aspect, a communications method is provided. The method includes: receiving first configuration information, where the first configuration information is used to configure a first bandwidth part BWP; and sending sidelink data on a resource included in a first transmission resource pool, where frequency centers of the first BWP and a second BWP are equal, and the second BWP is an activated uplink BWP. Optionally, a frequency range of the first transmission resource pool is included in a frequency range of the first BWP and a frequency range of the second BWP. That the frequency centers of the first BWP and the second BWP are equal may mean that the frequency center of the first BWP is equal to the frequency center of the second BWP, or the frequency center of the first BWP is approximately equal to the frequency center of the second BWP (for example, a difference between the frequency center of the first BWP and the frequency center of the second BWP is within a predefined or configured error range).

It can be understood that the frequency center herein may be referred to as a center frequency, a center carrier frequency, or a carrier frequency center. The first BWP may also be referred to as an SL BWP.

In this embodiment of this application, a base station may configure an SL BWP and a UL BWP for a terminal, and frequency centers of the SL BWP and the UL BWP are equal. The base station may activate one or more of UL BWPs configured for UE 1, and the UE 1 may send uplink data (the uplink data may be carried on an uplink shared channel and/or an uplink control channel) to the base station on the activated UL BWP, and send sidelink data to UE 2 on an SL BWP.

Because the frequency range of the first transmission resource pool is included in a frequency range of a currently activated UL BWP, and a frequency center of the currently activated UL BWP is equal to a frequency center of an SL BWP, sending of uplink data is not affected when user equipment sends sidelink data in the first transmission resource pool. This implements transmit radio frequency sharing between the SL BWP and the UL BWP, and improves sidelink data transmission efficiency. In addition, this can further reduce a time of switching between the UL BWP and the SL BWP.

With reference to the third aspect, in a first implementation of the third aspect, the method further includes: receiving first indication information, where the first indication information is used to indicate a sidelink resource, and the sidelink resource is included in the first transmission resource pool.

With reference to the third aspect, in a second implementation of the third aspect, the first configuration information includes a configuration of a transmission resource pool of the first BWP, and a frequency range of the transmission resource pool of the first BWP is included in the frequency range of the first BWP.

With reference to the third aspect, in a third implementation of the third aspect, the first configuration information includes a configuration of a transmission resource pool of the first BWP, and a frequency range of the transmission resource pool of the first BWP is included in the frequency range of the first BWP and the frequency range of the second BWP.

With reference to the third aspect, in a fourth implementation of the third aspect, the method further includes: reporting information about a bandwidth capability, where the bandwidth capability includes a transmit bandwidth capability and a receive bandwidth capability.

Optionally, a bandwidth of the first BWP is less than or equal to a maximum value in the transmit bandwidth capability of the terminal and the receive bandwidth capability of the terminal; or a bandwidth of the first BWP is less than or equal to a minimum value in the transmit bandwidth capability of the terminal and the receive bandwidth capability of the terminal; or a bandwidth of the first BWP is less than or equal to the receive bandwidth capability of the terminal.

It can be understood that a BWP is a segment of bandwidth in a carrier, and a bandwidth of the BWP may be less than or equal to a bandwidth supported by the bandwidth capability of the terminal. The bandwidth supported by the bandwidth capability of the terminal may be less than or equal to a carrier bandwidth (BW). When the base station configures a BWP for the terminal, different bandwidths may be configured for different BWPs, and frequency domain resources of two BWPs may overlap.

With reference to the third aspect, in a fifth implementation of the third aspect, the method further includes: sending uplink data on the second BWP.

According to a fourth aspect, a communications method is provided. The method includes: sending first configuration information, where the first configuration information is used to configure a first bandwidth part BWP; and sending first indication information, where the first indication information is used to indicate a sidelink resource, the sidelink resource is included in a first transmission resource pool, a frequency range of the first transmission resource pool is included in a frequency range of the first BWP, frequency centers of the first BWP and a second BWP are equal, and the second BWP is an activated uplink BWP. Optionally, the frequency range of the first transmission resource pool is included in the frequency range of the first BWP and a frequency range of the second BWP. That the frequency centers of the first BWP and the second BWP are equal may mean that the frequency center of the first BWP is equal to the frequency center of the second BWP, or the frequency center of the first BWP is approximately equal to the frequency center of the second BWP (for example, a difference between the frequency center of the first BWP and the frequency center of the second BWP is within a predefined or configured error range).

It can be understood that the frequency center herein may be referred to as a center frequency, a center carrier frequency, or a carrier frequency center. The first BWP may also be referred to as an SL BWP.

Optionally, the first indication information may be sidelink control information SCI, or radio resource control information.

In this embodiment of this application, a base station may configure an SL BWP and a UL BWP for a terminal, and frequency centers of the SL BWP and the UL BWP are equal. The base station may activate one or more of UL BWPs configured for UE 1, and the UE 1 may send uplink data (the uplink data may be carried on an uplink shared channel and/or an uplink control channel) to the base station on the activated UL BWP, and send sidelink data to UE 2 on an SL BWP.

Because the frequency range of the first transmission resource pool is included in a frequency range of a currently activated UL BWP, and a frequency center of the currently activated UL BWP is equal to a frequency center of an SL BWP, sending of uplink data is not affected when user equipment sends sidelink data in the first transmission resource pool. This implements transmit radio frequency sharing between the SL BWP and the UL BWP, and improves sidelink data transmission efficiency. In addition, this can further reduce a time of switching between the UL BWP and the SL BWP.

With reference to the fourth aspect, in a first implementation of the fourth aspect, the first configuration information includes a configuration of a transmission resource pool of the first BWP, and a frequency range of the transmission resource pool of the first BWP is included in the frequency range of the first BWP.

With reference to the fourth aspect, in a second implementation of the fourth aspect, the first configuration information includes a configuration of a transmission resource pool of the first BWP, and a frequency range of the transmission resource pool of the first BWP is included in the frequency range of the first BWP and the frequency range of the second BWP.

With reference to the fourth aspect, in a third implementation of the fourth aspect, the method further includes: obtaining information about a bandwidth capability, where the bandwidth capability includes a transmit bandwidth capability and a receive bandwidth capability.

Optionally, a bandwidth of the first BWP is less than or equal to a maximum value in the transmit bandwidth capability of the terminal and the receive bandwidth capability of the terminal; or a bandwidth of the first BWP is less than or equal to a minimum value in the transmit bandwidth capability of the terminal and the receive bandwidth capability of the terminal; or a bandwidth of the first BWP is less than or equal to the receive bandwidth capability of the terminal.

With reference to the fourth aspect, in a fourth implementation of the fourth aspect, the method further includes: sending second indication information, where the second indication information is used to indicate an uplink resource, and the second BWP includes the uplink resource.

Optionally, the first indication information may be downlink control information DCI, or radio resource control information.

According to a fifth aspect, this application provides a communications method. The method may be performed by a terminal. The method includes: receiving configuration information A, where the configuration information A is used to configure an SL BWP; and determining a delay of switching between uplink transmission and sidelink transmission based on a UL BWP and the SL BWP. The delay of switching between uplink transmission and sidelink transmission may be understood as a delay of switching from uplink transmission to sidelink transmission, or may be understood as a delay of switching from sidelink transmission to uplink transmission. Optionally, the method may further include: receiving configuration information B, where the configuration information B is used to configure the UL BWP.

According to the method, the terminal can determine the delay of switching between uplink transmission and sidelink transmission. This can implement transmission of uplink data and sidelink data in time, and reduce a data transmission delay. In addition, this can also prevent a resource waste caused by an unclear switching delay.

With reference to the fifth aspect, in some implementations of the fifth aspect, the determining a delay of switching between uplink transmission and sidelink transmission based on a UL BWP and the SL BWP is specifically: determining the delay of switching between uplink transmission and sidelink transmission based on a relationship between a transmit radio frequency of the UL BWP and a transmit radio frequency of the SL BWP. Optionally, the delay of switching between uplink transmission and sidelink transmission is determined to be zero based on that the transmit radio frequency of the UL BWP and the transmit radio frequency of the SL BWP are independent transmit radio frequencies. According to this implementation, the delay of switching between uplink transmission and sidelink transmission may be determined to be zero based on that the transmit radio frequency of the UL BWP and the transmit radio frequency of the SL BWP are independent transmit radio frequencies. This can implement transmission of uplink data and sidelink data in time, and reduce a data transmission delay. In addition, this can also prevent a resource waste caused by an unclear switching delay.

With reference to the fifth aspect, in some implementations of the fifth aspect, the determining a delay of switching between uplink transmission and sidelink transmission based on a UL BWP and the SL BWP is specifically: determining the delay of switching between uplink transmission and sidelink transmission based on a frame structure parameter and a relationship between a transmit radio frequency of the UL BWP and a transmit radio frequency of the SL BWP. Optionally, the delay of switching between uplink transmission and sidelink transmission is determined to be zero based on that the transmit radio frequency of the UL BWP and the transmit radio frequency of the SL BWP are independent transmit radio frequencies and a frame structure parameter of the UL BWP is the same as a frame structure parameter of the SL BWP. According to this implementation, the delay of switching between uplink transmission and sidelink transmission may be determined to be zero based on that the transmit radio frequency of the UL BWP and the transmit radio frequency of the SL BWP are independent transmit radio frequencies and the frame structure parameter of the UL BWP is the same as the frame structure parameter of the SL BWP. This can implement transmission of uplink data and sidelink data in time, and reduce a data transmission delay. In addition, this can also prevent a resource waste caused by an unclear switching delay.

With reference to the fifth aspect, in some implementations of the fifth aspect, the determining a delay of switching between uplink transmission and sidelink transmission based on a UL BWP and the SL BWP is specifically: determining the delay of switching between uplink transmission and sidelink transmission based on a relationship between a bandwidth for the UL BWP and the SL BWP and a radio frequency bandwidth. According to this implementation, the delay of switching between uplink transmission and sidelink transmission may be determined to be zero based on the relationship between the bandwidth for the UL BWP and the SL BWP and the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a size of the bandwidth for the UL BWP and the SL BWP and a size of the radio frequency bandwidth. In a possible implementation, the delay of switching between uplink transmission and sidelink transmission is determined to be zero based on that the size of the bandwidth for the UL BWP and the SL BWP is less than or equal to the size of the radio frequency bandwidth. According to the method, the delay of switching between uplink transmission and sidelink transmission may be determined to be zero based on the relationship between the size of the bandwidth for the UL BWP and the SL BWP and the size of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of the bandwidth for the UL BWP and the SL BWP and a position of the radio frequency bandwidth. In a possible implementation, the delay of switching between uplink transmission and sidelink transmission is determined to be zero based on that the bandwidth for the UL BWP and the SL BWP is within the radio frequency bandwidth. According to the method, the delay of switching between uplink transmission and sidelink transmission may be determined to be zero based on the relationship between the position of the bandwidth for the UL BWP and the SL BWP and the position of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a size of a bandwidth of a resource pool in the UL BWP and the SL BWP and a size of the radio frequency bandwidth. In a possible implementation, the delay of switching between uplink transmission and sidelink transmission is determined to be zero based on that the size of the bandwidth of the resource pool in the UL BWP and the SL BWP is less than or equal to the size of the radio frequency bandwidth; or the delay of switching between uplink transmission and sidelink transmission is determined to be zero based on that a size of a bandwidth of a transmission resource pool in the UL BWP and the SL BWP is less than or equal to the size of the radio frequency bandwidth. According to the method, the delay of switching between uplink transmission and sidelink transmission may be determined to be zero based on the relationship between the size of the bandwidth of the resource pool in the UL BWP and the SL BWP and the size of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of a bandwidth of a resource pool in the UL BWP and the SL BWP and a position of the radio frequency bandwidth. In a possible implementation, the delay of switching between uplink transmission and sidelink transmission is determined to be zero based on that the bandwidth of the resource pool in the UL BWP and the SL BWP is within the radio frequency bandwidth; or the delay of switching between uplink transmission and sidelink transmission is determined to be zero based on that a bandwidth of a transmission resource pool in the UL BWP and the SL BWP is within the radio frequency bandwidth. According to the method, the delay of switching between uplink transmission and sidelink transmission may be determined to be zero based on the relationship between the position of the bandwidth of the resource pool in the UL BWP and the SL BWP and the position of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of the UL BWP and a position of a resource pool in the SL BWP. In a possible implementation, the delay of switching between uplink transmission and sidelink transmission is determined to be zero based on that the UL BWP includes the resource pool in the SL BWP; or the delay of switching between uplink transmission and sidelink transmission is determined to be zero based on that the resource pool in the SL BWP is located in a bandwidth of the UL BWP; or the delay of switching between uplink transmission and sidelink transmission is determined to be zero based on that the UL BWP includes a transmission resource pool in the SL BWP; or the delay of switching between uplink transmission and sidelink transmission is determined to be zero based on that a transmission resource pool in the SL BWP is located in a bandwidth of the UL BWP. According to the method, the delay of switching between uplink transmission and sidelink transmission may be determined to be zero based on the relationship between the position of the UL BWP and the position of the resource pool in the SL BWP. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of a center carrier frequency of the UL BWP and a position of a center carrier frequency of the SL BWP. In a possible implementation, the delay of switching between uplink transmission and sidelink transmission is determined to be zero based on that the position of the center carrier frequency of the UL BWP is the same as the position of the center carrier frequency of the SL BWP; or the delay of switching between uplink transmission and sidelink transmission is determined to be zero based on that a bandwidth of a frequency domain resource between the position of the center carrier frequency of the UL BWP and the position of the center carrier frequency of the SL BWP is less than or equal to a spacing threshold. According to the method, the delay of switching between uplink transmission and sidelink transmission may be determined to be zero based on the relationship between the position of the center carrier frequency of the UL BWP and the position of the center carrier frequency of the SL BWP. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of the UL BWP and a position of the SL BWP. In a possible implementation, the delay of switching between uplink transmission and sidelink transmission is determined to be zero based on that a bandwidth of the UL BWP includes a bandwidth of the SL BWP; or the delay of switching between uplink transmission and sidelink transmission is determined to be zero based on that a bandwidth of the SL BWP includes a bandwidth of the UL BWP. According to the method, the delay of switching between uplink transmission and sidelink transmission may be determined to be zero based on the relationship between the position of the UL BWP and the position of the SL BWP. This can implement transmission of uplink data and sidelink data in time, and reduce a data transmission delay. In addition, this can also prevent a resource waste caused by an unclear switching delay.

According to a sixth aspect, this application provides a communications method. The method may be performed by a network device. The method includes: sending configuration information A, where the configuration information A is used to configure an SL BWP; and determining a delay of switching between uplink transmission and sidelink transmission based on a UL BWP and the SL BWP. The delay of switching between uplink transmission and sidelink transmission may be understood as a delay of switching from uplink transmission to sidelink transmission, or may be understood as a delay of switching from sidelink transmission to uplink transmission. Optionally, the method may further include: sending configuration information B, where the configuration information B is used to configure the UL BWP.

According to the method, the network device can determine the delay of switching between uplink transmission and sidelink transmission performed by a terminal. This can implement scheduling of uplink data and sidelink data in time, and reduce a data transmission delay. In addition, this can also prevent a resource waste caused by an unclear switching delay.

With reference to the sixth aspect, in some implementations of the sixth aspect, the determining a delay of switching between uplink transmission and sidelink transmission based on a UL BWP and the SL BWP is specifically: determining the delay of switching between uplink transmission and sidelink transmission based on a relationship between a transmit radio frequency of the UL BWP and a transmit radio frequency of the SL BWP. Optionally, the delay of switching between uplink transmission and sidelink transmission is determined to be zero based on that the transmit radio frequency of the UL BWP and the transmit radio frequency of the SL BWP are independent transmit radio frequencies. According to this implementation, the delay of switching between uplink transmission and sidelink transmission may be determined to be zero based on that the transmit radio frequency of the UL BWP and the transmit radio frequency of the SL BWP are independent transmit radio frequencies. This can implement transmission of uplink data and sidelink data in time, and reduce a data transmission delay. In addition, this can also prevent a resource waste caused by an unclear switching delay.

With reference to the sixth aspect, in some implementations of the sixth aspect, the determining a delay of switching between uplink transmission and sidelink transmission based on a UL BWP and the SL BWP is specifically: determining the delay of switching between uplink transmission and sidelink transmission based on a frame structure parameter and a relationship between a transmit radio frequency of the UL BWP and a transmit radio frequency of the SL BWP. Optionally, the delay of switching between uplink transmission and sidelink transmission is determined to be zero based on that the transmit radio frequency of the UL BWP and the transmit radio frequency of the SL BWP are independent transmit radio frequencies and a frame structure parameter of the UL BWP is the same as a frame structure parameter of the SL BWP. According to this implementation, the delay of switching between uplink transmission and sidelink transmission may be determined to be zero based on that the transmit radio frequency of the UL BWP and the transmit radio frequency of the SL BWP are independent transmit radio frequencies and the frame structure parameter of the UL BWP is the same as the frame structure parameter of the SL BWP. This can implement transmission of uplink data and sidelink data in time, and reduce a data transmission delay. In addition, this can also prevent a resource waste caused by an unclear switching delay.

With reference to the sixth aspect, in some implementations of the sixth aspect, the determining a delay of switching between uplink transmission and sidelink transmission based on a UL BWP and the SL BWP is specifically: determining the delay of switching between uplink transmission and sidelink transmission based on a relationship between a bandwidth for the UL BWP and the SL BWP and a radio frequency bandwidth. According to this implementation, the delay of switching between uplink transmission and sidelink transmission may be determined to be zero based on the relationship between the bandwidth for the UL BWP and the SL BWP and the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a size of the bandwidth for the UL BWP and the SL BWP and a size of the radio frequency bandwidth. In a possible implementation, the delay of switching between uplink transmission and sidelink transmission is determined to be zero based on that the size of the bandwidth for the UL BWP and the SL BWP is less than or equal to the size of the radio frequency bandwidth. According to the method, the delay of switching between uplink transmission and sidelink transmission may be determined to be zero based on the relationship between the size of the bandwidth for the UL BWP and the SL BWP and the size of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of the bandwidth for the UL BWP and the SL BWP and a position of the radio frequency bandwidth. In a possible implementation, the delay of switching between uplink transmission and sidelink transmission is determined to be zero based on that the bandwidth for the UL BWP and the SL BWP is within the radio frequency bandwidth. According to the method, the delay of switching between uplink transmission and sidelink transmission may be determined to be zero based on the relationship between the position of the bandwidth for the UL BWP and the SL BWP and the position of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a size of a bandwidth of a resource pool in the UL BWP and the SL BWP and a size of the radio frequency bandwidth. In a possible implementation, the delay of switching between uplink transmission and sidelink transmission is determined to be zero based on that the size of the bandwidth of the resource pool in the UL BWP and the SL BWP is less than or equal to the size of the radio frequency bandwidth; or the delay of switching between uplink transmission and sidelink transmission is determined to be zero based on that a size of a bandwidth of a transmission resource pool in the UL BWP and the SL BWP is less than or equal to the size of the radio frequency bandwidth. According to the method, the delay of switching between uplink transmission and sidelink transmission may be determined to be zero based on the relationship between the size of the bandwidth of the resource pool in the UL BWP and the SL BWP and the size of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of a bandwidth of a resource pool in the UL BWP and the SL BWP and a position of the radio frequency bandwidth. In a possible implementation, the delay of switching between uplink transmission and sidelink transmission is determined to be zero based on that the bandwidth of the resource pool in the UL BWP and the SL BWP is within the radio frequency bandwidth; or the delay of switching between uplink transmission and sidelink transmission is determined to be zero based on that a bandwidth of a transmission resource pool in the UL BWP and the SL BWP is within the radio frequency bandwidth. According to the method, the delay of switching between uplink transmission and sidelink transmission may be determined to be zero based on the relationship between the position of the bandwidth of the resource pool in the UL BWP and the SL BWP and the position of the radio frequency bandwidth. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of the UL BWP and a position of a resource pool in the SL BWP. In a possible implementation, the delay of switching between uplink transmission and sidelink transmission is determined to be zero based on that the UL BWP includes the resource pool in the SL BWP; or the delay of switching between uplink transmission and sidelink transmission is determined to be zero based on that the resource pool in the SL BWP is located in a bandwidth of the UL BWP; or the delay of switching between uplink transmission and sidelink transmission is determined to be zero based on that the UL BWP includes a transmission resource pool in the SL BWP; or the delay of switching between uplink transmission and sidelink transmission is determined to be zero based on that a transmission resource pool in the SL BWP is located in a bandwidth of the UL BWP. According to the method, the delay of switching between uplink transmission and sidelink transmission may be determined to be zero based on the relationship between the position of the UL BWP and the position of the resource pool in the SL BWP. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of a center carrier frequency of the UL BWP and a position of a center carrier frequency of the SL BWP. In a possible implementation, the delay of switching between uplink transmission and sidelink transmission is determined to be zero based on that the position of the center carrier frequency of the UL BWP is the same as the position of the center carrier frequency of the SL BWP; or the delay of switching between uplink transmission and sidelink transmission is determined to be zero based on that a bandwidth of a frequency domain resource between the position of the center carrier frequency of the UL BWP and the position of the center carrier frequency of the SL BWP is less than or equal to a spacing threshold. According to the method, the delay of switching between uplink transmission and sidelink transmission may be determined to be zero based on the relationship between the position of the center carrier frequency of the UL BWP and the position of the center carrier frequency of the SL BWP. This can implement transmission of uplink data and sidelink data in time, and reduce a data transmission delay. In addition, this can also prevent a resource waste caused by an unclear switching delay.

Optionally, the time of switching between uplink transmission and sidelink transmission is determined based on a relationship between a position of the UL BWP and a position of the SL BWP. In a possible implementation, the delay of switching between uplink transmission and sidelink transmission is determined to be zero based on that a bandwidth of the UL BWP includes a bandwidth of the SL BWP; or the delay of switching between uplink transmission and sidelink transmission is determined to be zero based on that a bandwidth of the SL BWP includes a bandwidth of the UL BWP. According to the method, the delay of switching between uplink transmission and sidelink transmission may be determined to be zero based on the relationship between the position of the UL BWP and the position of the SL BWP. This can implement transmission of uplink data and sidelink data in time, and reduce a data transmission delay. In addition, this can also prevent a resource waste caused by an unclear switching delay.

According to a seventh aspect, this application provides a communications apparatus, to implement one or more corresponding functions in the first aspect, the third aspect, or the fifth aspect. The communications apparatus includes a corresponding unit or component configured to perform the foregoing method. The unit included in the communications apparatus may be implemented by using software and/or hardware. The communications apparatus may be, for example, a terminal, or a chip, a chip system, or a processor that can support the terminal in implementing the foregoing functions.

According to an eighth aspect, this application provides a communications apparatus, to implement one or more corresponding functions in the second aspect, the fourth aspect, or the sixth aspect. The communications apparatus includes a corresponding unit or component configured to perform the foregoing method. The unit included in the communications apparatus may be implemented by using software and/or hardware. The communications apparatus may be, for example, a base station, or a chip, a chip system, or a processor that can support the base station in implementing the foregoing functions.

According to a ninth aspect, this application provides a storage medium. The storage medium stores a computer program, and when the computer program is executed by a processor, the method according to at least one of the first aspect to the sixth aspect is performed.

According to a tenth aspect, this application provides a chip system. The chip system includes a processor, configured to perform the method according to at least one of the first aspect to the sixth aspect.

According to an eleventh aspect, this application provides a communications apparatus. The communications apparatus includes a processor. The processor is coupled to a memory, the memory is configured to store a program, and when the program is executed by the processor, the communications apparatus is enabled to implement the method according to at least one of the first aspect to the sixth aspect.

The communications apparatus may be, for example, a terminal, a network device (for example, a base station), or a chip, a chip system, or a processor that can support the terminal or the network device in implementing the foregoing functions.

According to a twelfth aspect, this application provides a communications system. The communications system includes the communications apparatus according to the seventh aspect and the communications apparatus according to the eighth aspect.

Because the frequency range of the first transmission resource pool is included in a frequency range of a currently activated UL BWP and a frequency range of an SL BWP, sending of uplink data is not affected when user equipment sends sidelink data in the first transmission resource pool. This implements transmit radio frequency sharing between the SL BWP and the UL BWP, and improves sidelink data transmission efficiency. In addition, this can further reduce a time of switching between the UL BWP and the SL BWP.

BRIEF DESCRIPTION OF DRAWINGS

FIG. 19(*a*) and FIG. 19(*b*) are a schematic diagram of another bandwidth part according to an embodiment of this application;

FIG. 20 is a schematic structural diagram of a communications apparatus according to an embodiment of this application;

DESCRIPTION OF EMBODIMENTS

Figure 1:
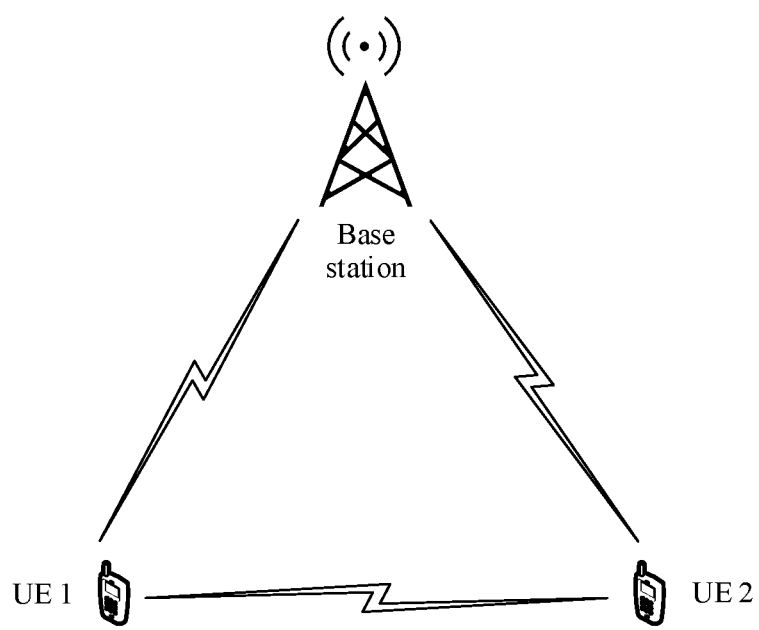
FIG. 1 is a schematic diagram of a communications system that is used according to an embodiment of this application.

The following describes technical solutions of this application with reference to the accompanying drawings.

The technical solutions of the embodiments of this application may be applied to various communications systems, for example, a global system for mobile communications (global system of mobile communication, GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

By way of example and not limitation, a terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal may be a station (ST) in a WLAN, or may be a cellular phone, a cordless telephone set, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, or a next-generation communications system, for example, a terminal in a 5G network or a terminal in a future evolved public land mobile network (PLMN).

In the embodiments of this application, a network device may include an access network device or a core network device.

The access network device may be a device configured to communicate with a mobile device. For example, the access network device may be an access point (AP) in a WLAN, a base transceiver station (BTS) in GSM or CDMA, a NodeB (NB) in WCDMA, a gNB in a new radio (NR) system, an evolved NodeB (evolutional node B, eNB or eNodeB) in LTE, a relay station or an access point, a vehicle-mounted device, a wearable device, an access network device in a future 5G network, or an access network device in a future evolved PLMN.

In addition, in the embodiments of this application, the access network device serves a cell. The terminal communicates with the access network device by using a transmission resource (for example, a frequency domain resource or a spectrum resource) used by the cell. The cell may be a cell corresponding to the access network device (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are configured to provide a high-rate data transmission service.

It can be understood that the transmission resource in the embodiments of this application may also be referred to as a physical resource. The physical resource may include one or more of a time domain resource, a frequency domain resource, a code domain resource, or a space domain resource. For example, the time domain resource included in the physical resource may include at least one frame, at least one subframe (sub-frame), at least one slot, at least one mini-slot, or at least one time domain symbol. For example, the frequency domain resource included in the physical resource may include at least one carrier, at least one component carrier (CC), at least one bandwidth part (BWP), at least one resource block group (RBG), at least one physical resource block (PRB), or at least one subcarrier (sub-carrier, SC). For example, the space domain resource included in the physical resource may include at least one beam, at least one port, at least one antenna port, or at least one layer/space layer. For example, the code domain resource included in the physical resource may include at least one orthogonal cover code (OCC) or at least one non-orthogonal multiple access (NOMA) code.

In the embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal, a network device, or a function module that is in the terminal or the network device and that can invoke and execute the program.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

For ease of understanding of the embodiments of this application, some concepts or terms used in this application are first briefly described.

Bandwidth Part (BWP)

The BWP includes several RBs that are contiguous in frequency domain. A network device configures and activates a BWP for UE, and the UE sends and receives data on the activated BWP. For a downlink BWP, a size of the BWP is less than or equal to a size of a receive radio frequency of a terminal. For an uplink BWP, a size of the BWP is less than or equal to a size of a transmit radio frequency of a terminal. A resource of one BWP is located in one carrier resource. A BWP configured on a sidelink carrier is an SL BWP, a BWP configured on an uplink carrier is an uplink BWP, and a BWP configured on a downlink carrier is a downlink BWP.

To adapt to a bandwidth capability of the terminal device, a BWP may be configured for the terminal device in a bandwidth supported by one carrier. The carrier bandwidth may be 10 MHz, 15 MHz, 20 MHz, 50 MHz, 100 MHz, 400 MHz, or the like. One or more BWPs may be configured on one carrier. For example, four BWPs may be configured on one carrier. The BWP may also be referred to as a carrier bandwidth part, a subband bandwidth, or a narrowband bandwidth. For example, one BWP includes K (K>0) subcarriers. Alternatively, one BWP is a frequency domain resource on which N non-overlapping RBs are located, and a subcarrier spacing of the RBs may be 15 kHz, 30 kHz, 60 kHz, 120 kHz, 240 kHz, 480 kHz, or another value. Alternatively, one BWP is a frequency domain resource on which M non-overlapping resource block groups (RBG) are located. For example, one RBG includes P (P>0) contiguous RBs, and a subcarrier spacing (SCS) of the RBs may be 15 kHz, 30 kHz, 60 kHz, 120 kHz, 240 kHz, or 480 kHz.

It can be understood that a BWP is a segment of bandwidth in a carrier, and a bandwidth of the BWP may be less than or equal to a bandwidth supported by the bandwidth capability of the terminal. The bandwidth supported by the bandwidth capability of the terminal may be less than or equal to a carrier bandwidth (BW). When the base station configures a BWP for the terminal, different bandwidths may be configured for different BWPs, and frequency domain resources of two BWPs may overlap or may not overlap. When the base station configures a BWP for the terminal, a frame structure parameter (numerology) may be configured for the BWP.

The frame structure parameter (numerology) is a parameter used by a communications system, for example, may be a series of physical layer parameters on an air interface. One BWP may correspond to one numerology. The communications system may support a plurality of numerologies, and the plurality of numerologies may be configured at the same time. The numerology may include one or more of the following parameter information: a subcarrier spacing, information about a cyclic prefix (CP), information about a time unit, a bandwidth, and the like. The information about the CP may include a CP length and/or a CP type. For example, the CP may be a normal CP (NCP) or an extended CP (ECP). The time unit is used to indicate a time unit in time domain, for example, may be a sampling point, a symbol, a mini-slot, a slot, a subframe, or a radio frame. The information about the time unit may include a type, a length, a structure, or the like of the time unit. For example, the numerology may include a subcarrier spacing and a CP. Table 1 shows an example of a numerology that can be supported in an NR system and that is defined by a subcarrier spacing and a CP.

TABLE 1

| μ | Subcarrier spacing = $2^\mu \cdot 15$ (kHz) | CP type |
|---|---|---|
| 0 | 15 | Normal |
| 1 | 30 | Normal |
| 2 | 60 | Normal or extended |
| 3 | 120 | Normal |
| 4 | 240 | Normal |

2. Uu Air Interface Communication

A Uu air interface is used for communication between a terminal device and an access network device, and the Uu air interface may also be referred to as Uu for short. In the Uu air interface communication, a channel on which the access network device sends information to the terminal device is referred to as a downlink (DL) channel, and the downlink channel may include at least one of a physical downlink data channel (PDSCH) and a physical downlink control channel (PDCCH). The PDCCH is used to carry downlink control information (DCI). The PDSCH is used to carry downlink data. A channel on which the terminal device sends information to the access network device is referred to as an uplink (UL) channel, and the uplink channel may include at least one of a physical uplink data channel (physical uplink shared channel, PUSCH) and a physical uplink control channel (PUCCH). The PUSCH is used to carry uplink data. The uplink data may also be referred to as uplink data information. The PUCCH is used to carry uplink control information (UCI) fed back by the terminal device. For example, the UCI may include channel state information (CSI), an ACK, and/or a NACK fed back by the terminal device. Transmission over the Uu air interface may include uplink transmission and downlink transmission. The uplink transmission means that the terminal device sends information to the access network device, and the downlink transmission means that the access network device sends information to the terminal device. The information in the uplink transmission may be uplink information or an uplink signal. The uplink information or the uplink signal may include at least one of a PUSCH, a PUCCH, and a sounding reference signal (SRS). The information in the downlink transmission may be downlink information or a downlink signal. The downlink information or the downlink signal may include at least one of a PDSCH, a PDCCH, a channel state information reference signal (, CSI-RS), and a phase tracking reference signal (PTRS).

3. Sidelink Communication

The sidelink (SL) communication is used for communication between terminals.

An SL transmission channel may be carried on an uplink carrier. The uplink carrier may be an uplink carrier on which a network device communicates with a terminal, or may be an independent carrier.

It should be understood that a sidelink (SL) may also be referred to as a bylink or a secondary link. During the sidelink communication, a physical sidelink shared channel and a physical sidelink control channel may be used. The physical sidelink shared channel (PSSCH) is used to carry data, and the physical sidelink control channel (PSCCH) is used to carry scheduling information (SCI). Information in the SCI may also be referred to as scheduling assignment (SA). The SA includes related data scheduling information, such as PSSCH resource allocation and a modulation and coding scheme. The PSSCH and the PSCCH may be channels on which a transmit end terminal (for example, a terminal 1) sends information to a receive end terminal (a terminal 2).

Mode #1: Base Station Scheduling Mode

In the base station scheduling mode, a network device 1 may configure a sidelink BWP for transmit end UE and/or receive end UE by using configuration information. The sidelink BWP includes a transmission resource pool of the sidelink BWP and a receiving resource pool of the sidelink BWP. A network device 2 indicates a resource used for sidelink communication in the sidelink BWP to the transmit end UE by using indication information. The transmit end UE (UE 1) determines, based on the indication information, a resource used to send sidelink data, to send sidelink information to the receive end UE (UE 2).

By way of example and not limitation, the network device 1 and the network device 2 each may be an access network device (for example, a base station), a network management system operated by an operator, or the like.

Mode 2: UE-Aware Mode

In the UE-aware mode, a network device may configure a sidelink BWP for transmit end UE and/or receive end UE by using configuration information. The sidelink BWP includes a transmission resource pool of the sidelink BWP and a receiving resource pool of the sidelink BWP. The transmit end UE (UE 1) perceives a resource used to send sidelink data in the sidelink BWP, to send sidelink information. The receive end UE (UE 2) receives the sidelink information in the receiving resource pool of the sidelink BWP.

When a sidelink carrier and an uplink carrier of a terminal are a same carrier, an SL BWP and a UL BWP are configured on the carrier, and the terminal respectively sends sidelink data and uplink data on the SL BWP and the UL BWP. If the terminal has only one transmit radio frequency, the SL BWP and the UL BWP may not share the transmit radio frequency, and a time of switching between the SL BWP and the UL BWP may be prolonged.

A relationship between a frequency domain position of an SL BWP and a frequency domain position of a currently activated UL BWP of a terminal includes: A center of the SL BWP and a center of the currently activated UL BWP are aligned in frequency domain, and are not aligned in frequency domain. For an asymmetric spectrum, a DL BWP and a UL BWP with a same BWP index constitute a BWP pair, and a center frequency domain position of the DL BWP and a center frequency domain position of the UL BWP need to be aligned in frequency domain. For a symmetric spectrum, a center frequency domain position of a DL BWP and a center frequency domain position of a UL BWP do not need to be aligned in frequency domain.

Case #1: For an asymmetric spectrum, an SL BWP and a UL BWP share one transmit radio frequency. When UE simultaneously sends sidelink data and uplink data on the SL BWP and the UL BWP, if a center of the SL BWP and a center of the UL BWP are not aligned in frequency domain, the SL BWP and the UL BWP share the transmit radio frequency, and a center of the transmit radio frequency needs to be moved, so that a transmit bandwidth can entirely cover the SL BWP and the UL BWP. Consequently, the center of the transmit radio frequency is not aligned with a center of the DL BWP, and a time of switching between the UL BWP and the DL BWP is prolonged.

Case #2: For an asymmetric spectrum, an SL BWP and a UL BWP share one transmit radio frequency. When UE sends sidelink data and uplink data on the SL BWP and the UL BWP at different time, if a center of the SL BWP and a center of the UL BWP are not aligned in frequency domain, and if a terminal does not switch to a radio frequency center of the transmit radio frequency, the transmit radio frequency cannot entirely cover the SL BWP; or if a terminal switches to a radio frequency center of the transmit radio frequency, a time of switching between the SL BWP and the UL BWP is prolonged.

Case #3: For a symmetric spectrum, an SL BWP and a UL BWP share one transmit radio frequency. When UE sends sidelink data and uplink data on the SL BWP and the UL BWP at different time, if a center of the UL BWP and a center of the SL BWP are not aligned in frequency domain, a radio frequency center of the transmit radio frequency needs to be switched to during switching between the UL BWP and the SL BWP. Consequently, a time of switching between the SL BWP and the UL BWP is prolonged.

FIG. 1 is a schematic diagram of a communications system that is used according to an embodiment of this application.

Referring to FIG. 1, a transmit end terminal (a terminal 1) sends sidelink control information (SCI) and data to a receive end terminal (a terminal 2). The sidelink control information is related information used to indicate data scheduling, and the related information may include, for example, data channel resource allocation and a modulation and coding scheme. During sidelink communication between the terminal 1 and the terminal 2, the terminal 1 may send SCI and data to the terminal 2, and the terminal 2 may feed back an ACK/NACK after receiving the signal sent by the terminal 1. Optionally, to obtain accurate channel information to easily determine scheduling of the transmit end terminal 1, the terminal 2 may feed back channel state information (CSI), and the terminal 1 performs data scheduling and sending based on the CSI fed back by the terminal 2.

A base station may configure a transmission resource pool and a receiving resource pool for the transmit end terminal (terminal 1), and may configure a transmission resource pool and a receiving resource pool for the receive end terminal (terminal 2). A terminal determines a resource pool used for sidelink transmission, to send and receive sidelink information, where the resource pool includes a transmission resource pool and a receiving resource pool.

The sidelink transmission resource pool is used for sidelink sending, and the sidelink receiving resource pool is used for sidelink receiving. For example, the transmit end terminal determines a transmission resource pool, and the receive end terminal determines a receiving resource pool.

Optionally, the resource pool used for SL transmission may be configured in an SL BWP in the following manners:

(1) Broadcast configuration. For example, the base station may configure a resource pool for the terminal by sending system information or broadcast information.

(2) Dedicated RRC signaling configuration. For example, the base station may configure a resource pool for the terminal by sending RRC signaling, where the dedicated RRC signaling may carry a terminal-level parameter.

For ease of understanding and description, a resource used by a terminal to send sidelink data is denoted as a transmission resource pool #A below. The resource pool may be used by the UE to simultaneously send uplink data and sidelink data on a UL BWP and an SL BWP on a shared transmit radio frequency, and/or may be used to reduce a time of radio frequency switching during transmit radio frequency sharing between the SL BWP and the UL BWP of the UE.

Figure 2:
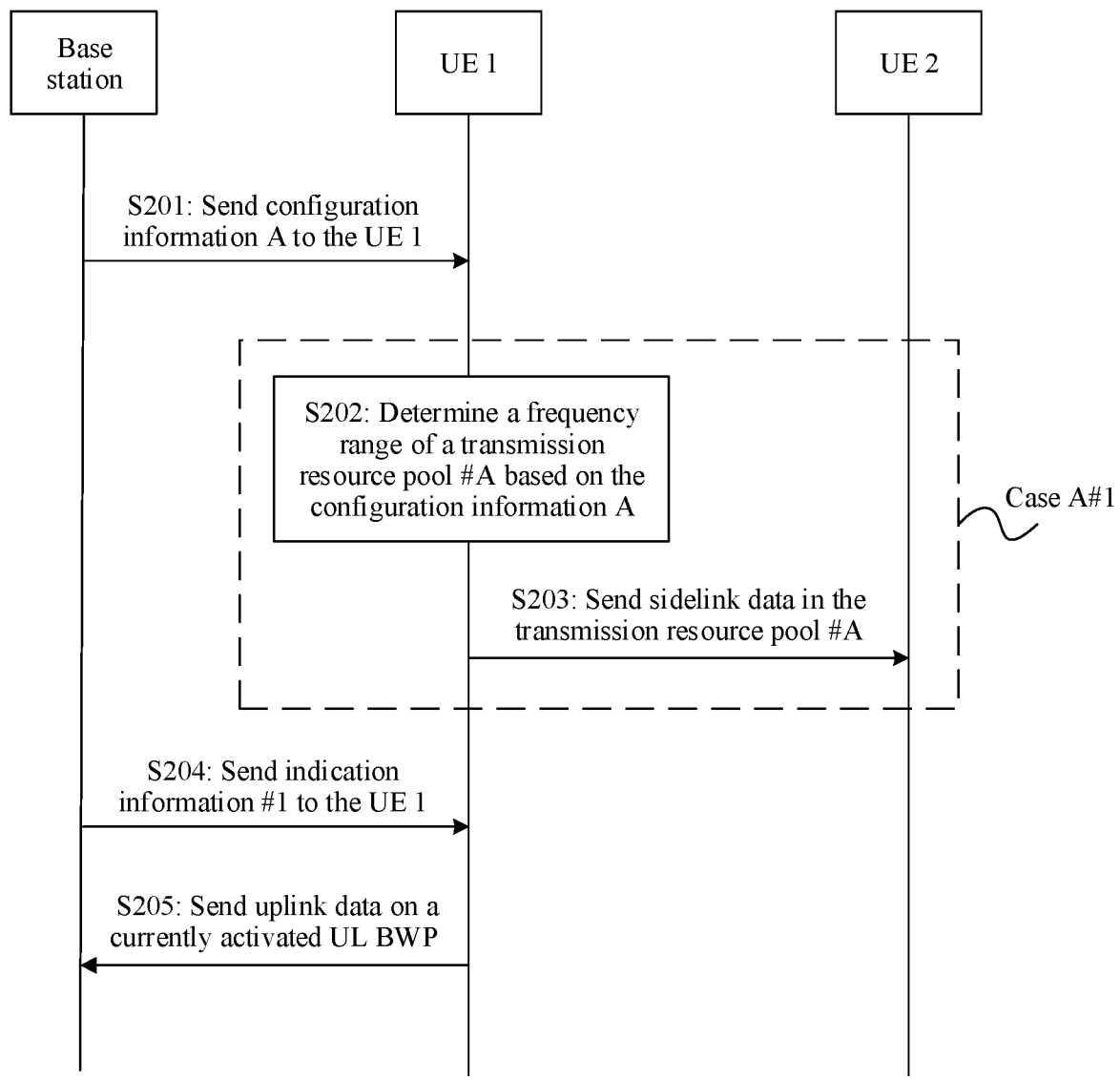
FIG. 2 is a schematic interaction diagram of a communications method according to an embodiment of this application.

FIG. 2 is a schematic interaction diagram of a communications method according to an embodiment of this application.

Referring to FIG. 2, the communications method includes: S201: A base station sends configuration information A to a terminal 1, where the configuration information A is used to configure an SL BWP. S202: The terminal 1 determines a frequency range of a transmission resource pool #A based on the configuration information A, where the frequency range of the transmission resource pool #A is included in a frequency range of a currently activated UL BWP and a frequency range of the SL BWP. S203: The terminal 1 sends sidelink data in the transmission resource pool #A. S204: The base station sends indication information #1 to the terminal 1, where the indication information #1 is used to indicate the terminal 1 to send uplink data on the currently activated UL BWP. S205: The UE 1 sends the uplink data on the currently activated UL BWP.

In a terminal-aware mode, a terminal perceives, in an intersection between a frequency range of an SL BWP and a frequency range of a UL BWP, a physical resource that may be used to send sidelink data, independently sends sidelink sidelink data, and receives uplink data scheduling information sent by a base station.

Because the frequency range of the transmission resource pool #A is included in the frequency range of the currently activated UL BWP and the frequency range of the SL BWP, sending of uplink data is not affected when the user equipment sends sidelink data in the transmission resource pool #A. This implements simultaneous sending of sidelink information and uplink information on a shared transmit radio frequency between the SL BWP and the UL BWP, and improves sidelink information transmission efficiency. In addition, this can further satisfy a simultaneous sending requirement of the terminal, and reduce a time of switching between the UL BWP and the SL BWP.

The user equipment may report information about a bandwidth capability of the UE to the base station. The information about the bandwidth capability is used to determine configuration information of a sidelink BWP, and the configuration information of the sidelink BWP includes bandwidth information of the sidelink BWP. A bandwidth of the sidelink BWP satisfies any one of the following conditions: the bandwidth of the sidelink BWP is less than or equal to a maximum value in a transmit bandwidth capability of the terminal and a receive bandwidth capability of the terminal; or the bandwidth of the sidelink BWP is less than or equal to a minimum value in a transmit bandwidth capability of the terminal and a receive bandwidth capability of the terminal; or the bandwidth of the sidelink BWP is less than or equal to a receive bandwidth capability of the terminal.

It can be understood that the network device may configure different BWPs for the terminal device based on an actual scenario. For example, to reduce power consumption of the terminal device, the network device may allocate a BWP to the terminal device based on a service volume of the terminal device.

When the terminal device transmits only a small amount of service data, a relatively small BWP may be allocated to the terminal device to receive control information and data information. In this case, the bandwidth of the sidelink BWP is less than or equal to the minimum value in the transmit bandwidth capability of the terminal and the receive bandwidth capability of the terminal, or the bandwidth of the sidelink BWP is less than or equal the receive bandwidth capability of the terminal.

When the terminal device needs to transmit only a large amount of service data, a relatively large BWP may be allocated to the terminal device to receive control information and data information. In this case, the bandwidth of the sidelink BWP is less than or equal to the maximum value in the transmit bandwidth capability of the terminal and the receive bandwidth capability of the terminal.

Figure 3:
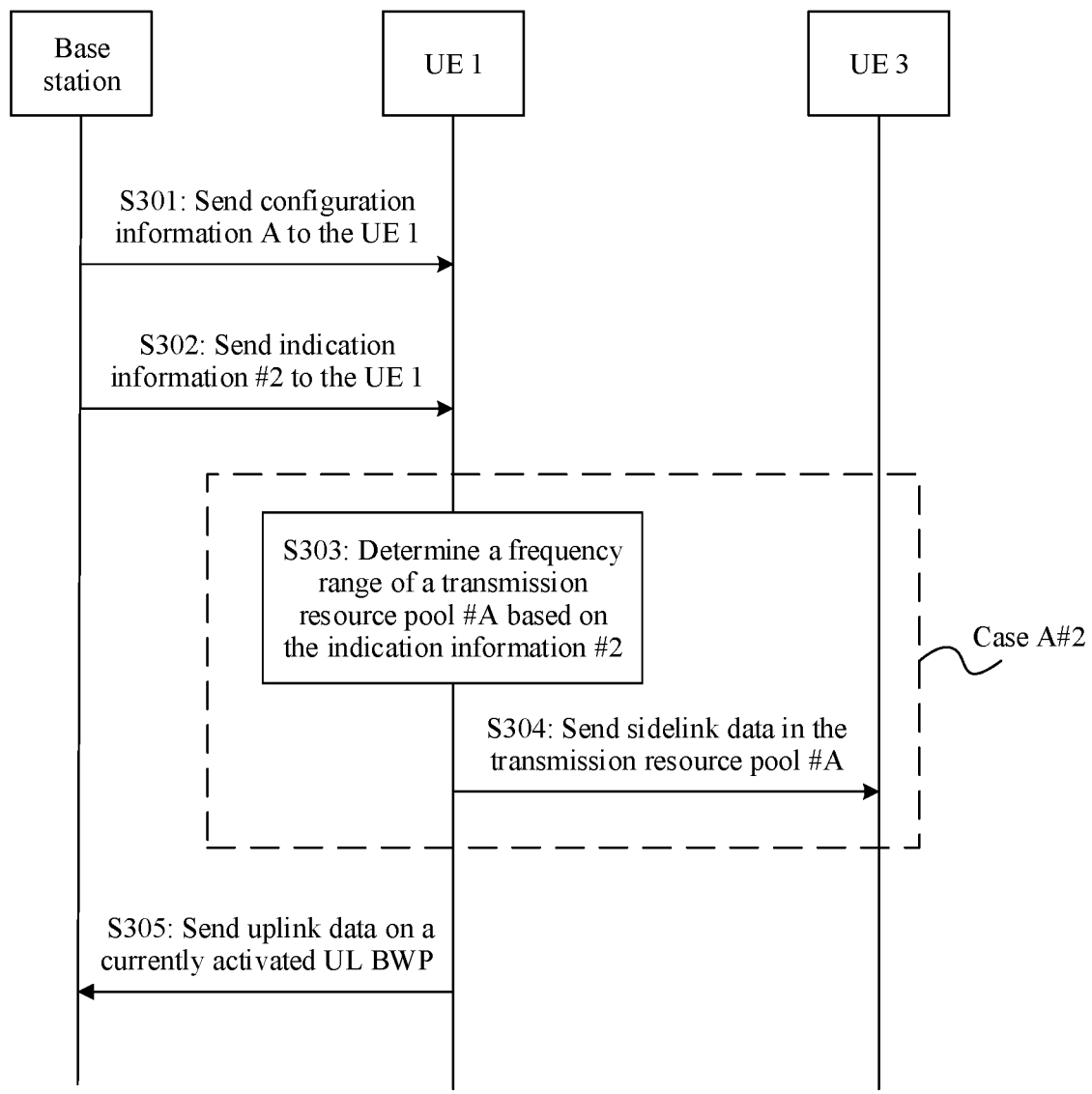
FIG. 3 is a schematic interaction diagram of another communications method according to an embodiment of this application.

FIG. 3 is a schematic interaction diagram of another communications method according to an embodiment of this application.

Referring to FIG. 3, the communications method includes: S301: A base station sends configuration information A to a terminal 1, where the configuration information A is used to configure an SL BWP. S302: The base station sends indication information #2 to the terminal 1, where the indication information #2 is used to indicate a sidelink resource, the sidelink resource is included in a transmission resource pool #A, and a frequency range of the transmission resource pool #A is included in a frequency range of a currently activated UL BWP and a frequency range of the SL BWP. S303: The terminal 1 determines the frequency range of the transmission resource pool #A based on the indication information #2. S304: The terminal 1 sends sidelink data in the transmission resource pool #A. S305: The terminal 1 sends uplink data on the currently activated UL BWP.

Because the frequency range of the transmission resource pool #A is included in the frequency range of the currently activated UL BWP and the frequency range of the SL BWP, sending of uplink data is not affected when the user equipment sends sidelink data in the transmission resource pool #A. This implements simultaneous sending of sidelink information and uplink information on a shared transmit radio frequency between the SL BWP and the UL BWP, and improves sidelink information transmission efficiency. In addition, this can further satisfy a simultaneous sending requirement of the terminal, and reduce a time of switching between the UL BWP and the SL BWP.

The following specifically describes the method provided in the embodiments of this application.

Referring to FIG. 2, in S201, the base station sends the configuration information A to the terminal 1, where the configuration information A is used to configure the SL BWP.

By way of example and not limitation, the configuration information A includes a configuration of a transmission resource pool of the SL BWP; and a frequency range of the transmission resource pool of the SL BWP is included in the frequency range of the SL BWP, or a frequency range of the transmission resource pool of the SL BWP is included in the frequency range of the activated UL BWP and the frequency range of the SL BWP.

Optionally, a bandwidth of the SL BWP is less than or equal to the maximum value in the transmit bandwidth capability of the terminal and the receive bandwidth capability of the terminal; or a bandwidth of the SL BWP is less than or equal to the minimum value in the transmit bandwidth capability of the terminal and the receive bandwidth capability of the terminal; or a bandwidth of the SL BWP is less than or equal to the receive bandwidth capability of the terminal.

It can be understood that a BWP is a segment of bandwidth in a carrier, and a bandwidth of the BWP may be less than or equal to a bandwidth supported by the bandwidth capability of the terminal. The bandwidth supported by the bandwidth capability of the terminal may be less than or equal to a carrier bandwidth (BW). When the base station configures a BWP for the terminal, different bandwidths may be configured for different BWPs, and frequency domain resources of two BWPs may overlap or may not overlap.

In S202, the terminal 1 determines the frequency range of the transmission resource pool #A based on the configuration information A, where the frequency range of the transmission resource pool #A is included in the frequency range of the SL BWP and the frequency range of the currently activated UL BWP.

By way of example and not limitation, the transmission resource pool #A is used by the UE 1 to send sidelink data on the SL BWP. The transmission resource pool #A is configured in the following configuration manners:

Manner 1#

The transmission resource pool of the SL BWP is configured in the frequency range of the SL BWP. To be specific, both a lowest frequency domain position and a highest frequency domain position of a physical resource in the transmission resource pool #A are configured in the frequency range of the SL BWP.

In this case, some physical resources in the transmission resource pool #A of the SL BWP may be used by the terminal to send data on the UL BWP and the SL BWP, thereby improving sidelink communication flexibility. Some physical resources in the transmission resource pool #A are within the intersection between the frequency range of the SL BWP and the frequency range of the activated UL BWP.

Optionally, the base station configures a plurality of SL BWP transmission resource pools. At least one of the plurality of SL BWP transmission resource pools is entirely included in a frequency domain range of the UL BWP and a frequency domain range of the SL BWP, and the at least one resource pool that is entirely included in the frequency domain range of the UL BWP and the frequency domain range of the SL BWP may be marked as a transmission resource pool set #B. The UE may send sidelink information in at least one transmission resource pool in the transmission resource pool set #B. In this way, the UE can simultaneously send sidelink information and uplink information on the shared transmit radio frequency between the SL BWP and the UL BWP.

Optionally, the base station configures a plurality of SL BWP transmission resource pools. At least one of the plurality of SL BWP transmission resource pools is partially included in a frequency domain range of the UL BWP and a frequency domain range of the SL BWP, and the at least one resource pool that is partially included in the frequency domain range of the UL BWP and the frequency domain range of the SL BWP may be marked as a transmission resource pool set #C. The UE may send sidelink information on a physical resource in at least one transmission resource pool in the transmission resource pool set #C. The physical resource is included in the frequency domain range of the UL BWP and the frequency domain range of the SL BWP. In this way, the UE can simultaneously send sidelink information and uplink information on the shared transmit radio frequency between the SL BWP and the UL BWP.

Optionally, the base station configures a plurality of SL BWP transmission resource pools. At least one of the plurality of SL BWP transmission resource pools is entirely included in a frequency domain range of the UL BWP and a frequency domain range of the SL BWP, and the at least one resource pool that is entirely included in the frequency domain range of the UL BWP and the frequency domain range of the SL BWP may be marked as a transmission resource pool set #B. In addition, at least one of the plurality of SL BWP transmission resource pools is partially included in the frequency domain range of the UL BWP and the frequency domain range of the SL BWP, and the at least one resource pool that is partially included in the frequency domain range of the UL BWP and the frequency domain range of the SL BWP may be marked as a transmission resource pool set #C. The UE may send sidelink information on a physical resource in at least one transmission resource pool in the transmission resource pool set #B and/or the transmission resource pool set #C. The physical resource is included in the frequency domain range of the UL BWP and the frequency domain range of the SL BWP. In this way, the UE can simultaneously send sidelink information and uplink information on the shared transmit radio frequency between the SL BWP and the UL BWP.

Manner 2#

The transmission resource pool of the SL BWP is configured in the intersection between the frequency range of the SL BWP and the frequency range of the activated UL BWP. The transmission resource pool #A may be used to simultaneously send sidelink data and uplink data on the shared transmit radio frequency between the SL BWP and the activated UL BWP.

To be specific, both a lowest frequency domain position and a highest frequency domain position of a physical resource in the transmission resource pool #A are configured in the intersection between the frequency range of the SL BWP and the frequency range of the activated UL BWP.

In this case, all physical resources in the transmission resource pool of the SL BWP may be used by the terminal to send data on both the SL BWP and the activated UL BWP, thereby improving physical resource utilization.

In S203, the terminal 1 sends the sidelink data in the transmission resource pool #A.

Optionally, in S204, the base station sends the indication information #1 to the terminal 1, where the indication information #1 is used to indicate the terminal 1 to send the uplink data on the currently activated UL BWP. In S205, the terminal 1 sends the uplink data on the currently activated UL BWP.

For example, the indication information #1 may be downlink control information (DCI) or radio resource control information (RRC).

Because the frequency range of the transmission resource pool #A is included in the frequency range of the currently activated UL BWP and the frequency range of the SL BWP, sending of uplink data is not affected when the user equipment sends sidelink data in the transmission resource pool #A. This implements simultaneous sending of sidelink data and uplink data on a shared transmit radio frequency between the SL BWP and the UL BWP, and improves sidelink data transmission efficiency. In addition, this can further satisfy a simultaneous sending requirement of the terminal, and reduce a time of switching between the UL BWP and the SL BWP.

Figure 4:
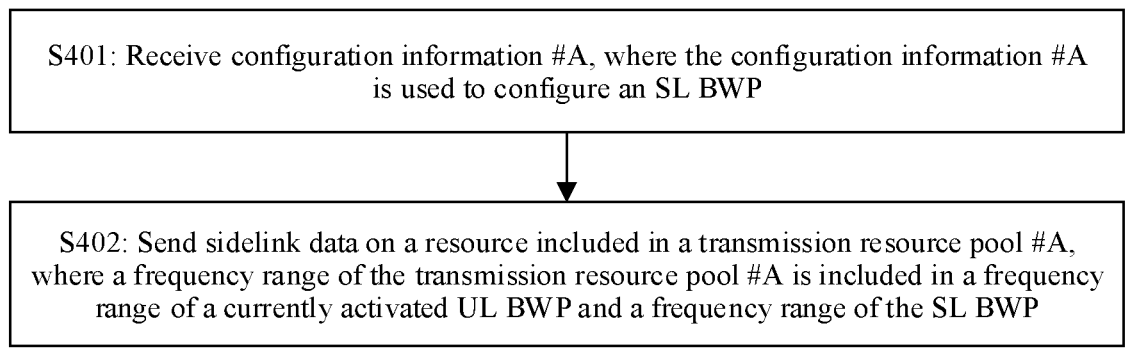
FIG. 4 is a schematic flowchart of a communications method according to an embodiment of this application.

FIG. 4 is a schematic flowchart of a communications method according to an embodiment of this application.

Referring to FIG. 4, the communications method in this application is performed by user equipment. The method includes: S401: Receive configuration information A, where the configuration information A is used to configure an SL BWP. S402: Send sidelink data on a resource included in a transmission resource pool #A, where a frequency range of the transmission resource pool #A is included in a frequency range of a currently activated UL BWP and a frequency range of the SL BWP.

In S401, the configuration information A is received, where the configuration information A is used to configure the SL BWP.

By way of example and not limitation, the configuration information A includes a configuration of a transmission resource pool of the SL BWP; and a frequency range of the transmission resource pool of the SL BWP is included in the frequency range of the SL BWP, or a frequency range of the transmission resource pool of the SL BWP is included in the frequency range of the activated UL BWP and the frequency range of the SL BWP.

In S402, the sidelink data is sent on the resource included in the transmission resource pool #A, where the frequency range of the transmission resource pool #A is included in the frequency range of the currently activated UL BWP and the frequency range of the SL BWP.

Optionally, the sidelink data is sent on the resource included in the transmission resource pool #A in the following implementations:

Case A#1

In a terminal-aware mode, a terminal perceives a physical resource that can be used to send sidelink data in an SL BWP, independently selects an available transmission resource pool, and sends sidelink control information and data information in the selected resource pool, to implement sidelink transmission.

Case A#2

In a base station scheduling mode, a base station sends downlink control information DCI, where the DCI includes sidelink data scheduling information. After a transmit-side terminal 1 receives the DCI sent by the base station, the terminal 1 sends sidelink control information SCI to a receive-side terminal 2, to implement sidelink data scheduling.

Because the frequency range of the transmission resource pool #A is included in the frequency range of the currently activated UL BWP and the frequency range of the SL BWP, sending of uplink data is not affected when the user equipment sends sidelink data in the transmission resource pool #A. This implements simultaneous sending of sidelink data and uplink data on a shared transmit radio frequency between the SL BWP and the UL BWP, and improves sidelink data transmission efficiency. In addition, this can further satisfy a simultaneous sending requirement of the terminal, and reduce a time of switching between the UL BWP and the SL BWP.

Figure 5:
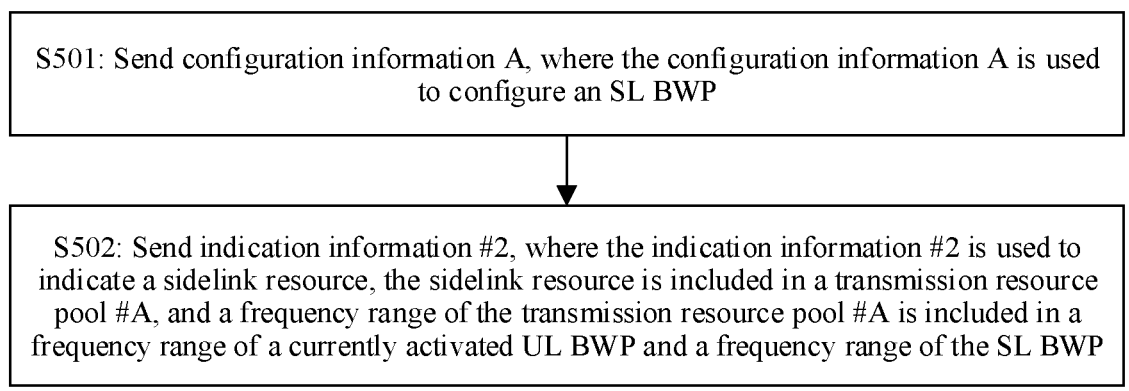
FIG. 5 is a schematic flowchart of another communications method according to an embodiment of this application.

FIG. 5 is a schematic flowchart of another communications method according to an embodiment of this application.

Referring to FIG. 5, the communications method in this application is performed by a network device. The method includes: S501: Send configuration information A, where the configuration information A is used to configure an SL BWP. S502: Send indication information #2, where the indication information #2 is used to indicate a sidelink resource, the sidelink resource is included in a transmission resource pool #A, and a frequency range of the transmission resource pool #A is included in a frequency range of a currently activated UL BWP and a frequency range of the SL BWP.

In S501, the configuration information A is sent, where the configuration information A is used to configure the SL BWP.

By way of example and not limitation, the configuration information A includes a configuration of a transmission resource pool of the SL BWP; and a frequency range of the transmission resource pool of the SL BWP is included in the frequency range of the SL BWP, or a frequency range of the transmission resource pool of the SL BWP is included in the frequency range of the activated UL BWP and the frequency range of the SL BWP.

In S502, the indication information #2 is sent, where the indication information #2 is used to indicate the sidelink resource, the sidelink resource is included in the transmission resource pool #A, and the frequency range of the transmission resource pool #A is included in the frequency range of the currently activated UL BWP and the frequency range of the SL BWP.

By way of example and not limitation, in a base station scheduling mode, a base station sends downlink control information DCI, where the DCI includes sidelink data scheduling information. After a transmit-side terminal 1 receives the DCI sent by the base station, the terminal 1 sends sidelink control information SCI to a receive-side terminal 2, to implement sidelink data scheduling.

It can be understood that, in a scenario in which a UL BWP and an SL BWP share a carrier, when the UE 1 simultaneously sends uplink data and sidelink data on the UL BWP and the SL BWP, the terminal is in an RRC connected mode, and receives a UL BWP configured by the base station and an SL BWP configured by the base station, a core network, or an operator.

Because the frequency range of the transmission resource pool #A is included in the frequency range of the currently activated UL BWP and the frequency range of the SL BWP, sending of uplink data is not affected when the user equipment sends sidelink data in the transmission resource pool #A. This implements simultaneous sending of uplink information and sidelink information on the shared transmit radio frequency between the SL BWP and the UL BWP, and improves sidelink data transmission efficiency. In addition, this can further reduce a time of switching between the UL BWP and the SL BWP.

It can be understood that, for a terminal in an RRC connected mode, when the terminal simultaneously sends uplink data and sidelink data on a UL BWP and an SL BWP on a carrier, the following cases need to be considered:

(1) a case in which the terminal supports simultaneous sending of uplink information and sidelink information on a shared transmit radio frequency between an SL and a UL with different frame structure parameters.

In this case, the following configuration may be performed: There is a frequency domain intersection between a frequency domain position of a currently activated UL BWP and a frequency domain position of an SL BWP.

Optionally, to enable the frequency domain position of the currently activated UL BWP and the frequency domain position of the SL BWP to have the frequency domain intersection, the following configurations may be performed:

A1: A frequency range of the UL BWP is configured in a frequency range of the SL BWP.

A2: A frequency range of the SL BWP is configured in a frequency range of the UL BWP.

A3: There is a frequency domain intersection between the SL BWP and the UL BWP in frequency domain, and the frequency domain intersection includes a transmission resource pool of the SL BWP.

A4: The SL BWP and the UL BWP have a same center frequency in frequency domain.

By way of example and not limitation, when the shared carrier is a TDD carrier, the SL BWP and the UL BWP have the same center frequency. This can reduce a time of switching between the UL BWP and the SL BWP. When the shared carrier is an FDD carrier, the SL BWP and the UL BWP satisfy any of the foregoing conditions A1, A2, and A3.

(2) a case in which the terminal does not support simultaneous sending of uplink information and sidelink information on a shared transmit radio frequency between an SL and a UL with different frame structure parameters.

In this case, the following configuration may be performed: A UL BWP and an SL BWP have a same frame structure parameter, and there is a frequency domain intersection between the UL BWP and the SL BWP in frequency domain.

When a plurality of UL BWPs and a plurality of SL BWPs are configured on one carrier, frame structure parameters of the UL BWPs and the SL BWPs may be different or the same, and there is a frequency domain intersection between a frequency domain position of a currently activated UL BWP and an SL BWP that have a same frame structure parameter.

Optionally, the terminal may report a feature of a sidelink service, a service priority, a size of a service packet buffer, or a transmit radio frequency sharing request to a base station. Correspondingly, the base station configures the frame structure parameter of the SL BWP to ensure that the frame structure parameter of the SL BWP is the same as the frame structure parameter of the activated UL BWP.

Alternatively, the base station switches the frame structure parameter of the UL BWP to ensure that the frame structure parameter of the SL BWP is the same as the frame structure parameter of the activated UL BWP, to be specific, to ensure that the frame structure parameter of the activated UL BWP is the same as the frame structure parameter of the SL BWP, thereby implementing sharing of one transmit radio frequency between the SL and the UL and simultaneous sending of uplink information and sidelink information.

For ease of understanding and description, a transmission resource pool configured for an SL BWP is denoted as a Tx resource pool below.

Figure 6:
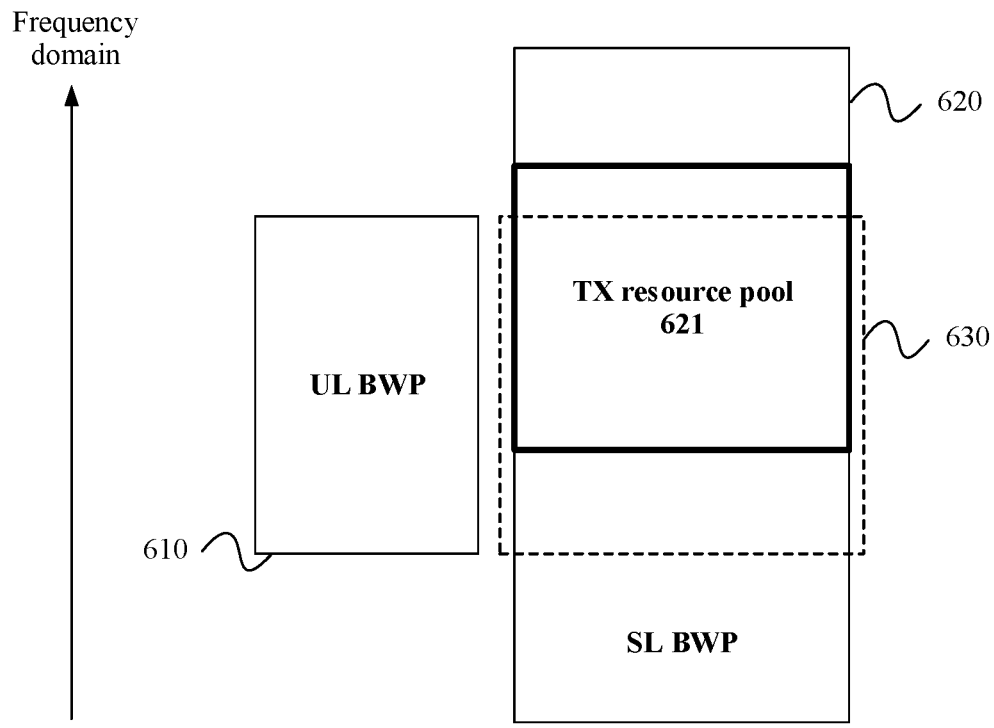
FIG. 6 is a schematic relationship diagram of a bandwidth resource according to an embodiment of this application.

FIG. 6 is a schematic relationship diagram of a bandwidth resource according to an embodiment of this application.

Referring to FIG. 6, there is a frequency domain intersection 630 between an uplink bandwidth part 610 and a sidelink bandwidth part 620 in frequency domain. In this case, the uplink bandwidth part 610 may be in an activated state (in other words, the uplink bandwidth part 610 is an activated UL BWP). A Tx resource pool 621 is configured in a frequency range of the SL BWP 620. To be specific, both a lowest frequency domain position and a highest frequency domain position of a physical resource in the Tx resource pool are configured in the frequency range of the SL BWP.

In this case, some physical resources in the Tx resource pool 621 are included in the frequency domain intersection 630. A physical resource #C in a frequency domain intersection between the Tx resource pool 621 and the UL BWP may be used to implement simultaneous sending of uplink information and sidelink information on a shared transmit radio frequency between the SL BWP and the UL BWP. To be specific, the UE can send sidelink information on the physical resource #C in the Tx resource pool 621 and simultaneously send uplink information on the UL BWP. This improves sidelink communication flexibility.

By way of example and not limitation, the SL BWP and the UL BWP may partially overlap (which may be understood as that a part of the SL BWP and a part of the UL BWP overlap in frequency domain, to constitute a frequency domain intersection).

For an asymmetric spectrum, the SL BWP and the UL BWP share one transmit radio frequency. When the UE simultaneously sends uplink data and sidelink data on the SL BWP and the UL BWP, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to move a frequency center of the transmit radio frequency. This ensures that the center of the transmit radio frequency is aligned with a frequency center of a downlink bandwidth part, and reduces a time of switching between the UL BWP and the DL BWP.

It can be understood that a sidelink transmission channel is carried on an uplink carrier. The uplink carrier may be an uplink carrier on which an NR base station communicates with a terminal, or may be an independent carrier. A BWP is a group of contiguous RB resources on a carrier.

For an asymmetric spectrum, the SL BWP and the UL BWP share one transmit radio frequency. When the UE sends uplink information and sidelink information on the SL BWP and the UL BWP at different time, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to switch a frequency center of the transmit radio frequency. This reduces a time of switching between the UL BWP and the SL BWP.

For a symmetric spectrum, the SL BWP and the UL BWP share one transmit radio frequency. When the UE sends uplink information and sidelink information on the SL BWP and the UL BWP at different time, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to switch a radio frequency center during switching between the UL BWP and the SL BWP. This reduces a time of switching between the UL BWP and the SL BWP.

Optionally, when a frequency center of the currently activated UL BWP is equal to a frequency center of the SL BWP, there is a frequency domain intersection between the UL BWP and the SL BWP, and the UE may simultaneously send uplink information and sidelink information on a resource in the frequency domain intersection between the SL BWP and the UL BWP. This satisfies a simultaneous sending requirement of the terminal, and reduces the time of switching between the UL BWP and the SL BWP.

Optionally, when a center frequency of the currently activated UL BWP is aligned with a center frequency of the SL BWP, the UE sends uplink information and sidelink information on a shared transmit radio frequency between the UL BWP and the SL BWP at different time, and does not need to switch a center of the transmit radio frequency. This reduces the time of switching between the UL BWP and the SL BWP.

Figure 7:
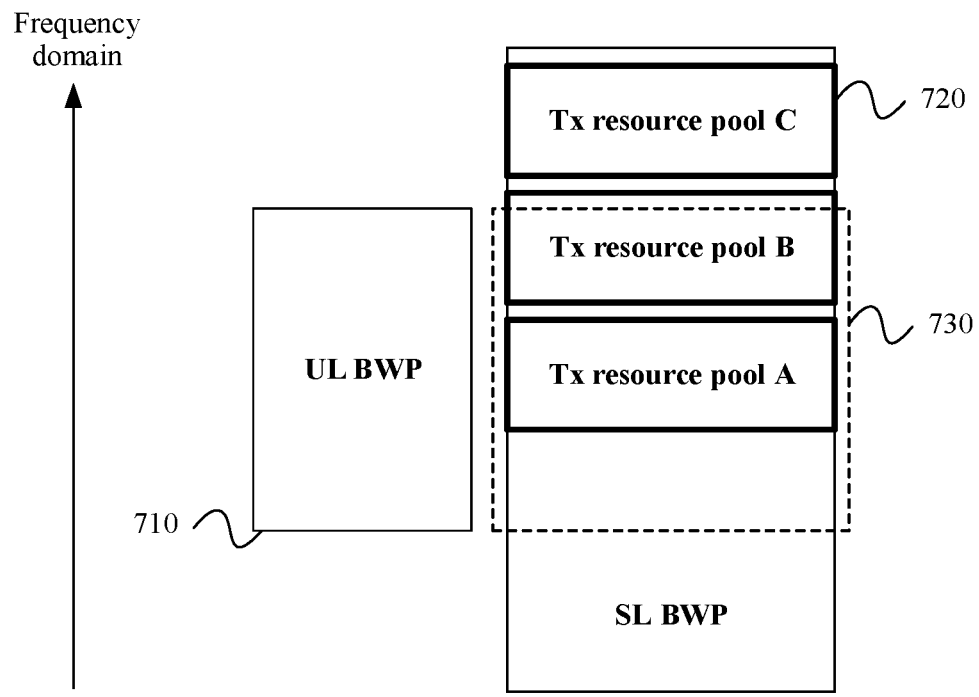
FIG. 7 is a schematic relationship diagram of another bandwidth resource according to an embodiment of this application.

FIG. 7 is a schematic relationship diagram of a bandwidth resource according to an embodiment of this application.

Referring to FIG. 7, there is a frequency domain intersection 730 between an uplink bandwidth part 710 and a sidelink bandwidth part 720 in frequency domain. In this case, the uplink bandwidth part 710 may be in an activated state (in other words, the uplink bandwidth part 710 is an activated UL BWP). A Tx resource pool is configured in a frequency range of the SL BWP 720. To be specific, both a lowest frequency domain position and a highest frequency domain position of a physical resource in the Tx resource pool are configured in the frequency range of the SL BWP.

The Tx resource pool includes a Tx resource pool A, a Tx resource pool B, and a Tx resource pool C. A frequency range of the Tx resource pool A is entirely included in a frequency range of the UL BWP, and a frequency range of the Tx resource pool B is partially included in the frequency range of the UL BWP. There is no intersection between the Tx resource pool C and the UL BWP in frequency domain.

In this case, some Tx resource pools are entirely included in the frequency domain intersection 730. The Tx resource pool A may be used to implement simultaneous sending of uplink information and sidelink information on a shared transmit radio frequency between the SL BWP and the UL BWP. To be specific, the UE sends sidelink information in the Tx resource pool A. This can implement simultaneous sending of uplink information and sidelink information by the terminal on the UL BWP and the SL BWP, and improve sidelink communication flexibility.

By way of example and not limitation, the SL BWP and the UL BWP may partially overlap (which may be understood as that a part of the SL BWP and a part of the UL BWP overlap in frequency domain, to constitute a frequency domain intersection).

For an asymmetric spectrum, the SL BWP and the UL BWP share one transmit radio frequency. When the UE simultaneously sends uplink data and sidelink data on the SL BWP and the UL BWP, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to move a frequency center of the transmit radio frequency. This ensures that the center of the transmit radio frequency is aligned with a frequency center of a downlink bandwidth part, and reduces a time of switching between the UL BWP and the DL BWP.

For an asymmetric spectrum, the SL BWP and the UL BWP share one transmit radio frequency. When the UE sends uplink information and sidelink information on the SL BWP and the UL BWP at different time, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to switch a frequency center of the transmit radio frequency. This reduces a time of switching between the UL BWP and the SL BWP.

For a symmetric spectrum, the SL BWP and the UL BWP share one transmit radio frequency. When the UE sends uplink information and sidelink information on the SL BWP and the UL BWP at different time, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to switch a radio frequency center during switching between the UL BWP and the SL BWP. This reduces a time of switching between the UL BWP and the SL BWP.

Optionally, when a frequency center of the currently activated UL BWP is equal to a frequency center of the SL BWP, there is a frequency domain intersection between the UL BWP and the SL BWP, and the UE may simultaneously send uplink information and sidelink information on a resource in the frequency domain intersection between the SL BWP and the UL BWP. This satisfies a simultaneous sending requirement of the terminal, and reduces the time of switching between the UL BWP and the SL BWP.

Optionally, when a center frequency of the UL BWP is aligned with a center frequency of the SL BWP, the UE sends uplink information and sidelink information on a shared transmit radio frequency between the UL BWP and the SL BWP at different time, and does not need to switch a center of the transmit radio frequency. This reduces the time of switching between the UL BWP and the SL BWP.

Figure 8:
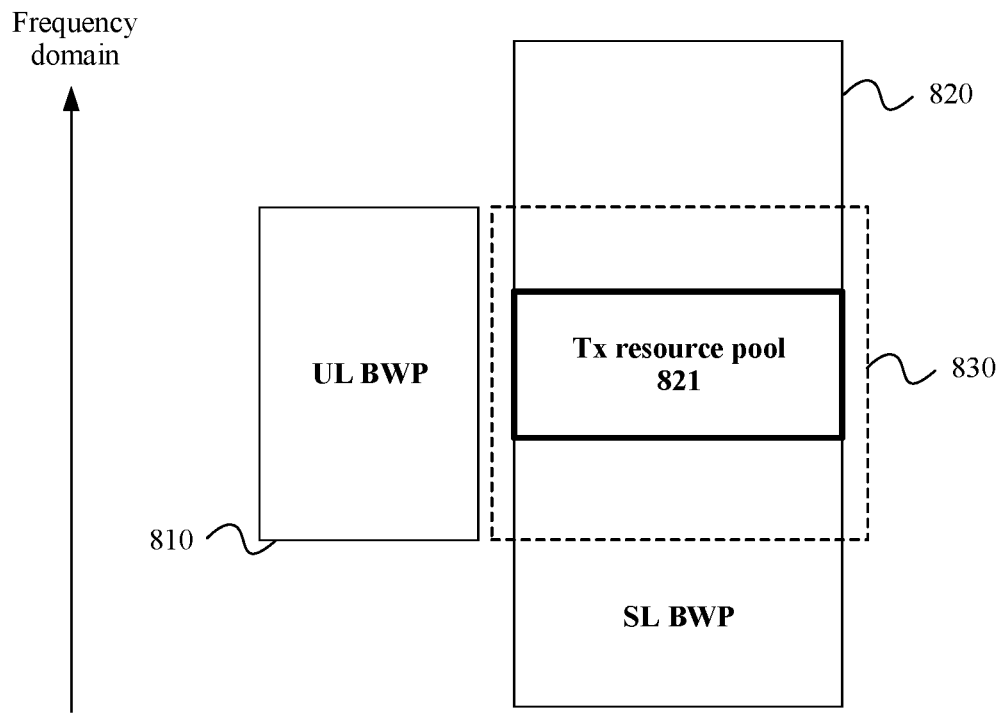
FIG. 8 is a schematic relationship diagram of still another bandwidth resource according to an embodiment of this application.

FIG. 8 is a schematic relationship diagram of another bandwidth resource according to an embodiment of this application.

Referring to FIG. 8, there is a frequency domain intersection 830 between an uplink bandwidth part 810 and a sidelink bandwidth part 820 in frequency domain. In this case, a Tx resource pool 821 is configured in a frequency range of the currently activated UL BWP 810 and a frequency range of the SL BWP 820. To be specific, both a lowest frequency domain position and a highest frequency domain position of a physical resource in the Tx resource pool 821 are configured in the intersection between the frequency range of the SL BWP and the frequency range of the UL BWP.

In this case, all physical resources in the Tx resource pool 821 are included in the frequency domain intersection 830. To be specific, all the physical resources in the Tx resource pool 821 may be used by the terminal to simultaneously send uplink information and sidelink information on the UL BWP and the SL BWP, where the sidelink information of the UE is sent on the transmission resource pool 821. This improves physical resource utilization.

By way of example and not limitation, the SL BWP and the UL BWP may partially overlap (which may be understood as that a part of the SL BWP and a part of the UL BWP overlap in frequency domain, to constitute a frequency domain intersection).

For an asymmetric spectrum, the SL BWP and the UL BWP share one transmit radio frequency. When the UE simultaneously sends uplink data and sidelink data on the SL BWP and the UL BWP, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to move a frequency center of the transmit radio frequency. This ensures that the center of the transmit radio frequency is aligned with a frequency center of a downlink bandwidth part, and reduces a time of switching between the UL BWP and the DL BWP.

For an asymmetric spectrum, the SL BWP and the UL BWP share one transmit radio frequency. When the UE sends uplink data and sidelink data on the SL BWP and the UL BWP at different time, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to switch a frequency center of the transmit radio frequency. This reduces a time of switching between the UL BWP and the SL BWP.

For a symmetric spectrum, the SL BWP and the UL BWP share one transmit radio frequency. When the UE sends uplink data and sidelink data on the SL BWP and the UL BWP at different time, because the frequency range of the transmission resource pool #A is included in the frequency range of the currently activated UL BWP and the frequency range of the SL BWP, when the SL BWP and the UL BWP share one transmit radio frequency on a same carrier, the terminal does not need to switch a radio frequency center during switching between the UL BWP and the SL BWP. This reduces a time of switching between the UL BWP and the SL BWP.

Optionally, when a frequency center of the UL BWP is equal to a frequency center of the SL BWP, there is a frequency domain intersection between the UL BWP and the SL BWP, and the UE may simultaneously send uplink information and sidelink information on a resource in the frequency domain intersection between the SL BWP and the UL BWP. This satisfies a simultaneous sending requirement of the terminal, and reduces the time of switching between the UL BWP and the SL BWP.

Optionally, when a center frequency of the UL BWP is aligned with a center frequency of the SL BWP, the UE sends uplink information and sidelink information on a shared transmit radio frequency between the UL BWP and the SL BWP at different time, and does not need to switch a center of the transmit radio frequency. This reduces the time of switching between the UL BWP and the SL BWP.

It can be understood that, in this application, that the UE simultaneously sends the uplink information and the sidelink information on the SL BWP and the currently activated UL BWP may be understood as that a time at which the UE sends the sidelink information on the SL BWP and a time at which the UE sends the uplink information on the activated UL BWP are in a same time period, and the time period may be predefined, or configured by using signaling.

It can be understood that, in this application, the sidelink data may also be referred to as sidelink information, and includes but is not limited to information carried on a sidelink shared channel, a sidelink control channel, a sidelink discovery channel, and a sidelink feedback channel; and the uplink data may also be referred to as uplink information, and includes but is not limited to information carried on an uplink shared channel, an uplink control channel, and an uplink pilot channel.

It can be understood that a radio frequency concept in this application may be understood from two concepts: a radio frequency bandwidth and a radio frequency quantity. For example, for a terminal device, the terminal device may transmit a radio frequency signal (that is, send or receive a radio frequency signal) through a radio frequency module. From the perspective of a physical structure, the radio frequency module may include one or more of an antenna switch module, a filter, an amplifier, a mixer, or a module such as an analog-to-digital conversion module/digital-to-analog conversion module. The radio frequency bandwidth may be understood as a maximum transmission bandwidth of a radio frequency signal, and the radio frequency bandwidth may include a transmit bandwidth and/or a receive bandwidth. It can be understood that a radio frequency capability of the terminal device may further include a quantity of radio frequencies (including a quantity of transmit radio frequencies and a quantity of receive radio frequencies) supported by the terminal device. For example, for the quantity of transmit radio frequencies, if the terminal device supports two transmit radio frequencies, it indicates that the terminal device supports two transmit bandwidths, and each transmit radio frequency corresponds to one transmit bandwidth. In an example, the quantity of radio frequencies supported by the terminal device is related to a quantity of radio frequency modules disposed in the terminal device. For example, if one radio frequency module is disposed in the terminal device, the terminal device supports one radio frequency. If two radio frequency modules are disposed in the terminal device, the terminal device supports two radio frequencies. This is not specifically limited. In correspondence to the wireless communications methods provided in the foregoing method embodiments, an embodiment of this application further provides a corresponding communications apparatus. The communications apparatus includes a corresponding module configured to perform each part in the foregoing embodiments. The module may be software, hardware, or a combination of software and hardware.

Figure 9:
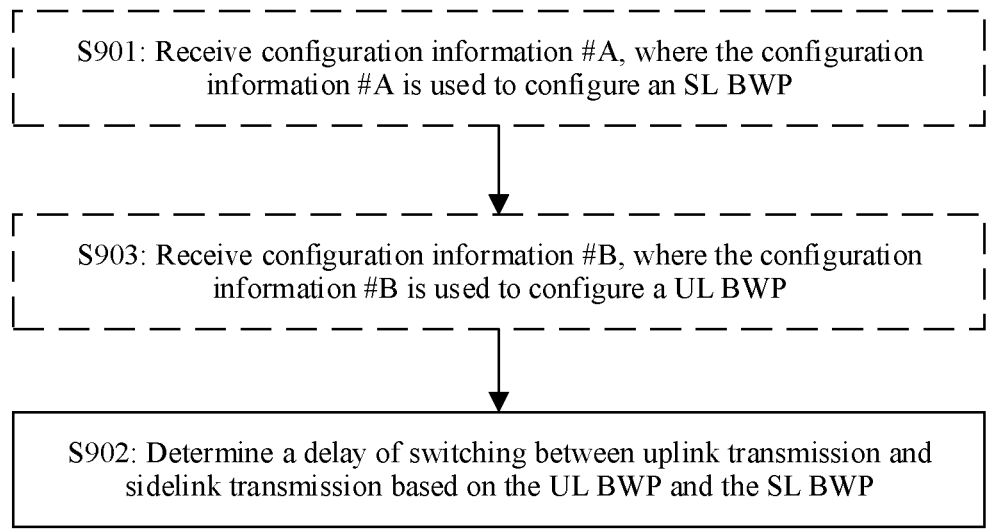
FIG. 9 is a schematic flowchart of another communications method according to an embodiment of this application.

FIG. 9 is a schematic flowchart of another communications method according to an embodiment of this application.

Referring to the communications method shown in FIG. 9, the method may be performed by user equipment. The method includes: S901: Receive configuration information A, where the configuration information A is used to configure an SL BWP. S902: Determine a delay of switching between uplink transmission and sidelink transmission based on a UL BWP and the SL BWP. In this embodiment of this application, the delay of switching between uplink transmission and sidelink transmission may be understood as a delay of switching from uplink transmission to sidelink transmission, or may be understood as a delay of switching from sidelink transmission to uplink transmission.

In S901, the configuration information A is received, where the configuration information A is used to configure the SL BWP.

By way of example and not limitation, the configuration information A includes a position and a bandwidth of the SL BWP, and/or a configuration of a transmission resource pool of the SL BWP, and a frequency range of the transmission resource pool of the SL BWP is included in a frequency range of the SL BWP. The configuration of the transmission resource pool includes a position and a bandwidth of the transmission resource pool in the SL BWP. One SL BWP may include one or more transmission resource pools.

Optionally, before S902, the method may further include step S903: Receive configuration information B, where the configuration information B is used to configure the UL BWP. S901 and S903 may be performed at the same time, or may be performed at different time. For example, S901 is performed before S903, or S901 is performed after S903.

By way of example and not limitation, the configuration information B includes a position and a bandwidth of the UL BWP. The configuration information A and the configuration information B may be received through a same information element or signaling, or may be received through different information elements or signaling.

The user equipment may determine the configuration of the SL BWP based on the configuration information A, where the configuration of the SL BWP includes the position and the bandwidth of the SL BWP. The user equipment may determine the configuration of the transmission resource pool of the SL BWP based on the configuration information A, where the configuration of the transmission resource pool of the SL BWP includes a position and a bandwidth of one or more transmission resource pools. The user equipment may determine the configuration of the UL BWP based on the configuration information B, where the configuration of the UL BWP includes the position and the bandwidth of the UL BWP.

Optionally, the configuration information A may be configured by a base station, a core network, or an operator for the user equipment.

According to the method provided in this embodiment of this application, the terminal can determine the delay of switching between uplink transmission and sidelink transmission. This can implement transmission of uplink data and sidelink data in time, and reduce a data transmission delay. In addition, this can also prevent a resource waste caused by an unclear switching delay.

Figure 10:
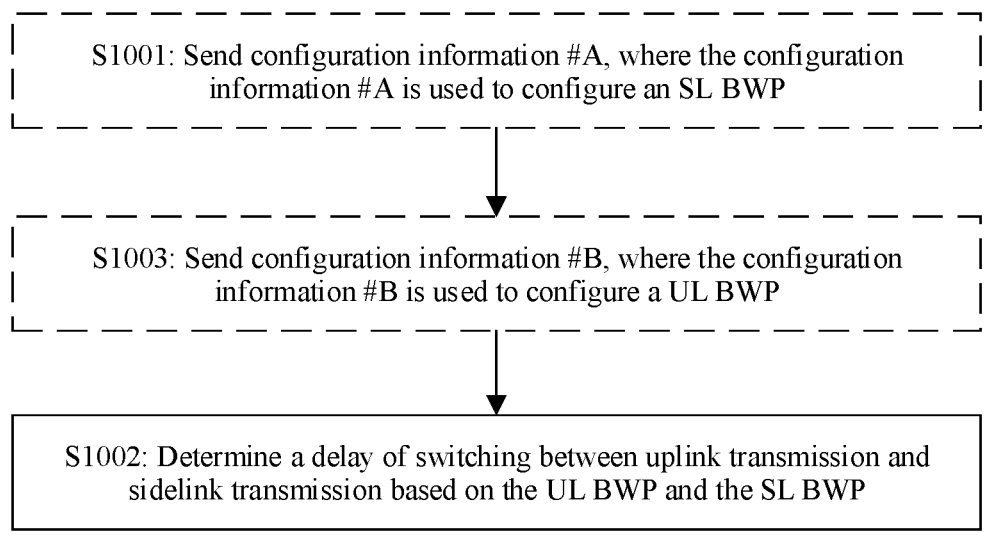
FIG. 10 is a schematic flowchart of another communications method according to an embodiment of this application.

FIG. 10 is a schematic flowchart of another communications method according to an embodiment of this application.

Referring to the communications method shown in FIG. 10, the method may be performed by a network device. The method includes: S1001: Send configuration information A, where the configuration information A is used to configure an SL BWP. S1002: Determine a delay of switching between uplink transmission and sidelink transmission based on a UL BWP and the SL BWP.

In S1001, the configuration information A is sent, where the configuration information A is used to configure the SL BWP. For descriptions of the configuration information A, refer to the descriptions of the configuration information A in S901. Details are not described herein again.

Optionally, before S1002, the method may further include step S1003: Send configuration information B, where the configuration information B is used to configure the UL BWP. S1001 and S1003 may be performed at the same time, or may be performed at different time. For example, S1001 is performed before S1003, or S1001 is performed after S1003.

By way of example and not limitation, the configuration information B includes a position and a bandwidth of the UL BWP. The configuration information A and the configuration information B may be sent through a same information element or signaling, or may be sent through different information elements or signaling.

According to the method provided in this embodiment of this application, the network device can determine the delay of switching between uplink transmission and sidelink transmission performed by a terminal. This can implement scheduling of uplink data and sidelink data in time, and reduce a data transmission delay. In addition, this can also prevent a resource waste caused by an unclear switching delay. It can be understood that S901 and S1001 may alternatively be optional steps.

In S902 or S1002, the delay of switching between uplink transmission and sidelink transmission is determined based on the UL BWP and the SL BWP in the following one or more possible implementations. The following one or more implementations may be used as independent implementations, or may be combined with each other when there is no logical conflict. This is not limited in this application.

Optionally, the determining a delay of switching between uplink transmission and sidelink transmission based on a UL BWP and the SL BWP may be: determining the delay of switching between uplink transmission and sidelink transmission based on a relationship between the UL BWP and the SL BWP.

Implementation 1:

The determining a delay of switching between uplink transmission and sidelink transmission based on a UL BWP and the SL BWP is specifically: determining the delay of switching between uplink transmission and sidelink transmission based on a relationship between a transmit radio frequency of the UL BWP and a transmit radio frequency of the SL BWP.

In this application, the transmit radio frequency may also be referred to as a transmit chain (Tx chain), or may be referred to as a baseband chain, a radio frequency chain, a transmission chain, a channel bandwidth, or the like.

In this embodiment of this application, the delay of switching between uplink transmission and sidelink transmission may be a delay of switching from uplink transmission to sidelink transmission, or may be a delay of switching from sidelink transmission to uplink transmission. Optionally, the transmit chain may include a radio frequency processing chain, a baseband processing chain, and/or the like.

In this application, the transmit radio frequency of the UL BWP may be referred to as a transmit radio frequency of an uplink signal, a transmit radio frequency of uplink transmission, or a transmit radio frequency of uplink communication; and the transmit radio frequency of the SL BWP may be referred to as a transmit radio frequency of a sidelink signal, a transmit radio frequency of sidelink transmission, or a transmit radio frequency of sidelink communication.

In this application, the terminal device may support a plurality of transmit chains. The terminal device may send a signal through one or more transmit chains on one carrier. For example, the terminal device may support sending of an uplink signal and a sidelink signal through an independent transmit chain on one carrier. For example, the terminal device may support sending of an uplink signal through a first transmit chain and sending of a sidelink signal through a second transmit chain on one carrier. For example, the terminal device may support sending of an uplink signal and a sidelink signal through a shared transmit chain on one carrier. For example, the terminal device may support sending of an uplink signal and a sidelink signal through a third transmit chain on one carrier, where the third transmit chain is the foregoing shared transmit chain.

In this application, the terminal device may send a signal through one or more transmit chains on a plurality of carriers. For example, the terminal device may support sending of an uplink signal and a sidelink signal through an independent transmit chain on a plurality of carriers. For example, the terminal device may support sending of an uplink signal through a first transmit chain on one carrier and sending of a sidelink signal through a second transmit chain on another carrier. For example, the terminal device may support sending of an uplink signal and a sidelink signal through a shared transmit chain on a plurality of carriers. For example, the terminal device may support sending of an uplink signal through a third transmit chain on one carrier and sending of a sidelink signal through the third transmit chain on another carrier, where the third transmit chain is the foregoing shared transmit chain.

In a possible implementation of determining a delay of switching between uplink transmission and sidelink transmission based on a relationship between a transmit radio frequency of a UL BWP and a transmit radio frequency of an SL BWP, the delay of switching between uplink transmission and sidelink transmission is determined to be zero when the transmit radio frequency of the UL BWP and the transmit radio frequency of the SL BWP are independent transmit radio frequencies. To be specific, in S902, the terminal device may determine, based on that the transmit radio frequency of the UL BWP and the transmit radio frequency of the SL BWP are independent transmit radio frequencies, that the delay of switching between uplink transmission and sidelink transmission is zero. In S1002, the network device may determine, based on that the transmit radio frequency of the UL BWP and the transmit radio frequency of the SL BWP are independent transmit radio frequencies, that the delay of switching between uplink transmission and sidelink transmission performed by the terminal device is zero.

In this application, that the delay of switching between uplink transmission and sidelink transmission is zero may be understood as that there is no switching delay during uplink transmission and sidelink transmission, or may be understood as that the terminal device may perform uplink transmission and sidelink transmission on contiguous time domain resources. For example, the terminal device may transmit an uplink signal in a slot n, and transmit a sidelink signal in a slot n+1; or the terminal device may transmit an uplink signal on a symbol x in a slot n, and transmit a sidelink signal on a symbol x+1 in the slot n; or the terminal device may transmit a sidelink signal in a slot n, and transmit an uplink signal in a slot n+1; or the terminal device may transmit a sidelink signal on a symbol x in a slot n, and transmit an uplink signal on a symbol x+1 in the slot n.

According to this implementation, the terminal and/or the network device may determine, based on that the transmit radio frequency of the UL BWP and the transmit radio frequency of the SL BWP are independent transmit radio frequencies, the delay of switching between uplink transmission and sidelink transmission is zero. This can implement transmission of uplink data and sidelink data in time, and reduce a data transmission delay. In addition, this can also prevent a resource waste caused by an unclear switching delay.

Implementation 2:

The determining a delay of switching between uplink transmission and sidelink transmission based on a UL BWP and the SL BWP is specifically: determining the delay of switching between uplink transmission and sidelink transmission based on a frame structure parameter and a relationship between a transmit radio frequency of the UL BWP and a transmit radio frequency of the SL BWP.

Optionally, the delay of switching between uplink transmission and sidelink transmission is zero when the transmit radio frequency of the UL BWP and the transmit radio frequency of the SL BWP are independent transmit radio frequencies and a frame structure parameter of the UL BWP is the same as a frame structure parameter of the SL BWP.

In S902, the terminal device may determine, based on that the transmit radio frequency of the UL BWP and the transmit radio frequency of the SL BWP are independent transmit radio frequencies and the frame structure parameter of the UL BWP is the same as the frame structure parameter of the SL BWP, that the delay of switching between uplink transmission and sidelink transmission is zero. In S1002, the network device may determine, based on that the transmit radio frequency of the UL BWP and the transmit radio frequency of the SL BWP are independent transmit radio frequencies and the frame structure parameter of the UL BWP is the same as the frame structure parameter of the SL BWP, that the delay of switching between uplink transmission and sidelink transmission is zero.

According to this implementation, the terminal and/or the network device may determine, based on that the transmit radio frequency of the UL BWP and the transmit radio frequency of the SL BWP are independent transmit radio frequencies and the frame structure parameter of the UL BWP is the same as the frame structure parameter of the SL BWP, that the delay of switching between uplink transmission and sidelink transmission is zero. This can implement transmission of uplink data and sidelink data in time, and reduce a data transmission delay. In addition, this can also prevent a resource waste caused by an unclear switching delay.

Implementation 3:

The determining a delay of switching between uplink transmission and sidelink transmission based on a UL BWP and the SL BWP is specifically: determining the delay of switching between uplink transmission and sidelink transmission based on a relationship between a bandwidth for the UL BWP and the SL BWP and a radio frequency bandwidth.

The UL BWP is an activated UL BWP of the terminal device, a UL BWP on which the terminal device works, a UL BWP in which a radio frequency of the terminal device is located, or the like.

The radio frequency bandwidth in this application may be a radio frequency bandwidth supported by the terminal device, a radio frequency bandwidth reported by the terminal device, a minimum radio frequency bandwidth supported by a system, a maximum radio frequency bandwidth supported by a system, a minimum radio frequency bandwidth supported by the terminal device, a minimum radio frequency bandwidth reported by the terminal device, a maximum radio frequency bandwidth supported by the terminal device, or a maximum radio frequency bandwidth reported by the terminal device.

This implementation is applicable to a scenario in which a transmit radio frequency of the UL BWP and a transmit radio frequency of the SL BWP are independent transmit radio frequencies, or is applicable to a scenario in which a transmit radio frequency of the UL BWP and a transmit radio frequency of the SL BWP are shared transmit radio frequencies.

This implementation is applicable to a scenario in which a frame structure parameter of the UL BWP is the same as a frame structure parameter of the SL BWP, or is applicable to a scenario in which a frame structure parameter of the UL BWP is different from a frame structure parameter of the SL BWP.

According to this implementation, the terminal and/or the network device may determine, based on the relationship between the bandwidth for the UL BWP and the SL BWP and the radio frequency bandwidth, that the delay of switching between uplink transmission and sidelink transmission is zero. This can implement transmission of uplink data and sidelink data in time, and reduce a data transmission delay. In addition, this can also prevent a resource waste caused by an unclear switching delay. In this implementation, the delay of switching between uplink transmission and sidelink transmission may be determined based on the relationship between the bandwidth for the UL BWP and the SL BWP and the radio frequency bandwidth in the following one or more methods. The following one or more methods may be used as independent implementations, or may be combined with each other when there is no logical conflict. This is not limited in this application.

Method 3.1: Determine the time of switching between uplink transmission and sidelink transmission based on a relationship between a size of the bandwidth for the UL BWP and the SL BWP and a size of the radio frequency bandwidth.

In this application, the size of the bandwidth for the UL BWP and the SL BWP may be a size of a bandwidth between a lowest start frequency domain resource of the UL BWP and the SL BWP and a highest end frequency domain resource of the UL BWP and the SL BWP.

In this application, the lowest start frequency domain resource of the UL BWP and the SL BWP may be a lower start frequency domain resource in a start frequency domain resource of the UL BWP and a start frequency domain resource of the SL BWP; and the highest end frequency domain resource of the UL BWP and the SL BWP may be a higher end frequency domain resource in an end frequency domain resource of the UL BWP and an end frequency domain resource of the SL BWP.

Optionally, a lowest start frequency domain resource may also be referred to as a lowest frequency domain resource for short, and a highest end frequency domain resource may also be referred to as a highest frequency domain resource for short.

Figure 11A:
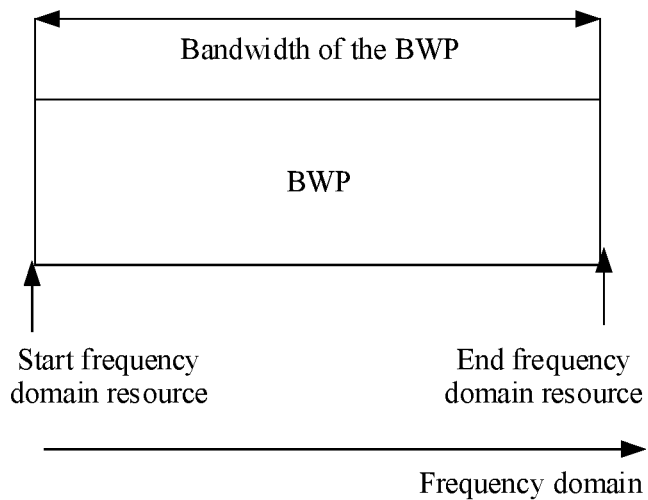
FIG. 11A is a schematic diagram of a bandwidth part according to an embodiment of this application.

In this application, as shown in FIG. 11A, a start frequency domain resource of one BWP is a frequency domain resource corresponding to a lowest or smallest frequency domain resource number in the BWP, and an end frequency domain resource of one BWP is a frequency domain resource corresponding to a highest or largest frequency domain resource number in the BWP.

In this application, the lowest start frequency domain resource may be a frequency domain resource corresponding to a lowest or smallest frequency domain resource number, and the highest end frequency domain resource may be a frequency domain resource corresponding to a highest or largest frequency domain resource number. A frequency domain resource number may be an RB number, an RBG number, a subcarrier number, or the like.

Optionally, the size of the bandwidth for the UL BWP and the SL BWP may be greater than or equal to a size of a bandwidth of the UL BWP, or may be greater than or equal to a size of a bandwidth of the SL BWP.

A bandwidth size may also be referred to as a bandwidth for short.

Figure 12A:
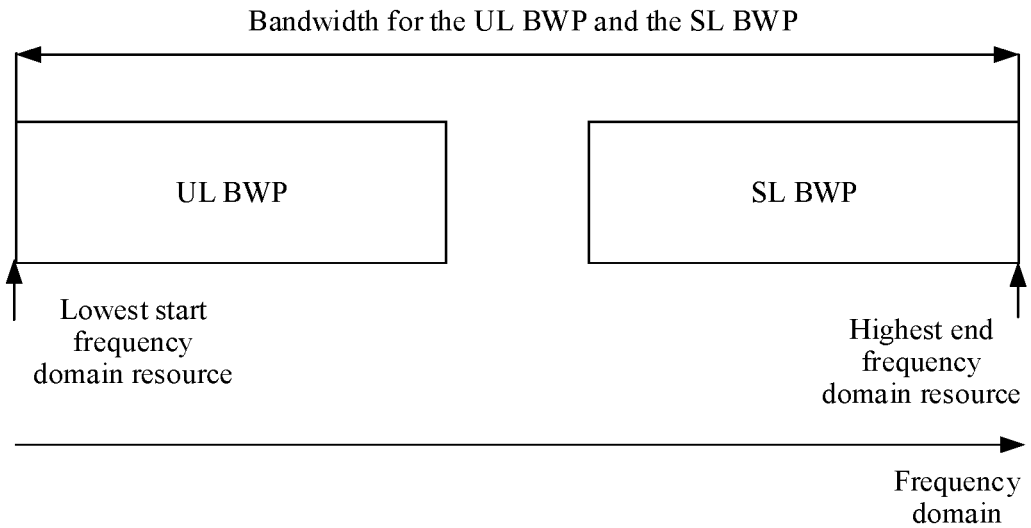
FIG. 12A is a schematic bandwidth diagram according to an embodiment of this application.
Figure 12B:
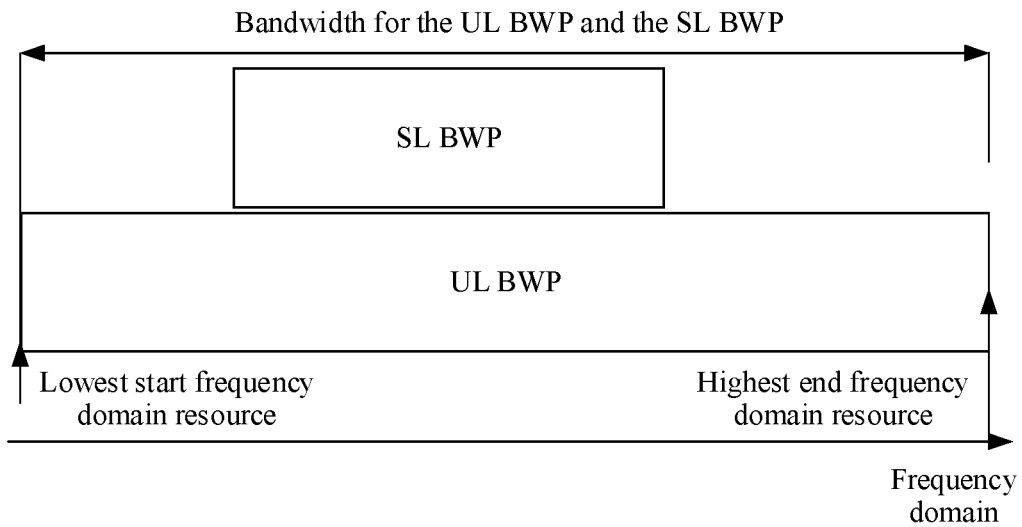
FIG. 12B is another schematic bandwidth diagram according to an embodiment of this application.
Figure 12C:
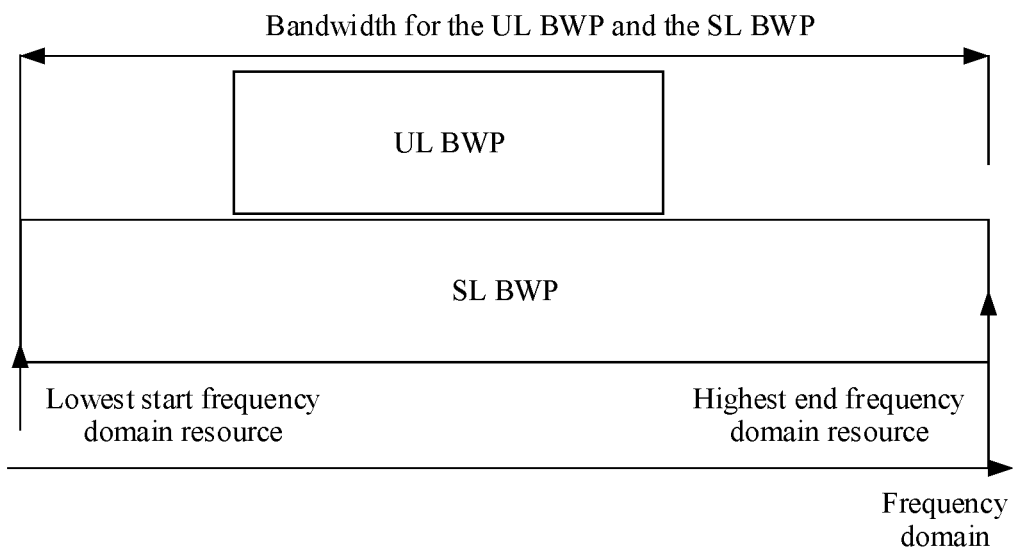
FIG. 12C is another schematic bandwidth diagram according to an embodiment of this application.
Figure 12D:
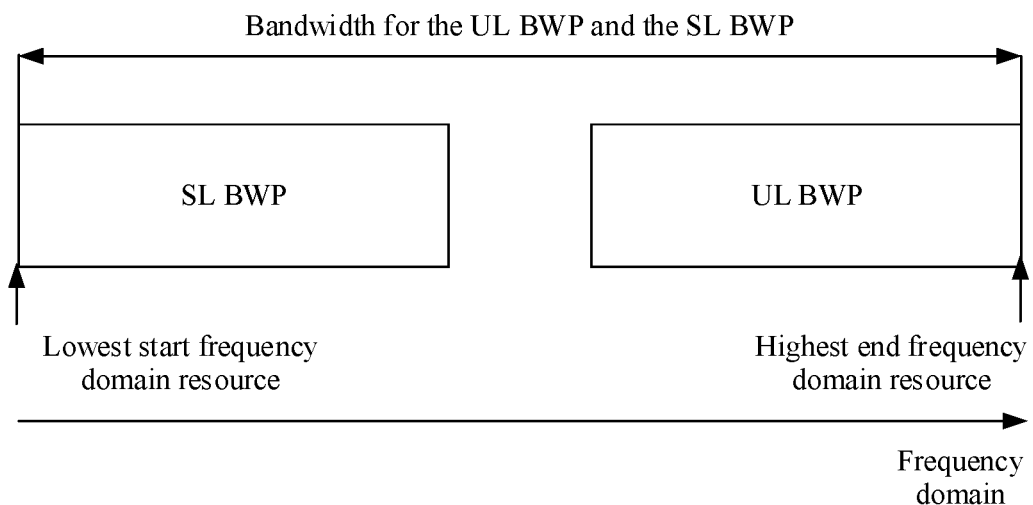
FIG. 12D is another schematic bandwidth diagram according to an embodiment of this application.
Figure 12E:
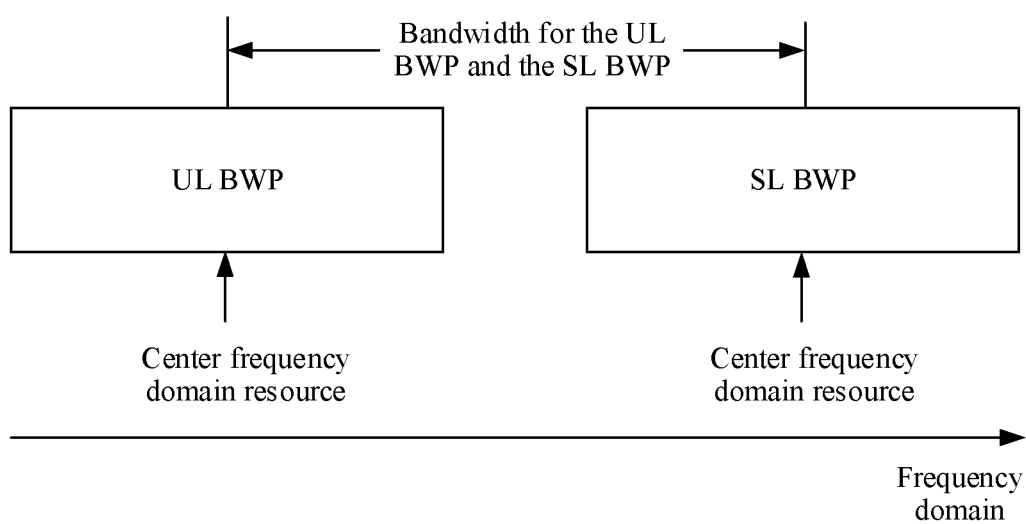
FIG. 12E is another schematic bandwidth diagram according to an embodiment of this application.

For example, in FIG. 12A, the size of the bandwidth for the UL BWP and the SL BWP may be a bandwidth between a start frequency domain resource in resources of the UL BWP and an end frequency domain resource in resources of the SL BWP. Alternatively, for example, in FIG. 12B, the size of the bandwidth for the UL BWP and the SL BWP may be a bandwidth between a start frequency domain resource of the UL BWP and an end frequency domain resource of the UL BWP. In this case, the size of the bandwidth for the UL BWP and the SL BWP is the size of the bandwidth of the UL BWP. Alternatively, for example, in FIG. 12C, the size of the bandwidth for the UL BWP and the SL BWP may be a bandwidth between a start frequency domain resource of the SL BWP and an end frequency domain resource of the SL BWP. In this case, the size of the bandwidth for the UL BWP and the SL BWP is the size of the bandwidth of the SL BWP. Alternatively, for example, in FIG. 12D, the size of the bandwidth for the UL BWP and the SL BWP may be a bandwidth between a start frequency domain resource in resources of the SL BWP and an end frequency domain resource in resources of the UL BWP. Alternatively, for example, in FIG. 12E, the size of the bandwidth for the UL BWP and the SL BWP may be a size of a bandwidth between a center frequency domain resource of the UL BWP and a center frequency domain resource of the SL BWP.

The bandwidth size in this application may be represented by using a resource quantity (for example, an RB quantity, an RBG quantity, or a subcarrier quantity), or may be represented by using a frequency unit or a bandwidth unit (for example, mega (M) or megahertz (MHz)).

Optionally, the determining the time of switching between uplink transmission and sidelink transmission based on a relationship between a size of the bandwidth for the UL BWP and the SL BWP and a size of the radio frequency bandwidth specifically includes: determining, based on that the size of the bandwidth for the UL BWP and the SL BWP is less than or equal to the size of the radio frequency bandwidth, that the delay of switching between uplink transmission and sidelink transmission is zero.

In S902, the terminal device may determine, based on that the size of the bandwidth for the UL BWP and the SL BWP is less than or equal to the size of the radio frequency bandwidth, that the delay of switching between uplink transmission and sidelink transmission is zero. In S1002, the network device may determine, based on that the size of the bandwidth for the UL BWP and the SL BWP is less than or equal to the size of the radio frequency bandwidth, that the delay of switching between uplink transmission and sidelink transmission performed by the terminal device is zero.

For example, if the size of the bandwidth for the UL BWP and the SL BWP is b1 RBs, the radio frequency bandwidth of the terminal device is b2 RBs, and b1 is less than or equal to b2, the delay of switching between uplink transmission and sidelink transmission is zero. For example, if the size of the bandwidth for the UL BWP and the SL BWP is b3 MHz, the radio frequency bandwidth of the terminal device is b4

MHz, and b3 is less than or equal to b4, the delay of switching between uplink transmission and sidelink transmission is zero.

According to the method, the terminal and/or the network device may determine, based on the relationship between the size of the bandwidth for the UL BWP and the SL BWP and the size of the radio frequency bandwidth, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.2: Determine the time of switching between uplink transmission and sidelink transmission based on a relationship between a position of the bandwidth for the UL BWP and the SL BWP and a position of the radio frequency bandwidth.

Optionally, the determining the time of switching between uplink transmission and sidelink transmission based on a relationship between a position of the bandwidth for the UL BWP and the SL BWP and a position of the radio frequency bandwidth specifically includes: when the bandwidth for the UL BWP and the SL BWP is within the radio frequency bandwidth or when the radio frequency bandwidth includes the bandwidth for the UL BWP and the SL BWP, determining that the delay of switching between uplink transmission and sidelink transmission is zero.

That the bandwidth for the UL BWP and the SL BWP is within the radio frequency bandwidth may be understood as that a bandwidth resource of the UL BWP and the SL BWP is included in a bandwidth resource in which the radio frequency bandwidth is located, or may be understood as that a frequency domain resource of the radio frequency bandwidth covers or includes a frequency domain resource of the UL BWP and the SL BWP.

In S902, the terminal device may determine, based on that the bandwidth for the UL BWP and the SL BWP is within the radio frequency bandwidth, that the delay of switching between uplink transmission and sidelink transmission is zero. In S1002, the network device determines, based on that the bandwidth for the UL BWP and the SL BWP is within the radio frequency bandwidth, that the delay of switching between uplink transmission and sidelink transmission performed by the terminal device is zero.

Figure 13:
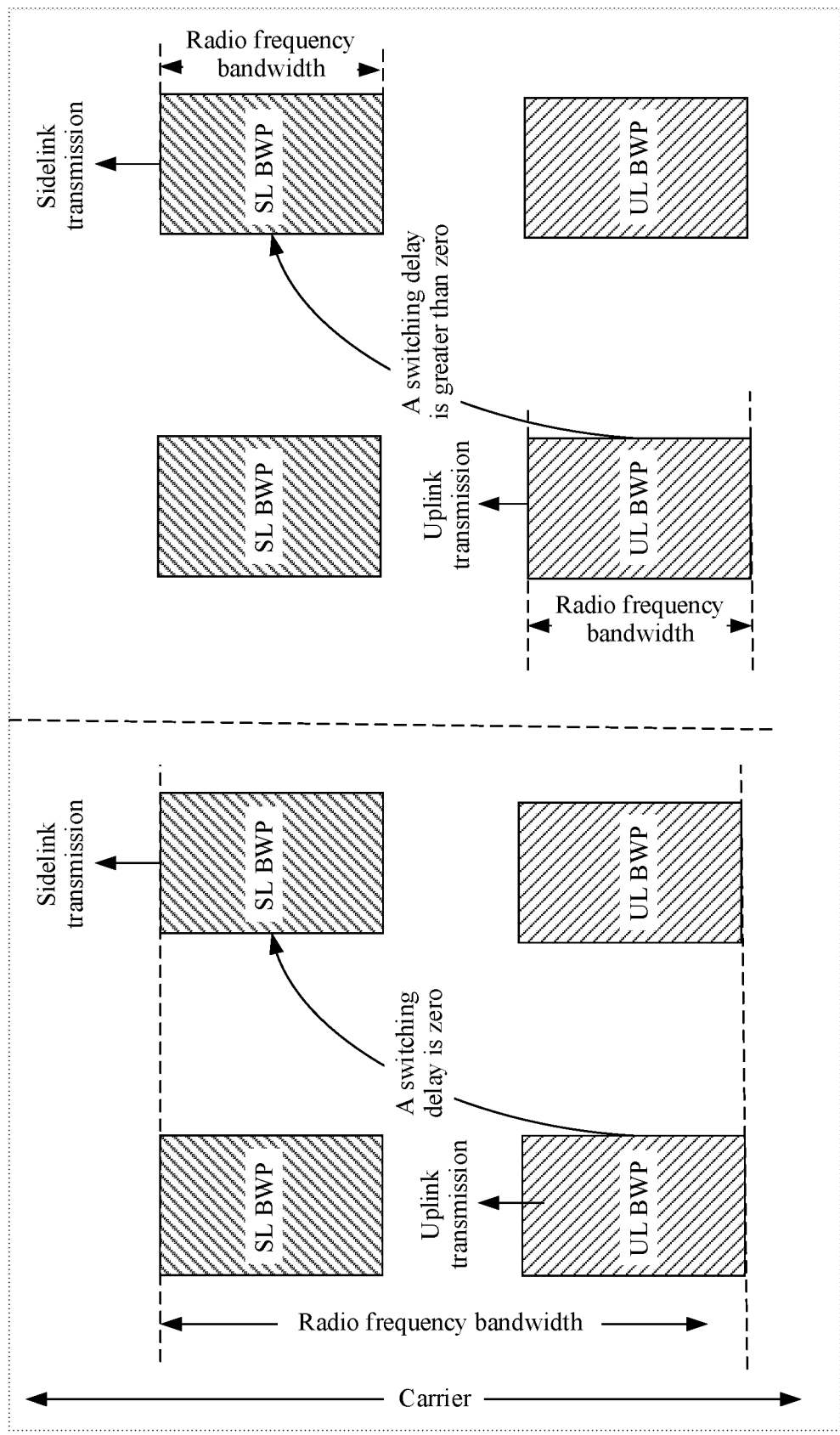
FIG. 13 is a schematic switching diagram according to an embodiment of this application.

For example, as shown in FIG. 13, in a left diagram, the bandwidth for the UL BWP and the SL BWP is within the radio frequency bandwidth (RF bandwidth). If the terminal device performs uplink transmission at a first moment and the terminal device performs sidelink transmission at a next moment, the delay of switching between uplink transmission and sidelink transmission is zero. In a right diagram, the bandwidth for the UL BWP and the SL BWP is not within the radio frequency bandwidth (RF bandwidth). If the terminal device performs uplink transmission at a first moment, the terminal device sets the radio frequency bandwidth on the UL BWP. If the terminal device performs sidelink transmission at a next moment, the terminal device needs to switch a position of the radio frequency bandwidth, for example, the terminal device sets the radio frequency bandwidth on the SL BWP. In this case, the delay of switching between uplink transmission and sidelink transmission is greater than zero.

According to the method, the terminal and/or the network device may determine, based on the relationship between the position of the bandwidth for the UL BWP and the SL BWP and the position of the radio frequency bandwidth, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.3: Determine the time of switching between uplink transmission and sidelink transmission based on a relationship between a size of a bandwidth of a resource pool in the UL BWP and the SL BWP and a size of the radio frequency bandwidth.

In this application, the bandwidth of the resource pool in the UL BWP and the SL BWP may be understood as a total size of a bandwidth occupied by a resource of the UL BWP and a resource in a resource pool in the SL BWP. To be specific, the bandwidth of the resource pool in the UL BWP and the SL BWP is a segment of contiguous resources and the resources include the resource of the UL BWP and the resource in the resource pool in the SL BWP.

In this application, the size of the bandwidth of the resource pool in the UL BWP and the SL BWP may be a size of a bandwidth between a lowest start frequency domain resource in the resource pool in the UL BWP and the SL BWP and a highest end frequency domain resource in the resource pool in the UL BWP and the SL BWP.

In this application, the lowest start frequency domain resource in the resource pool in the UL BWP and the SL BWP may be a lower start frequency domain resource in a start frequency domain resource of the UL BWP and a start frequency domain resource in the resource pool in the SL BWP; and the highest end frequency domain resource in the resource pool in the UL BWP and the SL BWP may be a higher end frequency domain resource in an end frequency domain resource of the UL BWP and an end frequency domain resource in the resource pool in the SL BWP.

In this application, the resource pool in the SL BWP may be a resource pool configured in the SL BWP, or may be a resource pool used by the terminal device to perform sidelink communication in the SL BWP.

In this application, the resource pool (RP) in the SL BWP may include a transmission resource pool (Tx RP) and/or a receiving resource pool (RX RP).

In this application, the resource pool in the SL BWP may alternatively be replaced with a transmission resource pool in the SL BWP, or may be replaced with a receiving resource pool in the SL BWP.

For example, the time of switching between uplink transmission and sidelink transmission is determined based on a relationship between a size of a bandwidth of a transmission resource pool in the UL BWP and the SL BWP and the size of the radio frequency bandwidth.

A lowest start frequency domain resource may also be referred to as a lowest frequency domain resource for short, and a highest end frequency domain resource may also be referred to as a highest frequency domain resource for short.

Figure 11B:
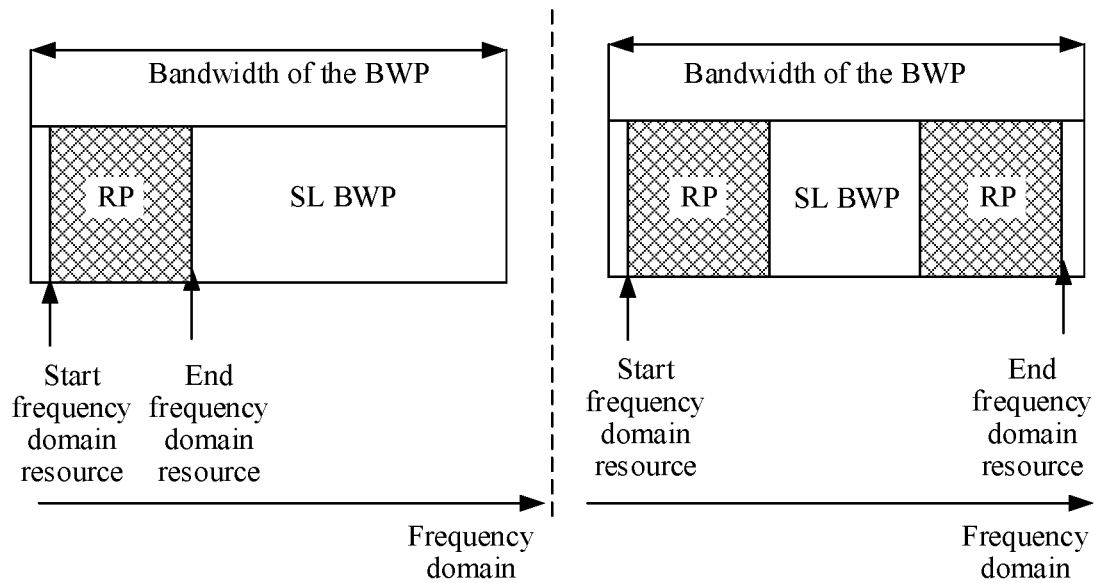
FIG. 11B is a schematic diagram of another bandwidth part according to an embodiment of this application.

In this application, as shown in FIG. 11B, a start frequency domain resource in a resource pool in one BWP is a frequency domain resource corresponding to a lowest or smallest frequency domain resource number in the resource pool in the BWP, and an end frequency domain resource in a resource pool in one BWP is a frequency domain resource corresponding to a highest or largest frequency domain resource number in the resource pool in the BWP.

In this application, the lowest start frequency domain resource may be a frequency domain resource corresponding to a lowest or smallest frequency domain resource number, and the highest end frequency domain resource may be a frequency domain resource corresponding to a highest or largest frequency domain resource number. A frequency domain resource number may be an RB number, an RBG number, a subcarrier number, or the like.

Optionally, the size of the bandwidth of the resource pool in the UL BWP and the SL BWP may be greater than or equal to a size of a bandwidth of the UL BWP, or may be greater than or equal to a size of a bandwidth of the SL BWP.

A bandwidth size may also be referred to as a bandwidth for short.

Figure 14A:
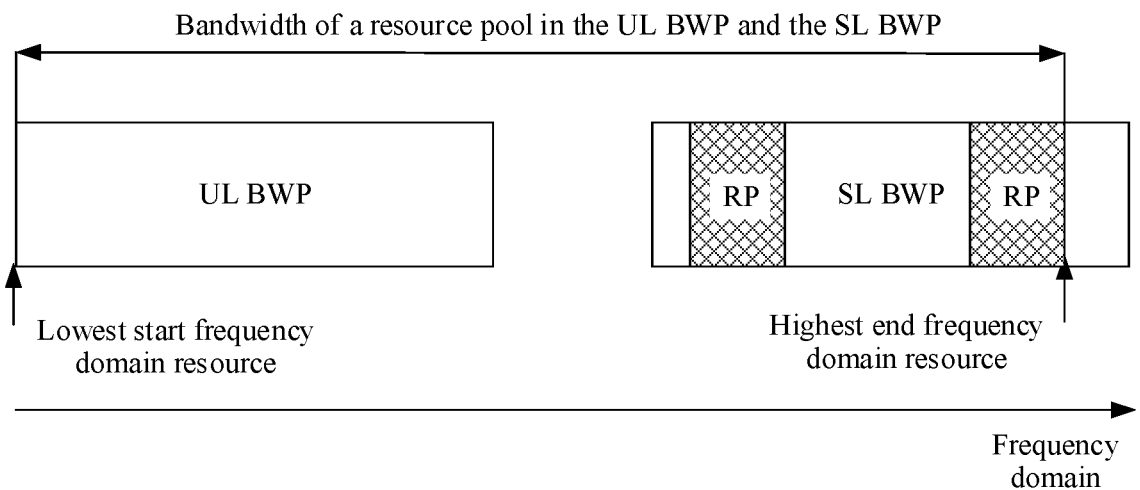
FIG. 14A is another schematic bandwidth diagram according to an embodiment of this application.
Figure 14B:
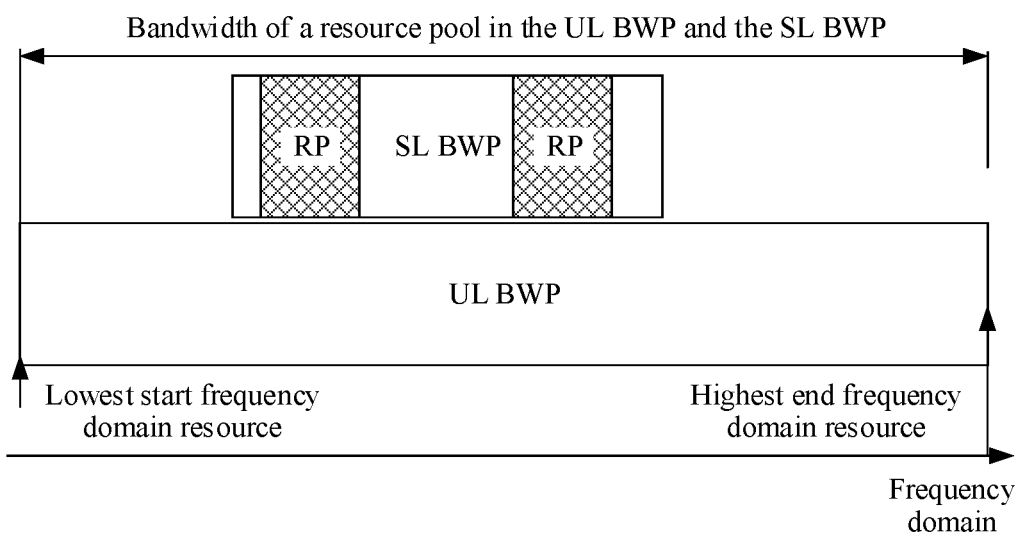
FIG. 14B is another schematic bandwidth diagram according to an embodiment of this application.
Figure 14C:
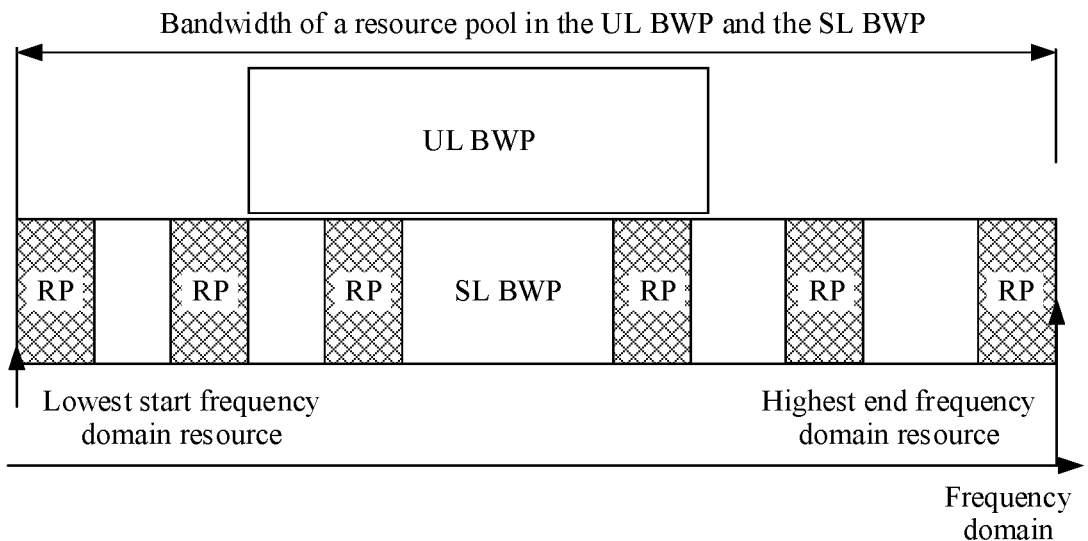
FIG. 14C is another schematic bandwidth diagram according to an embodiment of this application.
Figure 14D:
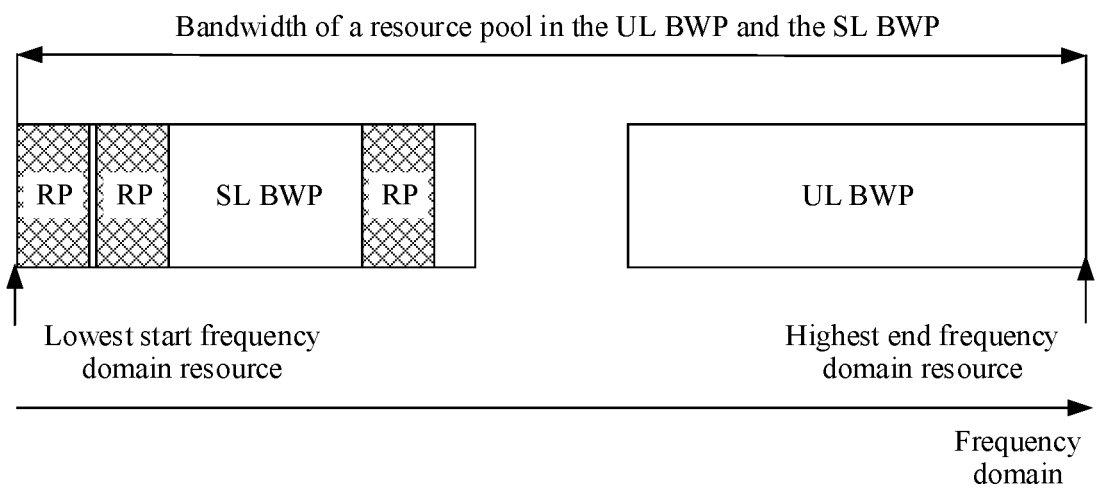
FIG. 14D is another schematic bandwidth diagram according to an embodiment of this application.
Figure 14E:
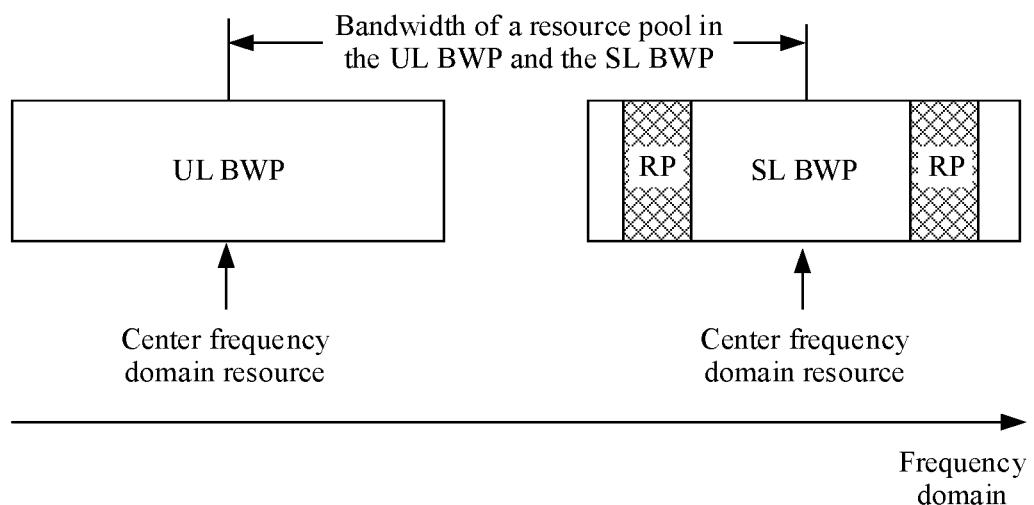
FIG. 14E is another schematic bandwidth diagram according to an embodiment of this application.

For example, in FIG. 14A, the size of the bandwidth of the resource pool in the UL BWP and the SL BWP may be a bandwidth between a start frequency domain resource in resources of the UL BWP and an end frequency domain resource in resources of the resource pool in the SL BWP. Alternatively, for example, in FIG. 14B, the size of the bandwidth of the resource pool in the UL BWP and the SL BWP may be a bandwidth between a start frequency domain resource of the UL BWP and an end frequency domain resource of the UL BWP. In this case, the size of the bandwidth of the resource pool in the UL BWP and the SL BWP is the size of the bandwidth of the UL BWP. Alternatively, for example, in FIG. 14C, the size of the bandwidth of the resource pool in the UL BWP and the SL BWP may be a bandwidth between a start frequency domain resource in the resource pool in the SL BWP and an end frequency domain resource in the resource pool in the SL BWP. In this case, the size of the bandwidth of the resource pool in the UL BWP and the SL BWP is a total size of a bandwidth of the resource pool in the UL BWP, for example, may be the size of the bandwidth of the SL BWP. Alternatively, for example, in FIG. 14D, the size of the bandwidth of the resource pool in the UL BWP and the SL BWP may be a bandwidth between a start frequency domain resource in resources of the resource pool in the SL BWP and an end frequency domain resource in resources of the UL BWP. Alternatively, for example, in FIG. 14E, the size of the bandwidth of the resource pool in the UL BWP and the SL BWP may be a size of a bandwidth between a center frequency domain resource of the UL BWP and a center frequency domain resource of the SL BWP.

The bandwidth size in this application may be represented by using a resource quantity (for example, an RB quantity, an RBG quantity, or a subcarrier quantity), or may be represented by using a frequency unit or a bandwidth unit (for example, mega (M) or megahertz (MHz)).

Optionally, the determining the time of switching between uplink transmission and sidelink transmission based on a relationship between a size of a bandwidth of a resource pool in the UL BWP and the SL BWP and a size of the radio frequency bandwidth specifically includes: when the size of the bandwidth of the resource pool in the UL BWP and the SL BWP is less than or equal to the size of the radio frequency bandwidth, determining that the delay of switching between uplink transmission and sidelink transmission is zero.

In S902, the terminal device may determine, based on that the size of the bandwidth of the resource pool in the UL BWP and the SL BWP is less than or equal to the size of the radio frequency bandwidth, that the delay of switching between uplink transmission and sidelink transmission is zero. In S1002, the network device may determine, based on that the size of the bandwidth of the resource pool in the UL BWP and the SL BWP is less than or equal to the size of the radio frequency bandwidth, that the delay of switching between uplink transmission and sidelink transmission is zero.

For example, if the size of the bandwidth of the resource pool in the UL BWP and the SL BWP is b1 RBs, the radio frequency bandwidth of the terminal device is b2 RBs, and b1 is less than or equal to b2, the delay of switching between uplink transmission and sidelink transmission is zero. For example, if the size of the bandwidth of the resource pool in the UL BWP and the SL BWP is b3 MHz, the radio frequency bandwidth of the terminal device is b4 MHz, and b3 is less than or equal to b4, the delay of switching between uplink transmission and sidelink transmission is zero.

Optionally, the determining the time of switching between uplink transmission and sidelink transmission based on a relationship between a size of a bandwidth of a transmission resource pool in the UL BWP and the SL BWP and the size of the radio frequency bandwidth specifically includes: when the size of the bandwidth of the transmission resource pool in the UL BWP and the SL BWP is less than or equal to the size of the radio frequency bandwidth, determining that the delay of switching between uplink transmission and sidelink transmission is zero.

In S902, the terminal device may determine, based on that the size of the bandwidth of the transmission resource pool in the UL BWP and the SL BWP is less than or equal to the size of the radio frequency bandwidth, that the delay of switching between uplink transmission and sidelink transmission is zero. In S1002, the network device may determine, based on that the size of the bandwidth of the transmission resource pool in the UL BWP and the SL BWP is less than or equal to the size of the radio frequency bandwidth, that the delay of switching between uplink transmission and sidelink transmission performed by the terminal device is zero.

For example, if the size of the bandwidth of the transmission resource pool in the UL BWP and the SL BWP is b1 RBs, the radio frequency bandwidth of the terminal device is b2 RBs, and b1 is less than or equal to b2, the delay of switching between uplink transmission and sidelink transmission is zero. For example, if the size of the bandwidth of the transmission resource pool in the UL BWP and the SL BWP is b3 MHz, the radio frequency bandwidth of the terminal device is b4 MHz, and b3 is less than or equal to b4, the delay of switching between uplink transmission and sidelink transmission is zero.

According to the method, the terminal and/or the network device may determine, based on the relationship between the size of the bandwidth of the resource pool in the UL BWP and the SL BWP and the size of the radio frequency bandwidth, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.4: Determine the time of switching between uplink transmission and sidelink transmission based on a relationship between a position of a bandwidth of a resource pool in the UL BWP and the SL BWP and a position of the radio frequency bandwidth.

Optionally, the determining the time of switching between uplink transmission and sidelink transmission based on a relationship between a position of a bandwidth of a resource pool in the UL BWP and the SL BWP and a position of the radio frequency bandwidth specifically includes: when the bandwidth of the resource pool in the UL BWP and the SL BWP is within the radio frequency bandwidth or when the radio frequency bandwidth includes the resource pool in the UL BWP and the SL BWP, determining that the delay of switching between uplink transmission and sidelink transmission is zero.

In S902, the terminal device may determine, based on that the bandwidth of the resource pool in the UL BWP and the SL BWP is within the radio frequency bandwidth, that the delay of switching between uplink transmission and sidelink transmission is zero. In S1002, the network device may determine, based on that the bandwidth of the resource pool in the UL BWP and the SL BWP is within the radio frequency bandwidth, that the delay of switching between uplink transmission and sidelink transmission performed by the terminal device is zero.

Optionally, that the radio frequency bandwidth includes the resource pool in the UL BWP and the SL BWP may mean that the radio frequency bandwidth includes the UL BWP and at least one resource pool in the SL BWP, or may mean that the radio frequency bandwidth includes the UL BWP and all configured resource pools in the SL BWP. A resource pool may be a transmission resource pool and/or a receiving resource pool.

In this application, the resource pool in the SL BWP may be a resource pool configured in the SL BWP, or may be a resource pool used by the terminal device to perform sidelink communication in the SL BWP.

In this application, the resource pool (RP) in the SL BWP may include a transmission resource pool (Tx RP) and/or a receiving resource pool (RX RP).

Optionally, in this application, the resource pool in the SL BWP may alternatively be replaced with a transmission resource pool in the SL BWP, or may be replaced with a receiving resource pool in the SL BWP.

Optionally, the determining the time of switching between uplink transmission and sidelink transmission based on a relationship between a position of a bandwidth of a transmission resource pool in the UL BWP and the SL BWP and a position of the radio frequency bandwidth specifically includes: when the bandwidth of the transmission resource pool in the UL BWP and the SL BWP is within the radio frequency bandwidth, determining that the delay of switching between uplink transmission and sidelink transmission is zero.

In S902, the terminal device may determine, based on that the bandwidth of the transmission resource pool in the UL BWP and the SL BWP is within the radio frequency bandwidth, that the delay of switching between uplink transmission and sidelink transmission is zero. In S1002, the network device may determine, based on that the bandwidth of the transmission resource pool in the UL BWP and the SL BWP is within the radio frequency bandwidth, that the delay of switching between uplink transmission and sidelink transmission performed by the terminal device is zero.

Figure 15:
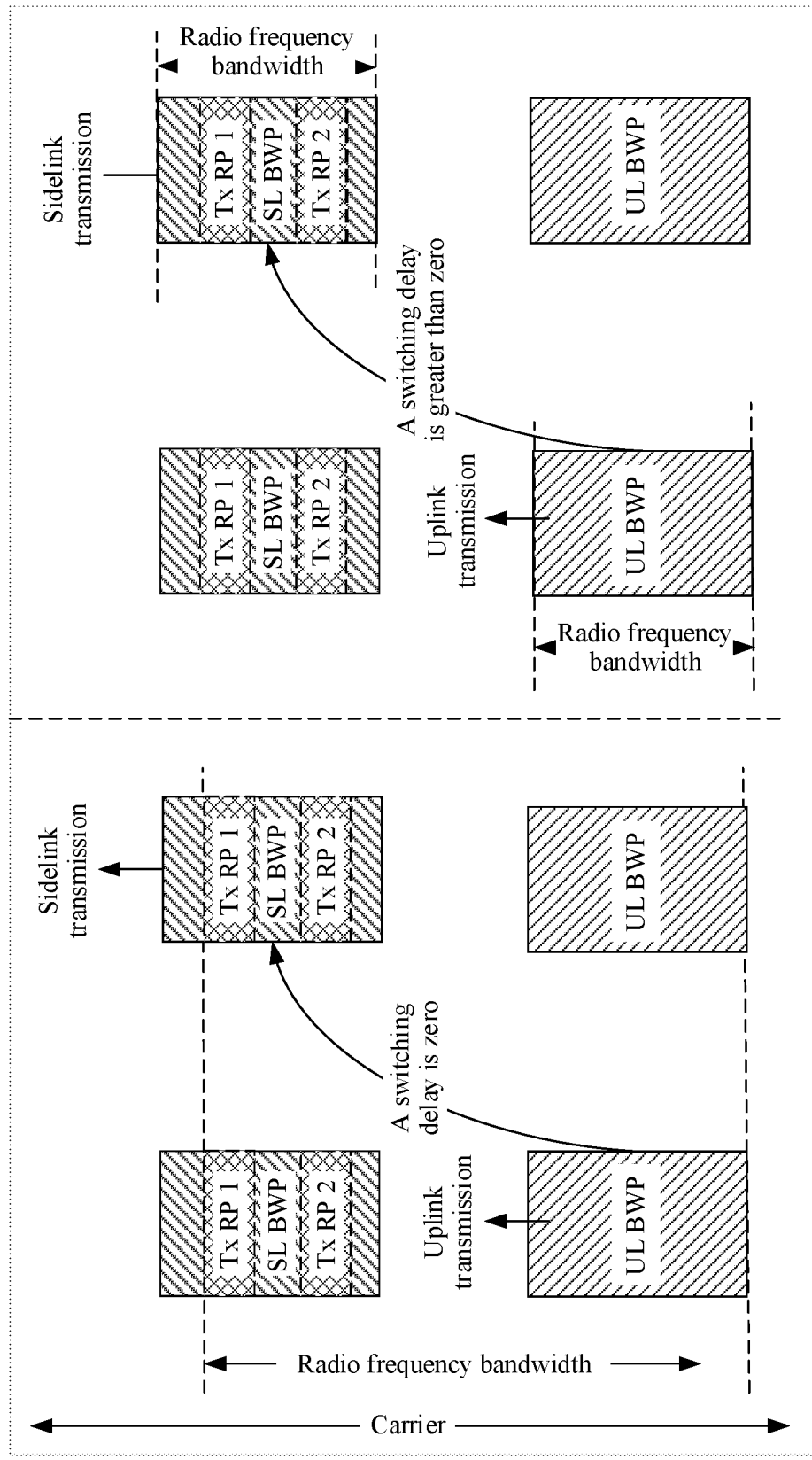
FIG. 15 is another schematic switching diagram according to an embodiment of this application.

For example, as shown in FIG. 15, in a left diagram, the bandwidth of the transmission resource pool in the UL BWP and the SL BWP is within the radio frequency bandwidth (RF bandwidth). If the terminal device performs uplink transmission at a first moment and the terminal device performs sidelink transmission at a next moment, the delay of switching between uplink transmission and sidelink transmission is zero. In a right diagram, the bandwidth of the transmission resource pool in the UL BWP and the SL BWP is not within the radio frequency bandwidth (RF bandwidth). If the terminal device performs uplink transmission at a first moment, the terminal device sets the radio frequency bandwidth on the UL BWP. If the terminal device performs sidelink transmission at a next moment, the terminal device needs to switch a position of the radio frequency bandwidth, for example, the terminal device sets the radio frequency bandwidth on the transmission resource pool in the SL BWP.

In this case, the delay of switching between uplink transmission and sidelink transmission is greater than zero.

According to the method, the terminal and/or the network device may determine, based on the relationship between the position of the bandwidth of the resource pool in the UL BWP and the SL BWP and the position of the radio frequency bandwidth, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.5: Determine the time of switching between uplink transmission and sidelink transmission based on a relationship between a position of the UL BWP and a position of a resource pool in the SL BWP.

Optionally, the determining the time of switching between uplink transmission and sidelink transmission based on a relationship between a position of the UL BWP and a position of a resource pool in the SL BWP specifically includes: when the UL BWP includes the resource pool in the SL BWP, determining that the delay of switching between uplink transmission and sidelink transmission is zero; or when the resource pool in the SL BWP is located in a bandwidth of the UL BWP, determining that the delay of switching between uplink transmission and sidelink transmission is zero.

Optionally, that the UL BWP includes the resource pool in the SL BWP may mean that the UL BWP includes at least one resource pool in the SL BWP, or may mean that the UL BWP includes all configured resource pools in the SL BWP. A resource pool may be a transmission resource pool and/or a receiving resource pool.

In S902, the terminal device may determine, based on that the UL BWP includes the resource pool in the SL BWP, that the delay of switching between uplink transmission and sidelink transmission is zero; or the terminal device may determine, based on that the resource pool in the SL BWP is located in the bandwidth of the UL BWP, that the delay of switching between uplink transmission and sidelink transmission is zero. In S1002, the network device may determine, based on that the UL BWP includes the resource pool in the SL BWP, that the delay of switching between uplink transmission and sidelink transmission performed by the terminal device is zero; or the network device may determine, based on that the resource pool in the SL BWP is located in the bandwidth of the UL BWP, that the delay of switching between uplink transmission and sidelink transmission performed by the terminal device is zero.

In this application, the resource pool in the SL BWP may be a resource pool configured in the SL BWP, or may be a resource pool used by the terminal device to perform sidelink communication in the SL BWP.

In this application, the resource pool (RP) in the SL BWP may include a transmission resource pool (Tx RP) and/or a receiving resource pool (RX RP).

Optionally, in this application, the resource pool in the SL BWP may alternatively be replaced with a transmission resource pool in the SL BWP, or may be replaced with a receiving resource pool in the SL BWP.

Optionally, the determining the time of switching between uplink transmission and sidelink transmission based on a relationship between a position of the UL BWP and a position of a transmission resource pool in the SL BWP specifically includes: when the UL BWP includes the transmission resource pool in the SL BWP, determining that the delay of switching between uplink transmission and sidelink transmission is zero; or when the transmission resource pool in the SL BWP is located in a bandwidth of the UL BWP, determining that the delay of switching between uplink transmission and sidelink transmission is zero.

In S902, the terminal device may determine, based on that the UL BWP includes the transmission resource pool in the SL BWP, that the delay of switching between uplink transmission and sidelink transmission is zero; or the terminal device may determine, based on that the transmission resource pool in the SL BWP is located in the bandwidth of the UL BWP, that the delay of switching between uplink transmission and sidelink transmission is zero. In S1002, the network device may determine, based on that the UL BWP includes the transmission resource pool in the SL BWP, that the delay of switching between uplink transmission and sidelink transmission performed by the terminal device is zero; or the network device may determine, based on that the transmission resource pool in the SL BWP is located in the bandwidth of the UL BWP, that the delay of switching between uplink transmission and sidelink transmission performed by the terminal device is zero.

Figure 16:
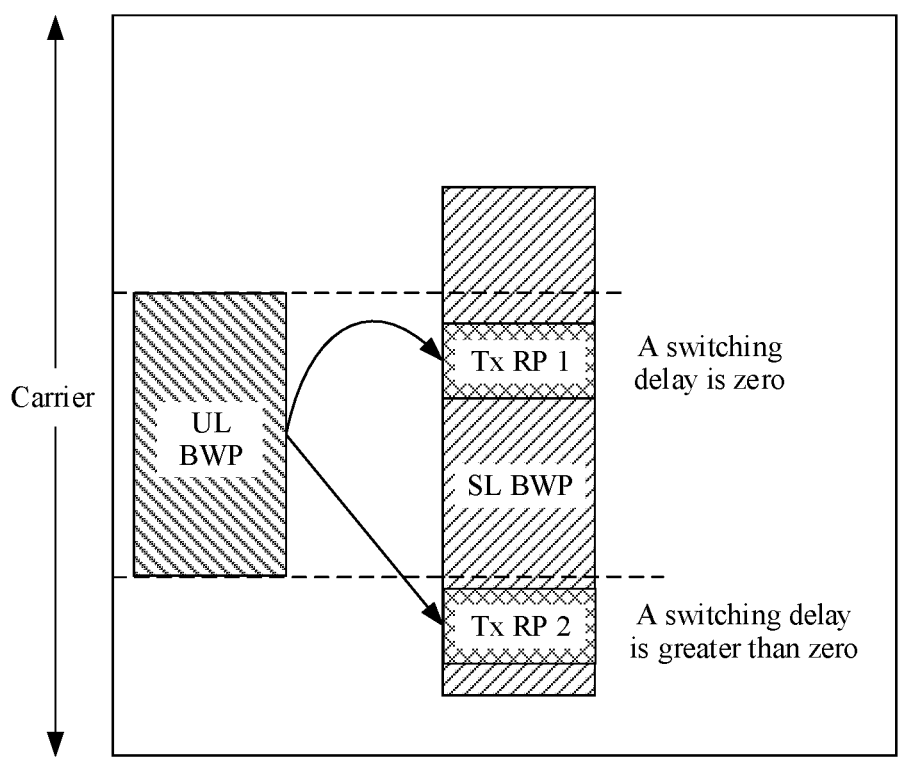
FIG. 16 is another schematic switching diagram according to an embodiment of this application.

For example, as shown in FIG. 16, if the transmission resource pool in the SL BWP of the terminal device is a Tx RP 1, the UL BWP includes the transmission resource pool in the SL BWP, or the transmission resource pool in the SL BWP is included in the UL BWP. In this case, the delay of switching between uplink transmission and sidelink transmission is zero. If the transmission resource pool in the SL BWP of the terminal device is a Tx RP 2, the UL BWP does not include the transmission resource pool in the SL BWP, or the transmission resource pool in the SL BWP is not included in the UL BWP. In this case, the delay of switching between uplink transmission and sidelink transmission is greater than zero.

Figure 17:
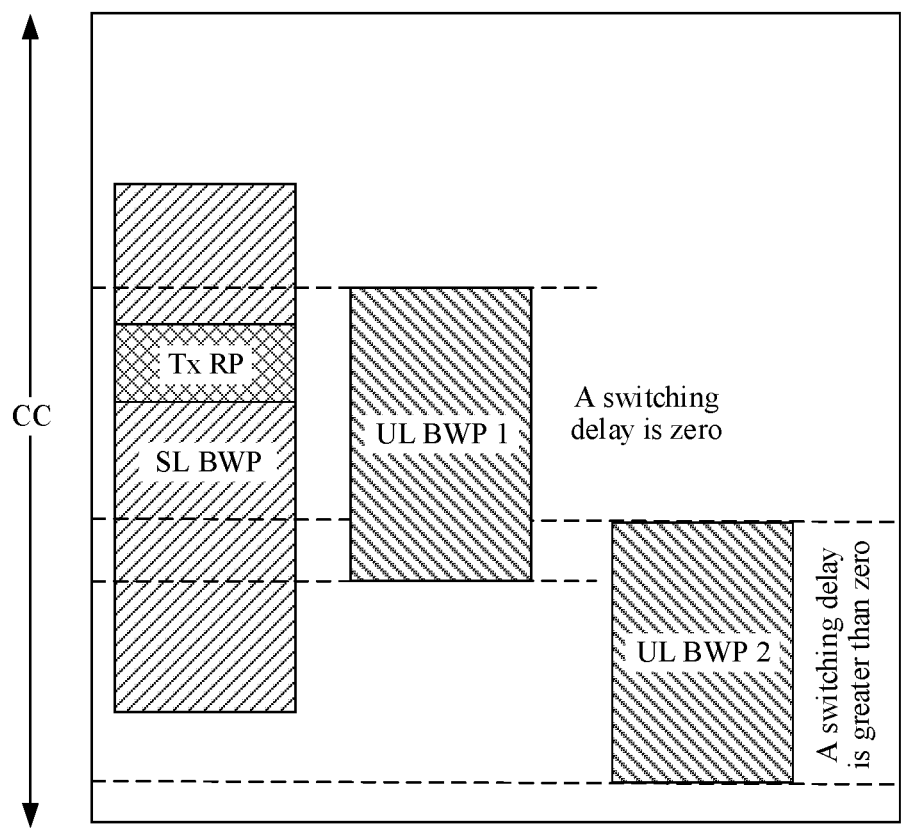
FIG. 17 is another schematic switching diagram according to an embodiment of this application.

For example, as shown in FIG. 17, if the transmission resource pool in the SL BWP of the terminal device is a Tx RP, and the activated UL BWP of the terminal device is a UL BWP 1, the UL BWP includes the transmission resource pool in the SL BWP, or the transmission resource pool in the SL BWP is included in the UL BWP. In this case, the delay of switching between uplink transmission and sidelink transmission is zero. If the transmission resource pool in the SL BWP of the terminal device is a Tx RP, and the activated UL BWP of the terminal device is a UL BWP 2, the UL BWP does not include the transmission resource pool in the SL BWP, or the transmission resource pool in the SL BWP is not included in the UL BWP. In this case, the delay of switching between uplink transmission and sidelink transmission is greater than zero.

According to the method, the terminal and/or the network device may determine, based on the relationship between the position of the UL BWP and the position of the resource pool in the SL BWP, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.6: Determine the time of switching between uplink transmission and sidelink transmission based on a relationship between a position of a center carrier frequency of the UL BWP and a position of a center carrier frequency of the SL BWP.

Optionally, the position of the center carrier frequency of the UL BWP may be the same as the position of the center carrier frequency of the SL BWP, or there may be a segment of frequency domain resources between the position of the center carrier frequency of the UL BWP and the position of the center carrier frequency of the SL BWP.

Optionally, the determining the time of switching between uplink transmission and sidelink transmission based on a relationship between a position of a center carrier frequency of the UL BWP and a position of a center carrier frequency of the SL BWP specifically includes: when the position of the center carrier frequency of the UL BWP is the same as the position of the center carrier frequency of the SL BWP, determining that the delay of switching between uplink transmission and sidelink transmission is zero.

In S902, the terminal device may determine, based on that the position of the center carrier frequency of the UL BWP is the same as the position of the center carrier frequency of the SL BWP, that the delay of switching between uplink transmission and sidelink transmission is zero. In S1002, the network device may determine, based on that the position of the center carrier frequency of the UL BWP is the same as the position of the center carrier frequency of the SL BWP, that the delay of switching between uplink transmission and sidelink transmission performed by the terminal device is zero.

Optionally, the determining the time of switching between uplink transmission and sidelink transmission based on a relationship between a spacing threshold and a bandwidth of a frequency domain resource between a position of a center carrier frequency of the UL BWP and a position of a center carrier frequency of the SL BWP specifically includes: when the bandwidth of the frequency domain resource between the position of the center carrier frequency of the UL BWP and the position of the center carrier frequency of the SL BWP is less than or equal to the spacing threshold, determining that the delay of switching between uplink transmission and sidelink transmission is zero.

In S902, the terminal device may determine, based on that the bandwidth of the frequency domain resource between the position of the center carrier frequency of the UL BWP and the position of the center carrier frequency of the SL BWP is less than or equal to the spacing threshold, that the delay of switching between uplink transmission and sidelink transmission is zero. In S1002, the network device may determine, based on that the bandwidth of the frequency domain resource between the position of the center carrier frequency of the UL BWP and the position of the center carrier frequency of the SL BWP is less than or equal to the spacing threshold, that the delay of switching between uplink transmission and sidelink transmission performed by the terminal device is zero.

The spacing threshold may be predefined, or may be configured by a base station, an operator, or a core network.

Figures 18A, 18B:
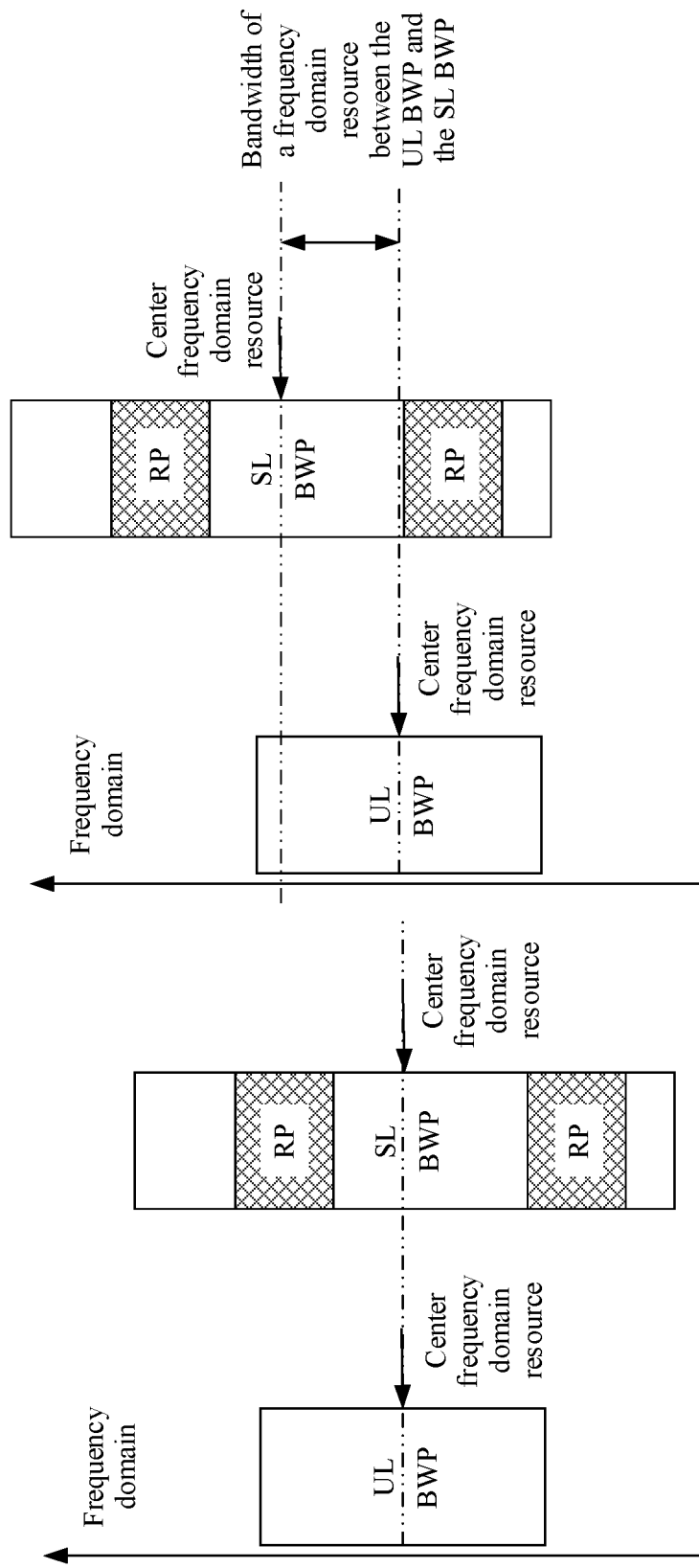
FIG. 18(*a*) and FIG. 18(*b*) are a schematic diagram of another bandwidth part according to an embodiment of this application.

For example, as shown in FIG. 18(a), the position of the center carrier frequency of the UL BWP is the same as the position of the center carrier frequency of the SL BWP, and the delay of switching between uplink transmission and sidelink transmission is zero. As shown in FIG. 18(b), there is a bandwidth of a frequency domain resource between the position of the center carrier frequency of the UL BWP and the position of the center carrier frequency of the SL BWP. If the bandwidth of the frequency domain resource between the position of the center carrier frequency of the UL BWP and the position of the center carrier frequency of the SL BWP is less than or equal to the spacing threshold, the delay of switching between uplink transmission and sidelink transmission is zero; or if the bandwidth of the frequency domain resource between the position of the center carrier frequency of the UL BWP and the position of the center carrier frequency of the SL BWP is greater than the spacing threshold, the delay of switching between uplink transmission and sidelink transmission is zero is greater than zero.

According to the method, the terminal and/or the network device may determine, based on the relationship between the position of the center carrier frequency of the UL BWP and the position of the center carrier frequency of the SL BWP, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.7: Determine the time of switching between uplink transmission and sidelink transmission based on a relationship between a position of the UL BWP and a position of the SL BWP.

Optionally, the determining the time of switching between uplink transmission and sidelink transmission based on a relationship between a position of the UL BWP and a position of the SL BWP specifically includes: when a bandwidth of the UL BWP includes a bandwidth of the SL BWP, determining that the delay of switching between uplink transmission and sidelink transmission is zero; or when a bandwidth of the SL BWP includes a bandwidth of the UL BWP, determining that the delay of switching between uplink transmission and sidelink transmission is zero.

That the bandwidth of the UL BWP includes the bandwidth of the SL BWP may mean that the bandwidth of the SL BWP is within the bandwidth of the UL BWP. That the bandwidth of the SL BWP includes the bandwidth of the UL BWP may mean that the bandwidth of the UL BWP is within the bandwidth of the SL BWP.

In this application, that a bandwidth of one BWP is within a bandwidth of another BWP may be understood as that a frequency domain resource of the BWP is included in a frequency domain resource of the another BWP; or may be understood as that a lowest frequency domain position of a frequency domain resource of the BWP is higher than or equal to a lowest frequency domain position of a frequency domain resource of the another BWP, and a highest frequency domain position of a frequency domain resource of the BWP is lower than or equal to a highest frequency domain position of a frequency domain resource of the another BWP.

A lowest frequency domain position may be a position at which a lowest or smallest frequency domain resource number is located, and a highest frequency domain position may be a position at which a highest or largest frequency domain resource number is located. A frequency domain resource number may be an RB number, an RBG number, a subcarrier number, or the like.

In S902, the terminal device may determine, based on that the bandwidth of the UL BWP includes the bandwidth of the SL BWP, that the delay of switching between uplink transmission and sidelink transmission is zero; or the terminal device may determine, based on that the bandwidth of the SL BWP includes the bandwidth of the UL BWP, that the delay of switching between uplink transmission and sidelink transmission is zero. In S1002, the network device may determine, based on that the bandwidth of the UL BWP includes the bandwidth of the SL BWP, that the delay of switching between uplink transmission and sidelink transmission performed by the terminal device is zero; or the network device may determine, based on that the bandwidth of the SL BWP includes the bandwidth of the UL BWP, that the delay of switching between uplink transmission and sidelink transmission performed by the terminal device is zero.

For example, as shown in FIG. 19(a), if the bandwidth of the SL BWP includes the bandwidth of the UL BWP or the bandwidth of the UL BWP is included in the bandwidth of the SL BWP, the delay of switching between uplink transmission and sidelink transmission is zero. For example, as shown in FIG. 19(b), if the bandwidth of the UL BWP includes the bandwidth of the SL BWP or the bandwidth of the SL BWP is included in the bandwidth of the UL BWP, the delay of switching between uplink transmission and sidelink transmission is zero.

According to the method, the terminal and/or the network device may determine, based on the relationship between the position of the UL BWP and the position of the SL BWP, that the delay of switching between uplink transmission and sidelink transmission is zero. This can implement transmission of uplink data and sidelink data in time, and reduce a data transmission delay. In addition, this can also prevent a resource waste caused by an unclear switching delay.

Method 3.8: Determine the delay of switching between uplink transmission and sidelink transmission for any one of the foregoing methods 3.1 to 3.7 based on a frame structure parameter of the UL BWP and a frame structure parameter of the SL BWP.

The frame structure parameter of the UL BWP may be the same as the frame structure parameter of the SL BWP, or it may be understood that a subcarrier spacing of the UL BWP is the same as a subcarrier spacing of the SL BWP.

For example, the determining the delay of switching between uplink transmission and sidelink transmission for the method 3.1 based on a frame structure parameter of the UL BWP and a frame structure parameter of the SL BWP is specifically: when the size of the bandwidth for the UL BWP and the SL BWP is less than or equal to the size of the radio frequency bandwidth, and the frame structure parameter of the UL BWP is the same as the frame structure parameter of the SL BWP, determining that the delay of switching between uplink transmission and sidelink transmission is zero. For other descriptions, refer to the descriptions in the method 3.1. Details are not described herein again.

For example, the determining the delay of switching between uplink transmission and sidelink transmission for the method 3.2 based on a frame structure parameter of the UL BWP and a frame structure parameter of the SL BWP is specifically: when the bandwidth for the UL BWP and the SL BWP is within the radio frequency bandwidth, and the frame structure parameter of the UL BWP is the same as the frame structure parameter of the SL BWP, determining that the delay of switching between uplink transmission and sidelink transmission is zero. For other descriptions, refer to the descriptions in the method 3.2. Details are not described herein again.

For example, the determining the delay of switching between uplink transmission and sidelink transmission for the method 3.3 based on a frame structure parameter of the UL BWP and a frame structure parameter of the SL BWP is specifically: when the size of the bandwidth of the resource pool in the UL BWP and the SL BWP is less than or equal to the size of the radio frequency bandwidth, and the frame structure parameter of the UL BWP is the same as the frame structure parameter of the SL BWP, determining that the delay of switching between uplink transmission and sidelink transmission is zero. For other descriptions, refer to the descriptions in the method 3.3. Details are not described herein again.

For example, the determining the delay of switching between uplink transmission and sidelink transmission for the method 3.4 based on a frame structure parameter of the UL BWP and a frame structure parameter of the SL BWP is specifically: when the bandwidth of the resource pool in the UL BWP and the SL BWP is within the radio frequency bandwidth, and the frame structure parameter of the UL BWP is the same as the frame structure parameter of the SL BWP, determining that the delay of switching between uplink transmission and sidelink transmission is zero. For other descriptions, refer to the descriptions in the method 3.4. Details are not described herein again.

For example, the determining the delay of switching between uplink transmission and sidelink transmission for the method 3.5 based on a frame structure parameter of the UL BWP and a frame structure parameter of the SL BWP is specifically: when the UL BWP includes the resource pool in the SL BWP or the resource pool in the SL BWP is located in the bandwidth of the UL BWP, and the frame structure parameter of the UL BWP is the same as the frame structure parameter of the SL BWP, determining that the delay of switching between uplink transmission and sidelink transmission is zero. For other descriptions, refer to the descriptions in the method 3.5. Details are not described herein again.

For example, the determining the delay of switching between uplink transmission and sidelink transmission for the method 3.6 based on a frame structure parameter of the UL BWP and a frame structure parameter of the SL BWP is specifically: when the position of the center carrier frequency of the UL BWP is the same as the position of the center carrier frequency of the SL BWP or the bandwidth of the frequency domain resource between the position of the center carrier frequency of the UL BWP and the position of the center carrier frequency of the SL BWP is less than or equal to the spacing threshold, determining that the delay of switching between uplink transmission and sidelink transmission is zero. For other descriptions, refer to the descriptions in the method 3.6. Details are not described herein again.

For example, the determining the delay of switching between uplink transmission and sidelink transmission for the method 3.7 based on a frame structure parameter of the UL BWP and a frame structure parameter of the SL BWP is specifically: when the bandwidth of the UL BWP includes the bandwidth of the SL BWP or the bandwidth of the SL BWP includes the bandwidth of the UL BWP, and the frame structure parameter of the UL BWP is the same as the frame structure parameter of the SL BWP, determining that the delay of switching between uplink transmission and sidelink transmission is zero. For other descriptions, refer to the descriptions in the method 3.7. Details are not described herein again.

Method 3.9: Determine the delay of switching between uplink transmission and sidelink transmission based on a combination of at least two of the foregoing methods 3.1 to 3.8.

For example, the method 3.1 is combined with the method 3.6, to be specific, the delay of switching between uplink transmission and sidelink transmission is determined based on the relationship between the size of the bandwidth for the UL BWP and the SL BWP and the size of the radio frequency bandwidth and the relationship between the position of the center carrier frequency of the UL BWP and the position of the center carrier frequency of the SL BWP. For other descriptions, refer to the descriptions in the method 3.1 and the method 3.6. Details are not described herein again.

For example, the method 3.5 is combined with the method 3.6, to be specific, the delay of switching between uplink transmission and sidelink transmission is determined based on the relationship between the position of the UL BWP and the position of the resource pool in the SL BWP and the relationship between the position of the center carrier frequency of the UL BWP and the position of the center carrier frequency of the SL BWP. For other descriptions, refer to the descriptions in the method 3.5 and the method 3.6. Details are not described herein again.

A combination of at least two other methods for determining the delay of switching between uplink transmission and sidelink transmission may be obtained in a manner similar to that described above. Details are not described herein again in this application.

In this application, that the switching delay is zero may also mean that the switching delay is 0 ms, or may mean that there is no switching delay, or may mean that the switching delay does not exist, or may mean that the switching delay may not be considered, or may mean that the switching delay may be ignored, or may mean a relatively short switching delay. For example, that the switching delay is zero may mean a switching delay shorter than a time of one slot (for example, a switching delay of one or more symbols). A length of one slot may be 1 ms, 0.5 ms, 0.25 ms, 0.125 ms, or the like.

In an optional implementation, the terminal device may report whether to support a capability of determining that the delay of switching between uplink transmission and sidelink transmission is zero. If the terminal device can support the capability, the terminal device may determine, according to the method shown in FIG. 9, that the delay of switching between uplink transmission and sidelink transmission is zero; or the network device may determine, based on the capability reported by the terminal device and according to the method shown in FIG. 10, that the delay of switching between uplink transmission and sidelink transmission performed by the terminal device is zero.

In another optional implementation, the terminal device may report whether to support a capability of determining that the delay of switching between uplink transmission and sidelink transmission in different frame structure parameters is zero. If the terminal device can support the capability, the terminal device may determine, according to the method shown in FIG. 9, that the delay of switching between uplink transmission and sidelink transmission is zero when the frame structure parameter of the UL BWP is different from the frame structure parameter of the SL BWP; or the network device may determine, based on the capability reported by the terminal device and according to the method shown in FIG. 10, that the delay of switching between uplink transmission and sidelink transmission performed by the terminal device is zero when the frame structure parameter of the UL BWP is different from the frame structure parameter of the SL BWP.

FIG. 20 is a schematic structural diagram of a communications apparatus according to an embodiment of this application. The communications apparatus 2000 may be a network device, or may be a terminal. The communications apparatus may be configured to implement the method corresponding to the communications device or the node described in the foregoing method embodiments. For details, refer to the descriptions in the foregoing method embodiments.

The communications apparatus 2000 may include one or more processors 2001. The processor 2001 may also be referred to as a processing unit, and may implement a specific control function. The processor 2001 may be a general-purpose processor, a special-purpose processor, or the like. For example, the processor 2001 may be a baseband processor or a central processing unit. The baseband processor may be configured to process a communications protocol and communications data. The central processing unit may be configured to: control the communications apparatus (for example, a base station, a baseband chip, a DU, or a CU), execute a software program, and process data of the software program.

In an optional design, the processor 2001 may also store instructions and/or data 2003. The instructions and/or data 2003 may be run by the processor, so that the communications apparatus 2000 is enabled to perform the method corresponding to the communications device described in the foregoing method embodiments.

In another optional design, the processor 2001 may include a transceiver unit configured to implement sending and receiving functions. For example, the transceiver unit may be a transceiver circuit or an interface. A circuit or an interface configured to implement a receiving function and a circuit or an interface configured to implement a sending function may be separated or may be integrated together.

In still another possible design, the communications apparatus 2000 may include a circuit. The circuit may implement the sending, receiving, or communications function in the foregoing method embodiments.

Optionally, the communications apparatus 2000 may include one or more memories 2002. The memory may store instructions 2004. The instructions may be run on the processor, so that the communications apparatus 2000 is enabled to perform the methods described in the foregoing method embodiments. Optionally, the memory may further store data. Optionally, the processor may further store instructions and/or data. The processor and the memory may be separately disposed, or may be integrated together. For example, various correspondences described in the foregoing method embodiments may be stored in the memory, or may be stored in the processor.

Optionally, the communications apparatus 2000 may further include a transceiver 2005 and/or an antenna 2006. The processor 2001 may be referred to as a processing unit, and controls the communications apparatus (a terminal or a network device). The transceiver 2005 may be referred to as a transceiver unit, a transceiver machine, a transceiver circuit, a transceiver, or the like, and is configured to implement sending and receiving functions of the communications apparatus.

Optionally, the modules in the communications apparatus 2000 in this embodiment of this application may be configured to perform the method described in FIG. 4, FIG. 5, FIG. 9, or FIG. 10 in the embodiments of this application.

In a possible design, a communications apparatus 2000 includes a receiving unit and a sending unit. The receiving unit is configured to receive configuration information A, where the configuration information A is used to configure an SL BWP. The sending unit is configured to send sidelink data on a resource included in a transmission resource pool #A, where a frequency range of the transmission resource pool #A is included in a frequency range of a currently activated UL BWP and a frequency range of the SL BWP.

By way of example and not limitation, the configuration information A includes a configuration of a transmission resource pool of the SL BWP; and a frequency range of the transmission resource pool of the SL BWP is included in the frequency range of the SL BWP, or a frequency range of the transmission resource pool of the SL BWP is included in the frequency range of the activated UL BWP and the frequency range of the SL BWP.

Optionally, sidelink data is sent on the SL BWP in the following implementations:

Case A#1

In a terminal-aware mode, a terminal perceives a physical resource that can be used to send sidelink data in an SL BWP, independently selects an available transmission resource pool, and sends sidelink control information and data information in the selected resource pool, to implement sidelink transmission.

Case A#2

In a base station scheduling mode, a base station sends downlink control information DCI, where the DCI includes sidelink data scheduling information. After a transmit-side terminal 1 receives the DCI sent by the base station, the terminal 1 sends sidelink control information SCI to a receive-side terminal 2, to implement sidelink data scheduling.

Because the frequency range of the transmission resource pool #A is included in a frequency range of the currently activated UL BWP and a frequency range of the SL BWP, sending of uplink data is not affected when the user equipment sends sidelink data in the transmission resource pool #A. This implements transmit radio frequency sharing between the SL BWP and the UL BWP, and improves sidelink data transmission efficiency. In addition, this can further reduce a time of switching between the UL BWP and the SL BWP.

In another possible design, a communications apparatus 2000 includes a receiving unit, a sending unit, and a processing unit. The receiving unit is configured to receive configuration information A, where the configuration information A is used to configure an SL BWP. The sending unit is configured to send sidelink data on a resource included in a transmission resource pool #A, where a frequency range of the transmission resource pool #A is included in a frequency range of a currently activated UL BWP and a frequency range of the SL BWP. The processing unit is configured to control or enable the receiving unit and/or the sending unit to perform a corresponding function.

In a possible design, a communications apparatus 2000 includes: a sending unit, configured to send configuration information A, where the configuration information A is used to configure an SL BWP, the configuration information A includes a configuration of a transmission resource pool of the SL BWP, and a frequency range of the transmission resource pool of the SL BWP is included in a frequency range of the SL BWP. The sending unit is further configured to send indication information #2, where the indication information #2 is used to indicate a terminal to transmit sidelink data on a transmission resource pool #A, and a frequency range of the transmission resource pool #A is included in the frequency range of the SL BWP and a frequency range of an activated uplink bandwidth UL BWP.

Optionally, the sending unit is further configured to send indication information #1, where the indication information #1 is used to indicate the terminal to send uplink data on the currently activated UL BWP.

In this embodiment of this application, a base station may configure an SL BWP and a UL BWP for a terminal, and the SL BWP and the UL BWP may overlap in frequency domain. The base station may activate one or more of UL BWPs configured for UE 1, and the UE 1 may send uplink data (the uplink data may be carried on an uplink shared channel and/or an uplink control channel) to the base station on the activated UL BWP, and send sidelink data to UE 2 on an SL BWP.

Optionally, for sidelink communication, a base station or an operator may configure an SL BWP for a terminal, where a BWP configured by the operator by using preconfigured signaling may be referred to as a common BWP, that is, a BWP that can be configured for all terminals. Alternatively, a base station may configure a BWP for a terminal by using terminal-specific signaling, where the BWP may be referred to as a dedicated BWP.

Because the frequency range of the transmission resource pool #A is included in a frequency range of the currently activated UL BWP and a frequency range of the SL BWP, sending of uplink data is not affected when the user equipment sends sidelink data in the transmission resource pool #A. This implements transmit radio frequency sharing between the SL BWP and the UL BWP, and improves sidelink data transmission efficiency. In addition, this can further reduce a time of switching between the UL BWP and the SL BWP.

In another possible design, a communications apparatus 2000 includes a processing module 2001. The processing module 2001 is configured to determine a delay of switching between uplink transmission and sidelink transmission based on a UL BWP and an SL BWP. Optionally, the communications apparatus may further include a transceiver module 2005. The transceiver module 2005 is configured to receive or send configuration information A, where the configuration information A is used to configure an SL BWP.

Figure 21:
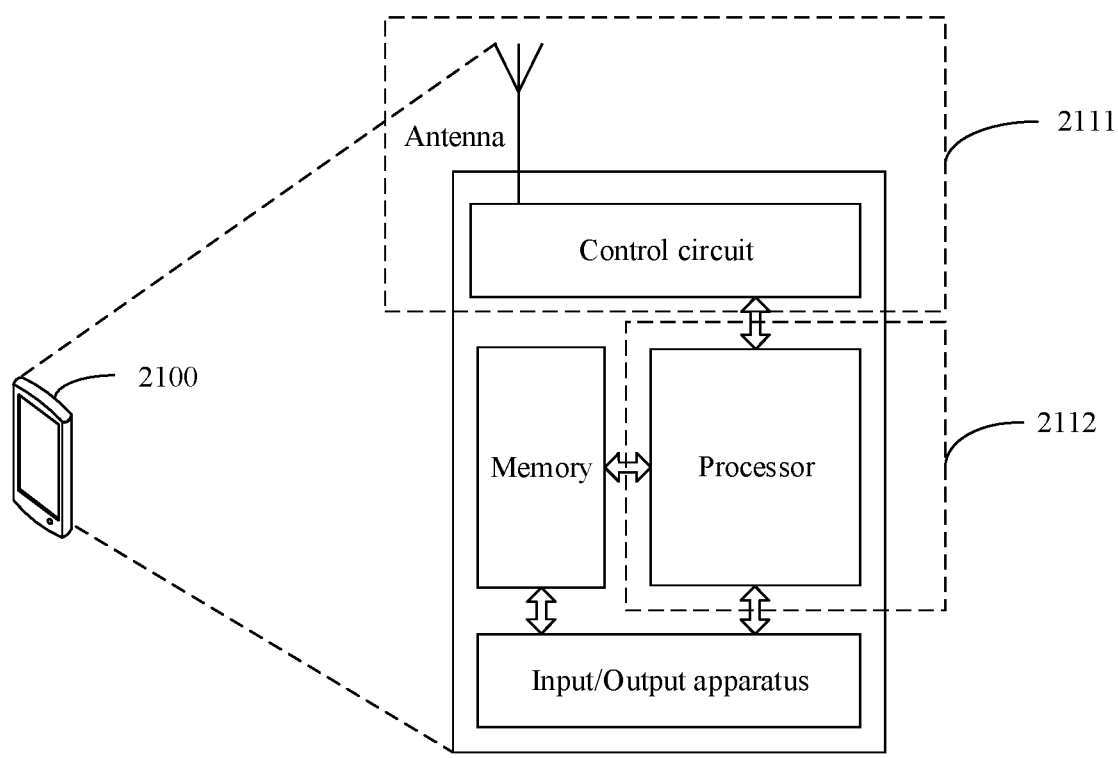
FIG. 21 is a schematic structural diagram of a terminal device according to an embodiment of this application.

FIG. 21 is a schematic structural diagram of a terminal device according to an embodiment of this application. The terminal may be applied to the system shown in FIG. 1. For ease of description, FIG. 21 shows only main components of the terminal. As shown in FIG. 21, the terminal 2100 includes a processor, a memory, a control circuit, an antenna, and an input/output apparatus. The processor is mainly configured to: process a communications protocol and communications data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user.

After user equipment is turned on, the processor may read a software program stored in a storage unit, parse and execute an instruction of the software program, and process data of the software program. When data needs to be sent wirelessly, after performing baseband processing on the to-be-sent data, the processor outputs a baseband signal to a radio frequency circuit. After processing the baseband signal, the radio frequency circuit obtains a radio frequency signal and sends the radio frequency signal to the outside through an antenna in a form of an electromagnetic wave. When data is sent to the user equipment, the radio frequency circuit receives a radio frequency signal by using the antenna, further converts the radio frequency signal into a baseband signal, and outputs the baseband signal to the processor, and the processor converts the baseband signal into data and processes the data.

A person skilled in the art may understand that, for ease of description, FIG. 21 shows only one memory and only one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communications protocol and communications data. The central processing unit is mainly configured to: control the entire terminal, execute a software program, and process data of the software program. The processor in FIG. 21 integrates functions of the baseband processor and the central processing unit. A person skilled in the art may understand that the baseband processor and the central processing unit may be processors independent of each other, and are connected to each other by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing a communications protocol and communications data may be built in the processor; or may be stored in the storage unit in a form of a software program, and the processor executes the software program to implement a baseband processing function.

In an example, the antenna and the control circuit that have sending and receiving functions may be considered as a transceiver unit 2111 of the terminal 2100, and the processor having a processing function may be considered as a processing unit 2112 of the terminal 2100. As shown in FIG. 21, the terminal 2100 includes the transceiver unit 2111 and the processing unit 2112. The transceiver unit may also be referred to as a transceiver, a transceiver machine, a transceiver apparatus, or the like. Optionally, a component for implementing a receiving function in the transceiver unit 2111 may be considered as a receiving unit, and a component for implementing a sending function in the transceiver unit 2111 may be considered as a sending unit. In other words, the transceiver unit 2111 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be located at one geographical position, or may be scattered at a plurality of geographical positions.

Figure 22:
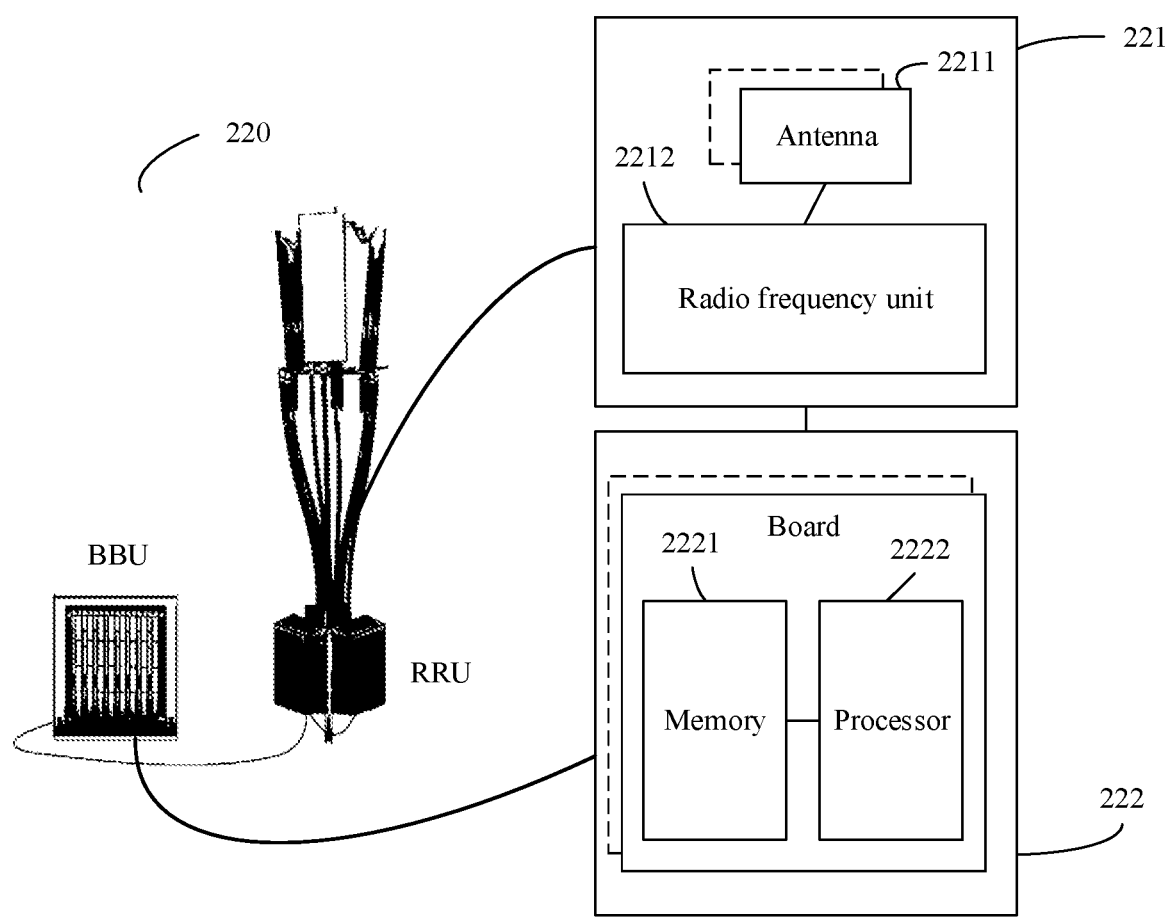
FIG. 22 is a schematic structural diagram of a network device according to an embodiment of this application.

FIG. 22 is a schematic structural diagram of a network device according to an embodiment of this application. The network device may be configured to implement functions of the network device in the foregoing methods. For example, FIG. 22 may be a schematic structural diagram of a base station. As shown in FIG. 22, the base station may be applied to the system shown in FIG. 1. The base station 220 includes one or more radio frequency units, for example, a remote radio unit (RRU) 221 and one or more baseband units (BBU) 222. The RRU 221 may be referred to as a transceiver unit, a transceiver machine, a transceiver circuit, a transceiver, or the like, and may include at least one antenna 2211 and a radio frequency unit 2212. The RRU 221 is mainly configured to: send and receive a radio frequency signal, and perform conversion between a radio frequency signal and a baseband signal. For example, the RRU 221 is configured to send the signaling message in the foregoing embodiments to a terminal device. The BBU 222 is mainly configured to: perform baseband processing, control the base station, and the like. The RRU 221 and the BBU 222 may be physically disposed together, or may be physically separated, in other words, disposed in a distributed base station.

The BBU 222 is a control center of the base station, may also be referred to as a processing unit, and is mainly configured to complete baseband processing functions such as channel coding, multiplexing, modulation, and spectrum spreading. For example, the BBU (the processing unit) 222 may be configured to control the base station 220 to perform the operation procedure related to the network device in the foregoing method embodiments.

In an example, the BBU 222 may include one or more boards, and a plurality of boards may jointly support a radio access network (such as an LTE system or a 5G system) of a single access standard, or may separately support radio access networks of different access standards. The BBU 222 further includes a memory 2221 and a processor 2222. The memory 2221 is configured to store necessary instructions and data. For example, the memory 2221 stores the methods in the foregoing embodiments. The processor 2222 is configured to control the base station to perform a necessary action, for example, is configured to control the base station to perform the operation procedure related to the network device in the foregoing method embodiments. The memory 2221 and the processor 2222 may serve the one or more boards. In other words, a memory and a processor may be independently disposed on each board, or a plurality of boards may share a same memory and a same processor. In addition, a necessary circuit may be further disposed on each board.

In a possible implementation, with development of a system-on-a-chip (system-on-chip, SoC) technology, all or some functions of the part 221 and the part 222 may be implemented by using the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the computer instructions or the computer programs are loaded or executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that identifiers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It can be clearly understood by a person skilled in the art that, for the purpose of convenient and brief description, for a detailed working process of the described system, apparatus, and unit, refer to a corresponding process in the foregoing method embodiments. Details are not described herein again. In the several embodiments provided in this application, it should be understood that the disclosed system, apparatus, and method may be implemented in another manner. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate parts may or may not be physically separate, and parts displayed as units may or may not be physical units, in other words, may be located in one position, or may be distributed on a plurality of network units. Some or all of the units may be selected according to an actual requirement to achieve objectives of the solutions of the embodiments. In addition, function units in the embodiments of this application may be integrated into one sending unit, or each of the units may exist alone physically, or two or more units are integrated into one unit. When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus comprising:
one or more processors;
a non-transitory memory coupled to the one or more processors, wherein the non-transitory memory stores a program to be executed by the one or more processors, the program including instructions for:
receiving first configuration information, wherein the first configuration information is used to configure a first bandwidth part (BWP);
determining a frequency range of a first transmission resource pool to be within a frequency range of the first BWP and a frequency range of a second BWP, wherein the second BWP is an activated uplink BWP; and
sending sidelink data on a resource comprised in the first transmission resource pool.

2. The apparatus according to claim 1, wherein the first configuration information comprises a configuration of a transmission resource pool of the first BWP, and a frequency range of the transmission resource pool of the first BWP is within the frequency range of the first BWP.

3. The apparatus according to claim 1, wherein the first configuration information comprises a configuration of a transmission resource pool of the first BWP, and a frequency range of the transmission resource pool of the first BWP is within the frequency range of the first BWP and the frequency range of the second BWP.

4. The apparatus according to claim 1, wherein the program further includes instructions for:
reporting information about a bandwidth capability, wherein the bandwidth capability comprises a transmit bandwidth capability and a receive bandwidth capability.

5. The apparatus according to claim 4, wherein a bandwidth of the first BWP satisfies one of the following conditions:
the bandwidth of the first BWP is less than or equal to a maximum value in the transmit bandwidth capability and the receive bandwidth capability;
the bandwidth of the first BWP is less than or equal to a minimum value in the transmit bandwidth capability and the receive bandwidth capability; or
the bandwidth of the first BWP is less than or equal to the receive bandwidth capability.

6. The apparatus according to claim 1, wherein frequency centers of the first BWP and the second BWP are equal.

7. The apparatus according to claim 1, wherein the program further includes instructions for:
sending uplink data on the second BWP.

8. An apparatus, comprising:
one or more processors;
a non-transitory memory coupled to the one or more processors, wherein the non-transitory memory stores a program to be executed by the one or more processors, the program including instructions for:
sending first configuration information, wherein the first configuration information is used to configure a first bandwidth part (BWP); and
sending first indication information, wherein the first indication information indicates a sidelink resource, the sidelink resource is comprised in a first transmission resource pool, and wherein the first indication information is used to determine the first transmission pool, a frequency range of the first transmission resource pool is within a frequency range of the first BWP and a frequency range of a second BWP, and the second BWP is an activated uplink BWP.

9. The apparatus according to claim 8, wherein the first configuration information comprises a configuration of a transmission resource pool of the first BWP, and a frequency range of the transmission resource pool of the first BWP is within the frequency range of the first BWP.

10. The apparatus according to claim 8, wherein the first configuration information comprises a configuration of a transmission resource pool of the first BWP, and a frequency range of the transmission resource pool of the first BWP is within the frequency range of the first BWP and the frequency range of the second BWP.

11. The apparatus according to claim 8, wherein the program further includes instructions for:
obtaining information about a bandwidth capability, wherein the bandwidth capability comprises a transmit bandwidth capability and a receive bandwidth capability.

12. The apparatus according to claim 11, wherein a bandwidth of the first BWP satisfies one of the following conditions:
the bandwidth of the first BWP is less than or equal to a maximum value in the transmit bandwidth capability and the receive bandwidth capability;
the bandwidth of the first BWP is less than or equal to a minimum value in the transmit bandwidth capability and the receive bandwidth capability; or
the bandwidth of the first BWP is less than or equal to the receive bandwidth capability.

13. The apparatus according to claim 8, wherein the program further includes instructions for:
sending second indication information, wherein the second indication information indicates an uplink resource, and the second BWP comprises the uplink resource.

14. The apparatus according to claim 8, wherein frequency centers of the first BWP and the second BWP are equal.

15. A method applied to a communication apparatus, the method comprising:

sending first configuration information, wherein the first configuration information is used to configure a first bandwidth part (BWP); and sending first indication information, wherein the first indication information indicates a sidelink resource, the sidelink resource is comprised in a first transmission resource pool, and wherein the first indication information is used to determine the first transmission pool, a frequency range of the first transmission resource pool is within a frequency range of the first BWP and a frequency range of a second BWP, and the second BWP is an activated uplink BWP.

16. The method according to claim 15, wherein the first configuration information comprises a configuration of a transmission resource pool of the first BWP, and a frequency range of the transmission resource pool of the first BWP is within the frequency range of the first BWP and the frequency range of the second BWP.

17. The method according to claim 15, further comprising:

obtaining information about a bandwidth capability, wherein the bandwidth capability comprises a transmit bandwidth capability and a receive bandwidth capability.

18. The method according to claim 17, wherein a bandwidth of the first BWP satisfies one of the following conditions:

the bandwidth of the first BWP is less than or equal to a maximum value in the transmit bandwidth capability and the receive bandwidth capability;

the bandwidth of the first BWP is less than or equal to a minimum value in the transmit bandwidth capability and the receive bandwidth capability; or the bandwidth of the first BWP is less than or equal to the receive bandwidth capability.

19. The method according to claim 15, wherein the method further comprises:

sending second indication information, wherein the second indication information indicates an uplink resource, and the second BWP comprises the uplink resource.

20. The method according to claim 15, wherein frequency centers of the first BWP and the second BWP are equal.

* * * * *